US007779238B2

(12) United States Patent
Kosche et al.

(10) Patent No.: US 7,779,238 B2
(45) Date of Patent: Aug. 17, 2010

(54) METHOD AND APPARATUS FOR PRECISELY IDENTIFYING EFFECTIVE ADDRESSES ASSOCIATED WITH HARDWARE EVENTS

(75) Inventors: Nicolai Kosche, San Francisco, CA (US); Gregory F. Grohoski, Bee Cave, TX (US); Paul J. Jordan, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 929 days.

(21) Appl. No.: 11/589,492

(22) Filed: Oct. 30, 2006

(65) Prior Publication Data

US 2007/0043531 A1      Feb. 22, 2007

Related U.S. Application Data

(63) Continuation-in-part of application No. 11/517,085, filed on Sep. 7, 2006, and a continuation-in-part of application No. 11/516,980, filed on Sep. 7, 2006, and a continuation-in-part of application No. 10/881,032, filed on Jun. 30, 2004.

(51) Int. Cl.
  *G06F 11/30* (2006.01)
(52) U.S. Cl. .................. 712/227; 712/244; 717/130
(58) Field of Classification Search .......... 712/227, 712/244; 717/130
  See application file for complete search history.

(56) References Cited

U.S. PATENT DOCUMENTS 5,666,509 A * 9/1997 McCarthy et al. ........... 711/206

| 5,822,578 | A  | * | 10/1998 | Frank et al. ........... 712/244 |
| 6,061,711 | A  | * | 5/2000  | Song et al. ........... 718/108 |
| 6,085,312 | A  | * | 7/2000  | Abdallah et al. ........ 712/208 |
| 6,634,023 | B1 | * | 10/2003 | Komatsu et al. ........ 717/159 |
| 6,694,425 | B1 | * | 2/2004  | Eickemeyer ............ 712/216 |

(Continued)

OTHER PUBLICATIONS

Dean et al., "ProfileMe: Hardware Support for Instruction-Level Profiling on Out-of-Order Processors", Proceedings of the 30th Annual ACM/IEEE International Symposium on Microarchitecture, ACM, 1997, pp. 292-302.*

(Continued)

*Primary Examiner*—William M Treat
(74) *Attorney, Agent, or Firm*—Robert C Kowert; Meyertons, Hood, Kivlin, Kowert & Goetzel, P.C.

(57) ABSTRACT

A system and method for precisely identifying an instruction causing a performance-related event is disclosed. The instruction may be detected while in a pipeline stage of a microprocessor preceding a writeback stage and the microprocessor's architectural state may not be updated until after information identifying the instruction is captured. The instruction may be flushed from the pipeline, along with other instructions from the same thread. A hardware trap may be taken when the instruction is detected and/or when an event counter overflows or is within a given range of overflowing. A software trap handler may capture and/or log information identifying the instruction, such as one or more extended address elements, before returning control and initiating a retry of the instruction. The captured and/or logged information may be stored in an event space database usable by a data space profiler to identify performance bottlenecks in the application containing the instruction.

20 Claims, 32 Drawing Sheets

U.S. PATENT DOCUMENTS

| | | | |
|---|---|---|---|
| 6,725,363 B1 * | 4/2004 | Damron | 712/227 |
| 6,907,520 B2 * | 6/2005 | Parady | 712/228 |
| 7,039,910 B2 | 5/2006 | Kosche et al. | |
| 7,137,110 B1 | 11/2006 | Reese et al. | |
| 2003/0101336 A1 | 5/2003 | Kosche et al. | |
| 2003/0188226 A1 | 10/2003 | Talcott et al. | |
| 2006/0179207 A1 * | 8/2006 | Eisen et al. | 711/100 |
| 2007/0214342 A1 * | 9/2007 | Newburn et al. | 712/216 |

OTHER PUBLICATIONS

Sprunt, "The Basics of Performance-Monitoring Hardware", IEEE Micro, vol. 22, iss. 4, Jul.-Aug. 2002, pp. 64-71.*

Ungerer et al., "A Survey of Processors with Explicit Multithreading", ACM Computing Surveys, vol. 35, iss. 1, Mar. 2003, pp. 29-63.*

Mysore et al. "Profiling over Adaptive Ranges", Proceedings of the International Symposium on Code Generation and Optimization, 2006, pp. 147-158.*

Monreal et al., "Late Allocation and Early Release of Physical Registers", IEEE Transactions on Computers, vol. 53, iss. 10, Oct. 2004, pp. 1244-1259.*

Lysecky et al., "A Fast On-Chip Profiler Memory", Proceedings of the $39^{th}$ Annual Design Automation Conference, ACM, 2002, pp. 28-33.*

U.S. Appl. No. 10/881,032, entitled "Performance Instrumentation in a Fine Grain Multithreaded Multicore Processor".

U.S. Appl. No. 10/880,485 entitled "Associating Data Source Information With Runtime Events".

U.S. Appl. No. 10/840,180 entitled "Method and Apparatus for Correlating Profile Data".

U.S. Appl. No. 10/840,164 entitled "Method and Apparatus for Profiling Data Addresses".

U.S. Appl. No. 10/840,167 entitled "Method and Apparatus for Data Object Profiling".

U.S. Appl. No. 11/517,085, filed Sep. 7, 2006.

U.S. Appl. No. 11/516,980, filed Sep. 7, 2006.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

FIG. 3

| data stall seconds | address | address type |
|---|---|---|
| 549.909 | <TOTAL> | |
| 75.303 | 0X02000640 | physical |
| 14.270 | 0X02000720 | physical |
| ... | ... | |
| ... | ... | virtual |

FIG. 26

| E$ stall seconds | data E$ read misses % | data E$ read references % | data DTLB misses % | source-level data object language construct |
|---|---|---|---|---|
| 297.569 | 100.00 | 100.00 | 100.00 | <TOTAL> |
| 166.402 | 59.4 | 37.3 | 70.0 | TREE |
| 124.601 | 39.5 | 41.4 | 29.7 | TABLE |
| ... | ... | ... | ... | ... |
| ... | ... | ... | ... | ... |

FIG. 27A

| E$ stall seconds | data E$ read misses % | data E$ references % | data DTLB misses % | source-level data object language construct |
|---|---|---|---|---|
| 166.402 | 59.4 | 37.3 | 70.0 | TREE |
| 29.1 | 8.2 | 3.7 | 0.1 | INT TREE.LEAFS |
| ... | ... | ... | ... | ... |
| ... | ... | ... | ... | ... |

FIG. 27B

| E$ stall seconds | E$ cycles % | functions |
|---|---|---|
| 785.235 | 100.00 | <TOTAL> |
| 39.262 | 5.00 | STACK_CONTROL |
| 38.477 | 4.9 | GARBAGE_COLLECT |
| ... | ... | ... |
| ... | ... | ... |

*FIG. 28A*

| E$ stall seconds | E$ cycles % | source-level data object language constructs |
|---|---|---|
| 785.235 | 100.00 | <TOTAL> |
| 117.785 | 15.00 | TOS |
| 94.239 | 12.00 | NUM_ENTRIES |
| ... | ... | ... |
| ... | ... | ... |

*FIG. 28B*

| E$ stall seconds | E$ cycles % | time in seconds |
|---|---|---|
| 785.235 | 100.00 | <TOTAL> |
| 15.704 | 2.00 | 0 - 10 |
| 23.557 | 3.00 | 10 - 20 |
| 196.309 | 25.00 | 20 - 30 |
| ... | ... | ... |

*FIG. 28C*

| E$ stall seconds | E$ cycles % | E$ cycles % for selected parameters | functions |
|---|---|---|---|
| 196.309 | 25.00 | 100.00 | <TOTAL> |
| 31.409 | 4.00 | 16.00 | GARBAGE_COLLECT |
| 5.889 | 0.75 | 3.00 | STACK_CONTROL |
| ... | ... | ... | ... |

*FIG. 28D*

| E$ stall seconds | E$ cycles % | E$ cycles % for selected parameters | functions |
|---|---|---|---|
| 31.409 | 4.00 | 100.00 | <TOTAL> |
| 29.839 | 3.8 | 95.00 | Structure H |
| ... | ... | ... | ... |
| ... | ... | ... | ... |

*FIG. 28E*

| E$ stall seconds | E$ cycles % | E$ cycles % for selected parameters | H elements [offset] |
|---|---|---|---|
| 31.409 | 4.00 | 100.00 | <TOTAL> |
| 29.839 | 3.8 | 95.00 | H.HEAD [0] |
| ... | ... | ... | H.TAIL [4] |
| ... | ... | ... | ... |
| 14.9195 | 1.9 | 50.0 | H.VOLUME [158] |

*FIG. 28F*

METHOD AND APPARATUS FOR PRECISELY IDENTIFYING EFFECTIVE ADDRESSES ASSOCIATED WITH HARDWARE EVENTS

CONTINUING APPLICATION DATA

This application is a Continuation-In-Part of U.S. patent application Ser. No. 10/881,032 titled "Performance Instrumentation in a Fine Grain Multithreaded Multicore Processor," filed Jun. 30, 2004, whose inventors are Gregory F. Grohoski, Paul J. Jordan, and Yue Chang, and which is herein incorporated by reference in its entirety. This application is also a Continuation-In-Part of U.S. patent application Ser. No. 11/517,085 titled "Method and Apparatus for Specification and Application of a User Specified Filter in a Data Space Profiler", filed Sep. 7, 2006, whose inventors are Nicolai Kosche, Oleg V. Mazurov, and Martin S. Itzkowitz, and which is herein incorporated by reference in its entirety. This application is also a Continuation-In-Part of U.S. patent application Ser. No. 11/516,980 titled "Method and Apparatus for Sorting and Displaying Costs in a Data Space Profiler", filed Sep. 7, 2006, whose inventors are Nicolai Kosche, Arpana Jayaswal, and Martin S. Itzkowitz, and which is herein incorporated by reference in its entirety.

BACKGROUND OF THE INVENTION

1. Field of the Invention

The invention relates to computing systems and, more particularly, to performance monitoring and profiling of software applications.

2. Description of the Relevant Art

Modern processors typically include performance monitoring logic (PML) to measure processor performance while running application code and to help identify performance bottlenecks. Two features commonly found in PML are (1) the ability to count certain processor events, such as cache misses, branch mispredictions, etc., and (2) the ability to cause a trap when a counter reaches a particular value (such as overflowing from all ones to all zeroes). Diagnostic software typically configures these counters to measure processor performance over particular intervals. For example, one simple measurement may be a count of the number of instructions executed. By also counting the number of cycles over which a given number of instructions were executed, the instructions per cycle (IPC) over an interval can be derived. If the performance over a given interval drops unexpectedly, then the given interval is selected for more detailed analysis. By configuring performance monitor counters to measure other events during a rerun of the given interval, the reason for the low performance may be identified.

For example, if the IPC is found to be too low, the counters may be configured to count branch mispredictions, cache misses, or TLB misses which commonly result in low IPC. If the number of cache misses is suspiciously high, then that may point towards the cause of the reduced performance. In this manner diagnostic software can narrow the possible causes of performance issues. Once a primary cause has been identified, more in-depth analysis can be performed.

Consider the case of an unexpectedly high data cache miss rate. The next step is generally to find which processes, programs, subroutines or functions, and program statements are responsible for the majority of the cache misses. In order to further isolate the cause, periodic sampling may be used. To perform such sampling, software configures a counter to count data cache misses and a trapping mechanism to "trap" (e.g., generate a software exception) when the counter overflows. Software then sets the counter to a predetermined value based upon how frequently it wants the counter to overflow, and thus the "sample" to be taken. For example, if software wants to sample once every 3000 cache misses, then the counter would be programmed with −3000. When the $3000^{th}$ data cache miss occurs, hardware would direct a trap to a software trap handler, which would then capture the PC (program counter) of the instruction that caused the counter to wrap (e.g., caused the $3000^{th}$ data cache miss). Software can record the PC, reload the counter with −3000, and return to the running program. Diagnostic software can then identify which program statement was executing when the counter wrapped. By choosing an appropriate sample interval, software can build a "miss profile" which isolates the performance issue. For example, it may be that a load of a particular array element in a loop is responsible for most of the accesses. Then the program may be recoded such that the access pattern is different, or the data is prefetched, for example by judiciously inserting data prefetch instructions.

In this mode of operation, then, there are two important properties. First, the instruction which was executing when the trap was taken be should be as closely related as possible to the instruction which caused the performance event which caused the counter to wrap (ideally it would be the same instruction). The further away the instruction which was executing when the trap occurred from the event-causing instruction, the more difficult it is to associate a program statement or other information identifying the instruction that caused the event with the performance-related event. Second, event counting should be reasonably accurate (ideally it would be perfectly accurate). In other words, if N cache misses occurred, the counter would register N. In particular, the counter should not be "polluted" by events that did not occur, nor should it overcount or undercount events which did occur. Both properties involve trade-offs between implementation difficulty and chip area and power and it is difficult to build PML which satisfies both of the properties, uses a small amount of area, is simple to implement, and is simple to verify.

Accordingly, an effective method and mechanism for precisely determining identifiers of instructions causing performance-related events is desired.

SUMMARY

A performance instrumentation mechanism is contemplated in which an indication that a particular event has occurred may be conveyed when in fact the event may not have occurred. In one embodiment, a counter is utilized to record the detection of events. The counter is initialized to a negative value and incremented in response to detecting an event which is being monitored. In response to detecting the counter has wrapped, an indication may be conveyed that the counter has wrapped. In addition, if the detection of an event increments the counter to a value which is within a particular range, or epsilon, of wrapping, an indication is conveyed that the counter has wrapped. In this manner, the instruction type which traps will be one of the types of instructions which can cause the performance event, as opposed to some unrelated instruction.

In one embodiment, a performance monitor unit includes an event counting mechanism which includes a configuration register and a count register. By writing appropriate values to the configuration register, and initializing the count register to an appropriate value, particular events may be monitored and counted. In one embodiment the count register includes two separate halves, each of which may be utilized to store the count for a different event.

Also contemplated is a performance monitor unit configured to support event monitoring for a multithreaded processing system. In such an embodiment, an event counting mechanism is included for each of eight threads of instructions. In one embodiment, the performance monitor unit is configured to cycle through and select each of the eight counting mechanisms in turn. Accordingly there may be a particular latency between selections of a given counting mechanism. Upon selecting a particular counting mechanism, the corresponding event counter is updated and if the counter has wrapped, or is within an epsilon of wrapping, a signal may be conveyed which indicates the counter has wrapped. In one embodiment, a relatively small register may be utilized to store the count of events for a given counting mechanism during the selection latency period.

Also contemplated is a performance monitor unit which may suppress event counts for speculative events. For example, event counts corresponding to instructions which enter an execution pipeline as the result of a mispredicted branch may be suppressed. In some embodiments, updating the architectural state of a processor or processor core following execution of an instruction that causes an event may be suppressed until information identifying the instruction can be captured.

In addition, the performance monitoring unit may be configured to suppress the commitment of results of an instruction causing a performance-related event until information identifying the instruction is captured and/or logged. In some embodiments, the performance monitoring unit may suppress the results by causing a trap when an event occurs or when a performance monitoring counter overflows. The instruction causing the event (and any subsequent instructions from the same thread) may in some embodiments be flushed from the pipeline before being executed or before the results are committed to the architectural state. Trap handling software may capture and/or log information identifying the event, which may be used to determine one or more extended address elements associated with the instruction (e.g., the effective address.) The trap handling software may then return control to the application by initiating a "retry" of the instruction. In some embodiments, the extended address elements may be added to an event space database and may be used by a data space profiler to analyze the performance of the application.

These and other embodiments, variations, and modifications will become apparent upon consideration of the following description and associated drawings.

BRIEF DESCRIPTION OF THE DRAWINGS

FIG. 3 illustrates one embodiment of a pipeline.

FIG. 26 is a table illustrating exemplary profile data revealing execution hindrances in terms of consumed execution time in relation to addresses, according to one embodiment.

FIGS. 27A and 27B are tables illustrating exemplary profile data revealing execution hindrances in relation to source-level data object language constructs, according to various embodiments.

FIGS. 28A-28F are tables illustrating exemplary filtered profile data, according to various embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Overview of Multithreaded Processor Architecture

Figure 1:
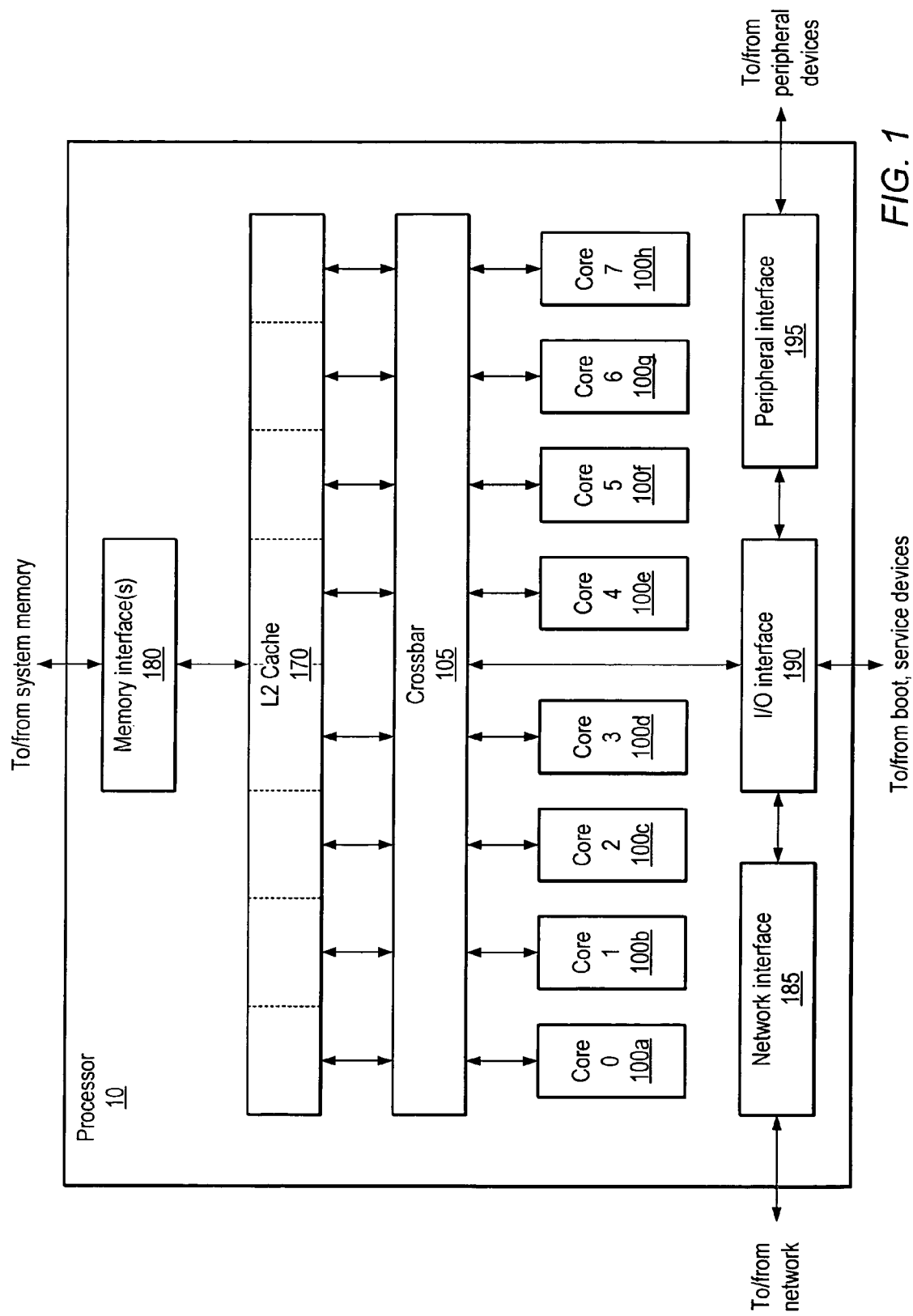
FIG. 1 is a block diagram illustrating one embodiment of a multi-threaded multi-core processor.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 170 via a crossbar 105. L2 cache 170 is coupled to one or more memory interface(s) 180, which are coupled in turn to one or more banks of system memory (not shown). Additionally, crossbar 105 couples cores 100 to input/output (I/O) interface 190, which is in turn coupled to a peripheral interface 195 and a network interface 185. As described in greater detail below, I/O interface 190, peripheral interface 195, and network interface 185 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 ISA, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 105 may be configured to manage data flow between cores 100 and the shared L2 cache 170. In one embodiment, crossbar 105 may include logic (such as multiplexers or a switch fabric, for example) that allows any core 100 to access any bank of L2 cache 170, and that conversely allows data to be returned from any L2 bank to any of the cores 100. Crossbar 105 may be configured to concurrently process data requests from cores 100 to L2 cache 170 as well as data responses from L2 cache 170 to cores 100. In some embodiments, crossbar 105 may include logic to queue data requests and/or responses, such that requests and responses may not block other activity while waiting for service. Additionally, in one embodiment crossbar 105 may be configured to arbitrate conflicts that may occur when multiple cores 100 attempt to access a single bank of L2 cache 170 or vice versa.

L2 cache 170 may be configured to cache instructions and data for use by cores 100. In the illustrated embodiment, L2 cache 170 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 170 may be a 4 megabyte (MB) cache, where each 512 kilobyte (KB) bank is 16-way set associative with a 64-byte line size, although other cache sizes and geometries are possible and contemplated. L2 cache 170 may be implemented in some embodiments as a writeback cache in which written (dirty) data may not be written to system memory until a corresponding cache line is evicted.

In some embodiments, L2 cache 170 may implement queues for requests arriving from and results to be sent to crossbar 105. Additionally, in some embodiments L2 cache 170 may implement a fill buffer configured to store fill data arriving from memory interface 180, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 170 may variously be implemented as single-ported or multiported (i.e., capable of processing multiple concurrent read and/or write accesses). In either case, L2 cache 170 may implement arbitration logic to prioritize cache access among various cache read and write requesters.

Memory interface 180 may be configured to manage the transfer of data between L2 cache 170 and system memory, for example in response to L2 fill requests and data evictions. In some embodiments, multiple instances of memory interface 180 may be implemented, with each instance configured to control a respective bank of system memory. Memory interface 180 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 180 may be configured to support interfacing to multiple different types of system memory.

In the illustrated embodiment, processor 10 may also be configured to receive data from sources other than system memory. I/O interface 190 may be configured to provide a central interface for such sources to exchange data with cores 100 and/or L2 cache 170 via crossbar 105. In some embodiments, I/O interface 190 may be configured to coordinate Direct Memory Access (DMA) transfers of data between network interface 185 or peripheral interface 195 and system memory via memory interface 180. In addition to coordinating access between crossbar 105 and other interface logic, in one embodiment I/O interface 190 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 195 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 195 may implement one or more instances of an interface such as Peripheral Component Interface Express (PCI-Express), although it is contemplated that any suitable interface standard or combination of standards may be employed. For example, in some embodiments peripheral interface 195 may be configured to implement a version of Universal Serial Bus (USB) protocol or IEEE 1394 protocol in addition to or instead of PCI-Express.

Network interface 185 may be configured to coordinate data transfer between processor 10 and one or more devices (e.g., other computer systems) coupled to processor 10 via a network. In one embodiment, network interface 185 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 185 may be configured to implement multiple discrete network interface ports.

Overview of Fine-grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
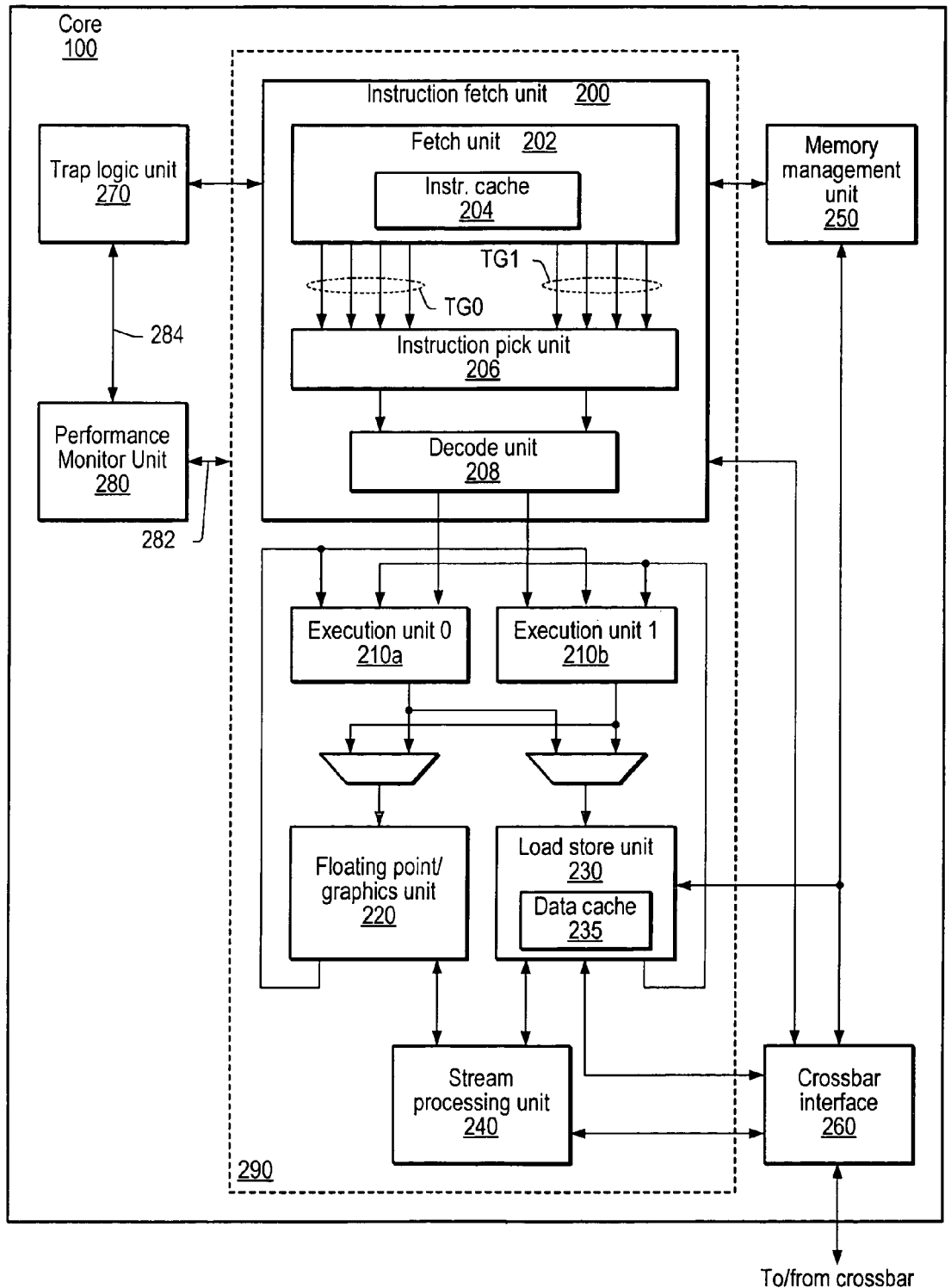
FIG. 2 is a block diagram illustrating one embodiment of a core depicted in FIG. 1.

FIG. 2 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, a performance monitor unit (PMU) 280, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 105 shown in FIG. 1. PMU 280 is coupled to TLU 270 and is further coupled to one or more of the units encompassed within block 290.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain abnormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 215 misses originating from IFU 200. LSU 230 may include a data cache 235 as well as logic configured to detect cache misses and to responsively request data from L2 cache 170 via crossbar interface 260. In one embodiment, data cache 235 may be configured as a write-through cache in which all stores are written to L2 cache 170 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 170 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 105 associated with a particular core 100, on behalf of the various functional units that may generate accesses that traverse crossbar 105. In one embodiment, crossbar interface 260 may be configured to maintain queues of pending crossbar requests and to arbitrate among pending requests to determine which request or requests may be conveyed to crossbar 105 during a given execution cycle. For example, crossbar interface 260 may implement a least-recently-used or other algorithm to arbitrate among crossbar requesters. In one embodiment, crossbar interface 260 may also be configured to receive data returned via crossbar 105, such as from L2 cache 170 or I/O interface 190, and to direct such data to the appropriate functional unit (e.g., data cache 235 for a data cache fill due to miss). In other embodiments, data returning from crossbar 105 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Figure 4:
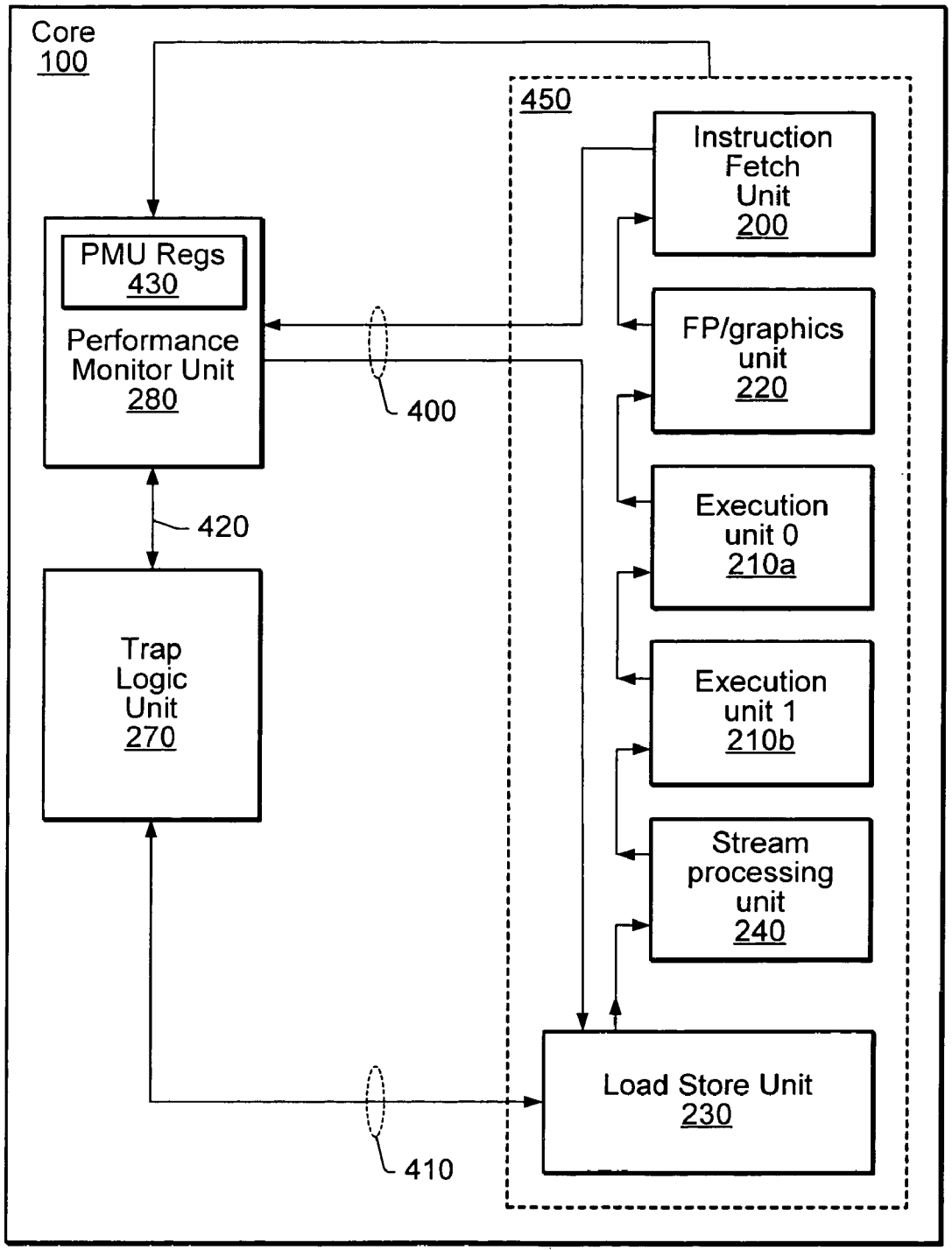
FIG. 4 is a block diagram illustrating one embodiment of configuration and status bus coupled to units in a core.

FIG. 4 depicts one embodiment wherein performance monitor unit (PMU) 280 includes both configuration and status registers 430. In the embodiment shown, access to registers 430 is accomplished via special bus 400. In one embodiment, bus 400 may be configured as a ring coupled to each of unit 200, 210, 220, 230, 240, and 280, as shown. In such an embodiment, register accesses via bus 400 may be initiated by load store unit (LSU) 230. However, other bus configurations are possible and are contemplated. LSU 230 is also shown to be coupled to trap logic unit (TLU) 270 via bus 410. As trap processing may require relatively prompt action, bus 410 coupled between TLU 270 and LSU 230 may provide for reduced latency as compared to bus 400. FIG. 4 also shows PMU 280 is coupled to receive data from, or send data to, one or more of the units depicted within block 450. In addition, PMU 280 is coupled to communicate with TLU 270 via bus 420.

In one embodiment, PMU 280 includes a configuration register and a count register for each of eight threads supported by core 100. Each configuration register may generally be utilized to identify what types of events are to be monitored for the corresponding thread. Each corresponding count register may then be configured to maintain a count for the identified event(s).

Figure 5:
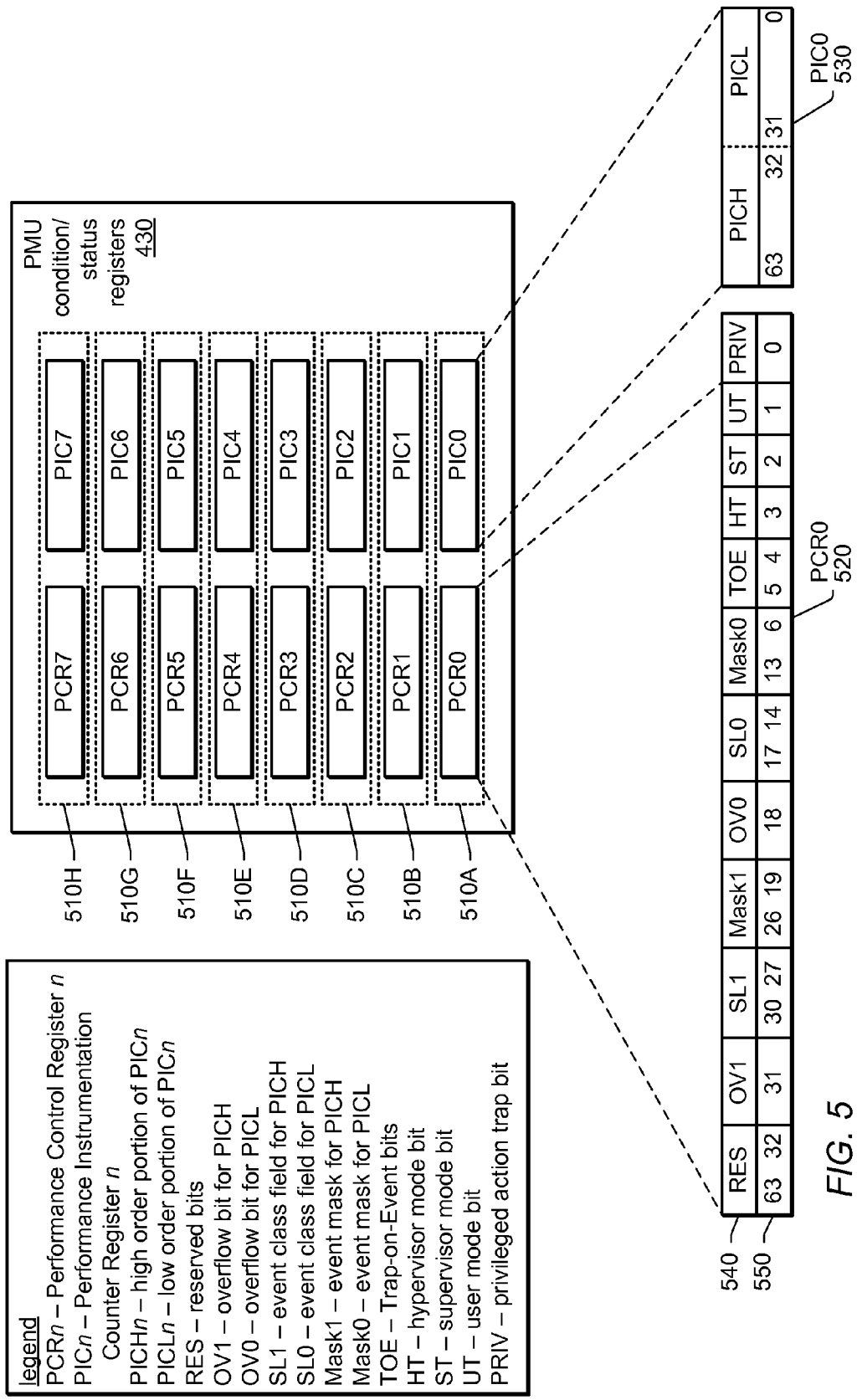
FIG. 5 depicts one embodiment of performance monitor registers.

Turning now to FIG. 5, one embodiment of PMU registers 430 is shown. Eight pairs of registers 510A-510H are depicted in FIG. 5. Each pair of registers corresponds to a particular thread supported by the core 100. Included in each pair of registers is a Performance Control Register (PCR) and a Performance Instrumentation Counter (PIC) register. Also illustrated in FIG. 5 is an enlarged view of one of the PCR registers (PCR0 520) and one of the PIC registers (PIC0 530). In the embodiment shown, each of PCR0 and PIC0 includes 64 bits of data. For each of the depicted registers 520 and 530, a first row identifies a field 540 and the second row identifies bit positions which correspond to the corresponding field. PIC registers may generally be divided into two 32-bit halves. As shown in FIG. 5, register PIC0 530 includes both a high portion (PICH) and a low portion (PICL). In this manner, two 32 bit counts may be maintained for the corresponding thread. Table 1 below provides a description of the fields for one embodiment of a PCR.

TABLE 1

| Bit Positions | Field | Definition |
|---|---|---|
| 63:32 | RES | Reserved |
| 31 | OV1 | Set to one when corresponding PIC high (PICH) wraps to 0; reset to 0 when corresponding PCR is read |
| 30:27 | SL1 | Selects up to 1 of 16 classes of events for PIC high |
| 26:19 | Mask1 | Event mask for PICH |
| 18 | OV0 | Set to one when corresponding PIC low (PICL) wraps to 0; reset to 0 when corresponding PCR is read |
| 17:14 | SL0 | Selects up to 1 of 16 event types for PICL |
| 13:6 | Mask0 | Event Mask for PICL |
| 5:4 | TOE | Trap-on-Event. TOE[0] corresponds to OV0; TOE[1] corresponds to OV1. Hardware will AND TOE[i] and OV[i] to produce a trap. |
| 3 | HT | If 1, count events when in hypervisor mode. |
| 2 | ST | If 1, count events when in supervisor mode. |
| 1 | UT | If 1, count events when in user mode. |
| 0 | PRIV | If 1, then cause a privileged_action trap if user code attempts to read or write to the corresponding PIC register. |

In the embodiment described by Table 1, the SL and Mask fields are used to determine what events are to be monitored and counted. For example, the SL0 and Mask0 field of a particular PCR register may be used to configure the PMU 280 to monitor and count a first type of event for a first thread. In addition, SL1 and Mask1 may be used to monitor and count a second type of event for the same thread. PICH is used to store the count for events identified by SL1 and Mask1, and PICL is used to store the count for events identified by SL0 and Mask0. Consequently, the PIC register for a given thread may include two counters (PICH and PICL) which are both configurable via the corresponding PCR. The OV bit may be utilized as a software aid. For example, the OV bit may be used by software to determine which counter(s) has (have) wrapped. Once an OV bit is set, it can be reset by writing to the entire register, or by reading the register. Software may also cause an overflow trap by writing a 1 into any OV field and setting the corresponding TOE bit. Each of the HT, ST, and UT bits may be utilized to indicate privilege levels. For example, if the HT bit is set, events may be counted only when operating in hypervisor mode. Similarly, the ST bit may indicate events are counted only if executing in supervisor mode, and the UT bits may indicate events are counted only if operating in user mode. Generally speaking, PCR and PIC registers may be privileged. In such an embodiment, the PRIV bit may be utilized to cause a trap if user code attempts an access to a PIC register.

As noted above, each of the SL fields (SL0 and SL1) include 4 bits. Therefore, the SL field may identify one of sixteen classes, or categories, of events. The classes of events identified may include events which are somehow related to one another (completed branches and taken branches are both "branch" related). Alternatively, classes of events may include any arbitrary grouping of events desired. Each of the Mask fields in the embodiment shown (Mask0 and Mask1) includes 8 bits. In one embodiment, each of the eight bits of a Mask corresponds to an event within the class of events identified by the corresponding SL field. In this manner, the Mask field may identify a sub-class of events within a class of events identified by the SL field. For example, Table 2 below depicts possible encodings for SL and Mask fields. It is noted that numerous other encodings are possible and are contemplated. Table 2 is merely offered to illustrate how the SL and Mask fields may be utilized.

TABLE 2

| SL[3:0] Value | Mask[7:0] |
|---|---|
| 0 | — |
| 1 | — |
| 2 | 0x01 Completed Branches |
|   | 0x02 Taken Branches |
|   | 0x04 FGU Arithmetic Instructions |
|   | 0x08 Load Instructions |
|   | 0x10 Store Instructions |
|   | 0x20 sethi % hi(0xfc000), % g0 |
|   | 0x40 Atomics |
|   | 0x80 Other Instructions |
| 3 | 0x01 I-Cache Misses |
|   | 0x02 D-Cache Misses |
|   | 0x04 ITLB Misses |
|   | 0x08 L2 Cache Instruction Misses |
|   | 0x10 L2 Cache Load Misses |
|   | 0x20 L2 Cache Store Misses |
|   | 0x40 Other Event1 |
|   | 0x80 Other Event2 |
| 4-15 | Other event encodings |

In the exemplary encodings depicted in Table 2, two classes of events are illustrated. The first class of events shown corresponds to an SL value of 2 (0010) and the second class of events corresponds to an SL value of 3 (0011). Within each of the illustrated classes, eight mask encodings are depicted. While the mask encodings shown in Table 2 all illustrate encodings with only a single bit set, other encodings may include setting more than a single bit. To that extent, the Mask encodings illustrated serve to identify which bit(s) of the Mask are to be set in order to monitor the corresponding event. Utilizing the encodings depicted in Table 2, completed branches may be monitored by setting the SL register="0010" and the Mask="00000001". Alternatively, both completed branches and Load instructions may be monitored by setting the SL register="0010" and the Mask="00001001". Numerous alternative encodings are possible and are contemplated.

Figure 6:
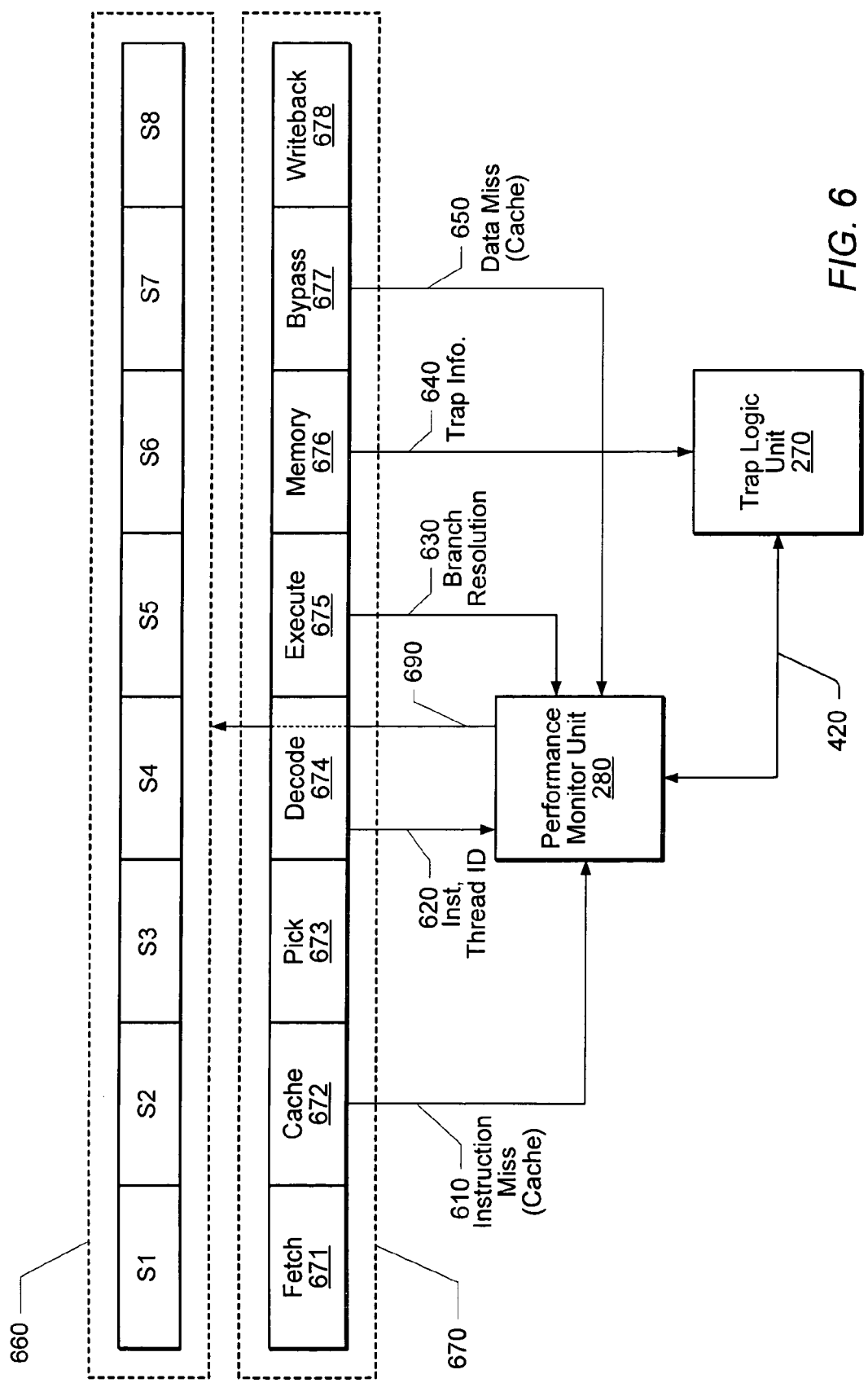
FIG. 6 depicts one embodiment of a pipeline, performance monitor unit, and trap logic unit.

Turning to FIG. 6, one embodiment of how PMU 280 may operate in relation to an execution pipeline within core 100 is shown. FIG. 6 depicts a pipeline 670 which generally corresponds to the pipeline described in relation to FIG. 3. Included in the pipeline 670 is an Fetch stage 671, Cache stage 672, Pick stage 673, Decode stage 674, Execute stage 675, Memory stage 676, Bypass stage 677, and Writeback stage 678. Also illustrated is a pipeline 660 of stored data with stages S1-S8 which correspond to each of the stages 671-678 in pipeline 670. Data stored within pipeline 660 may generally include identifying information for an instruction in the corresponding pipeline 670 stage. Such identifying information may include an identification of the instruction, a thread ID, any exception or trap information, and so on. Generally speaking, the associated information within pipeline 660 travels along the pipeline with the corresponding instruction. It is noted that while pipeline 660 is depicted as being separate from pipeline 670 (for ease of illustration), they may in fact be considered part of the same pipeline.

As may be seen from FIG. 6, PMU 280 is coupled to TLU 270 via bus 420. In addition, PMU 280 is shown to receive information from various stages of pipeline 670. For example, Cache stage 672 is coupled to provide an instruction (cache) miss indication 610 to PMU 280 via bus 610. Decode state 674 is coupled to provide instruction and thread ID information 620 to PMU 280 via bus 620. Execute stage 675 provides a branch resolution indication 630 to PMU 280, and Bypass stage 677 provides a data (cache) miss indication 650 to PMU 280. In addition, Memory stage 676 may provide trap related information to Trap Logic Unit 270 via bus 640. Finally, PMU 280 is coupled to TLU 270 via bus 420.

Generally speaking, PMU 280 may be configured to store information in pipeline 660 corresponding to event, or other, information detected during an instruction's traversal of pipeline 670. For example, if during Cache stage 672 an I-Cache miss is detected, a corresponding indication 610 may be conveyed to PMU 280 via signal(s) 610. If the PMU 280 is currently configured to monitor such events (i.e., I-Cache misses) for the thread which corresponds to the instruction which missed in the I-Cache, then PMU unit 280 may store an indication within pipeline 660 stage S2 which identifies the event, the instruction, the thread ID, and any other information desired. Similarly, upon decode of a particular instruction, Decode stage 674 may convey instruction and thread ID information to PMU 280 via bus 620.

As mispredicted branches may result in the entry of a spurious stream of instructions into pipeline 670, counts being maintained by the PMU 280 may be "polluted" by counting events which should not be counted. In order to avoid pollution of the performance monitor counts, branch resolution information conveyed via bus 630 may be used to suppress performance monitor counts and related information from the PMU unit 280. Suppressing performance monitor counts may simply entail preventing a particular counter from being incremented. In such an embodiment, incrementation of the performance monitor count must generally be delayed until the outcome of the branch is resolved. Alternatively, a mechanism to rewind and "reduce" counts may be included. Consequently, instructions which are flushed from the pipeline 670 (e.g., due to a mispredicted branch) do not pollute the performance monitor counters.

Figure 7:
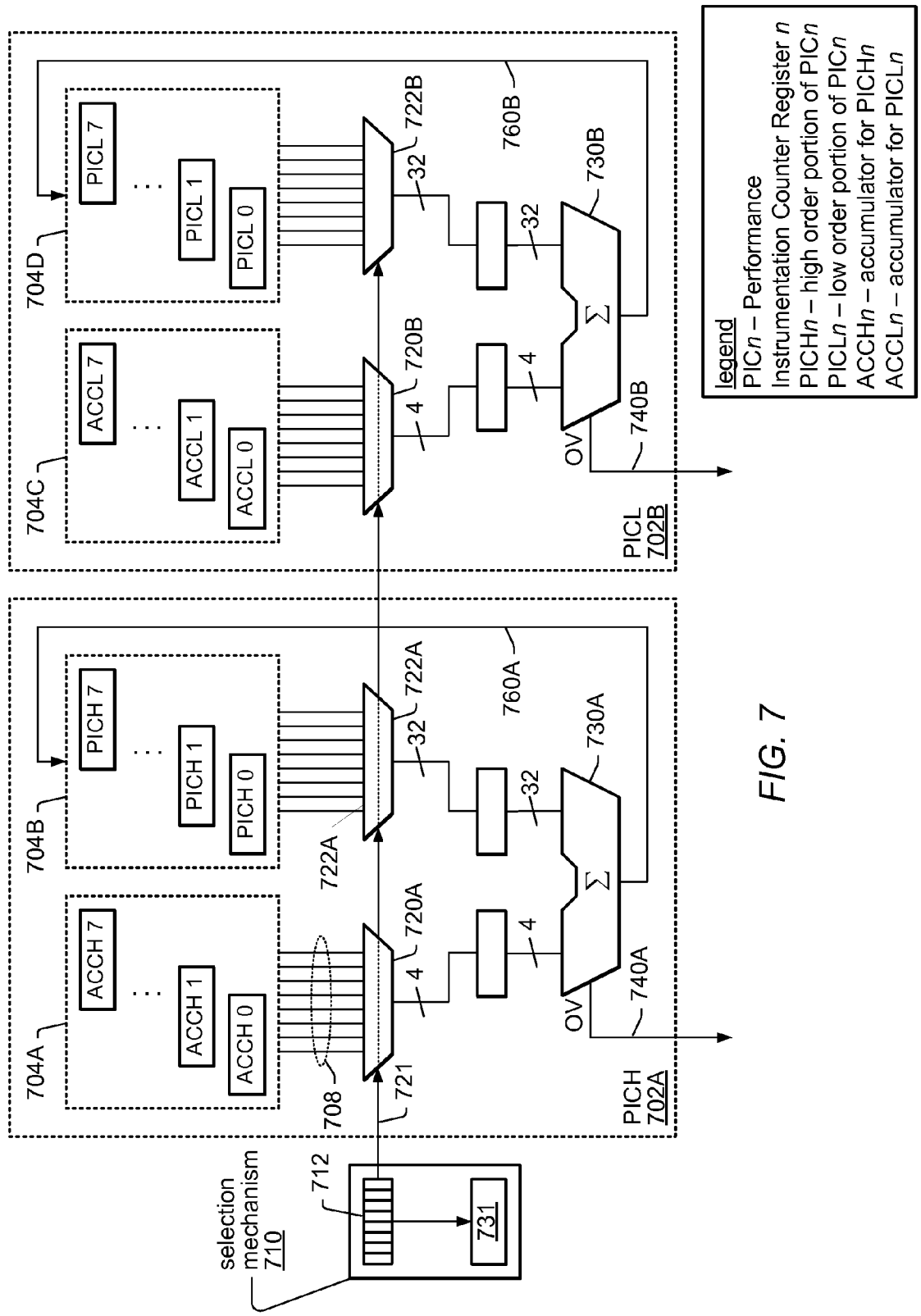
FIG. 7 illustrates one embodiment of a performance instrumentation mechanism.

FIG. 7 illustrates one embodiment of a performance instrumentation mechanism within PMU 280. Generally speaking, FIG. 7 depicts counter mechanisms which correspond to the PIC registers discussed above. As described above, each PIC register may be configured to maintain two counts/counters for a given thread. In the example of FIG. 7, a first counter mechanism PICH 702A corresponding to a "high" portion of each PIC register is shown and a second counter mechanism PICL 702B corresponding to a "low" portion of each PIC register is shown. Eight PICH registers 704B (PICH0-PICH7) and eight PICL registers 704D (PICL0-PICL7) are shown. In addition, each PICH and PICL register has an associated accumulator (ACC) register which is configured to store a temporary count of events detected. For example, PICH0 has an associated ACCH0 register, PICL3 has an associated ACCL3 register and so on. In the example of FIG. 7, eight ACCH registers 704A (ACCH0-ACCH7) are shown and eight ACCL registers 704C (ACCL0-ACCL7) are shown.

In the embodiment shown, each ACCH register 704A is coupled to a multiplexer 720A via a separate bus 708. Similarly, each PICH register 704B is coupled to a multiplexer 722A via a separate bus, each ACCL register 704C is coupled to a multiplexer 720B via a separate bus, and each PICL register 704D is coupled to a multiplexer 722B via a separate bus. Generally speaking, each multiplexer (720, 722) is configured to convey the contents of one of the eight coupled registers at a time. In one embodiment, each ACC register (ACCH and ACCL) comprises 4 bits and each PIC register (PICH and PICL) comprises 32 bits. Each of the values conveyed by the corresponding multiplexer (720, 722) may then be latched and summed (730A, 730B). In the event of an overflow from the addition, an overflow signal OV (740A, 740B) may be conveyed. In one embodiment, the overflow signals OV 740 are wired to update fields OV1 and OV0 of a corresponding PCR register 520. For example, if an overflow corresponding to register PICH0 is detected, signal OV1 740A is asserted and the OV1 field of register PCR0 is set. In this manner, if an overflow due to the addition 740A occurs, then one of the eight PCR0 to PCR7 OV1 fields are set to '1'. The particular PCR register to be updated may be identified by the thread ID 731 whose operation is discussed below. Similarly, if an overflow due to addition 740B occurs, a corresponding one of the eight PCR0 to PCR7 OV0 fields are set to '1'.

In one embodiment, each PIC register count is conveyed and updated on a periodic basis. For example, on a first cycle, the PICH0 and PICL0 register counts may be conveyed from multiplexers 722A and 722B, then on a second cycle the PICH1 and PICL1 register counts may be conveyed from multiplexers 722A and 722B. Concurrent with the conveyance of a particular register count, the contents of the corresponding ACC register are also conveyed. Therefore, on the cycle in which the PICH0 register count is conveyed, the contents of the ACCH0 register are also conveyed. FIG. 7 illustrates a selection mechanism 710 which is configured to control which values are conveyed from multiplexers 720 and 722 using signal 721. In an embodiment wherein each multiplexer (720, 722) is configured to convey one of eight values, signal 721 may comprise 3 bits. As the value conveyed by mechanism 710 via signal 721 selects one of eight sets of registers at a time (PIC0-PIC7), the value conveyed by mechanism 710 may also be seen as corresponding to a particular thread. Therefore, a value of "000" may be conveyed via signal 721 in order to select and convey thread 0's PIC register values (PICH0 and PICL), and so on.

In an alternative embodiment, signal 721 may comprise eight bits—one of which is set in a given period for selecting a thread. In one embodiment, mechanism 710 may comprise rotating bits in a register 712 which are used by multiplexers 720 and 722 to select on of eight values for conveyance. Each cycle, a set bit rotates within register 712 to indicate which of the eight threads are selected. In either embodiment, the value of signal 721 which is conveyed, and a latch 731, may represent the currently selected thread ID.

In one embodiment, the value within a given PIC register (PICH and PICL) is added to its corresponding ACC register during each period in which the registers are selected by mechanism 710. If the sum of the register values equals a predetermined value, a trap signal may be generated and conveyed. For example, in one scenario a trap is to be taken upon detecting 3000 I-Cache misses for a thread with thread ID=2. Therefore, PCR2 may be configured such that PICH2 keeps a count of I-Cache misses. PICH2 may then be initialized to the value −3000. Accordingly, for the embodiment shown where each PICH register includes 32 bits, the PICH2 register may be initialized to 0xFFFFF448. In this manner, the addition of 3000 (0xBB8) to the initial value (0xFFFFF448) will cause the register to wrap to zero which may be easily detected. In this embodiment, ACCH2 then is configured to keep a count of I-Cache misses which are then periodically added to the count stored in the corresponding PICH2 register.

As the illustrated embodiment is only configured to check event counts for a given thread on a periodic basis, and the number of events which may be detected within a corresponding period may be known, the size of the ACC registers may be chosen accordingly. For example, in one embodiment up to 2 events per cycle per thread may be detected. In addition, the counts for a given thread may be checked and updated once every eight cycles. Accordingly, up to 16 events may be detected since the time a thread's counts were last updated. Therefore, each ACC register may register no more than 16 events during the given period and 4 bits is sufficient to account for this maximum number of events. Of course, other embodiments may be configured to detect more than 16 events during a given period and the ACC registers may be chosen to be larger.

Subsequent to adding the detected event count within an ACC register to a corresponding PIC register count, the sum 760 of the values is conveyed back to the same PIC register where it is latched. In this manner the PIC register maintains a cumulative count of events detected over time. Subsequent to adding the ACC count value to the corresponding PIC count value, the ACC register may be cleared.

Figure 8:
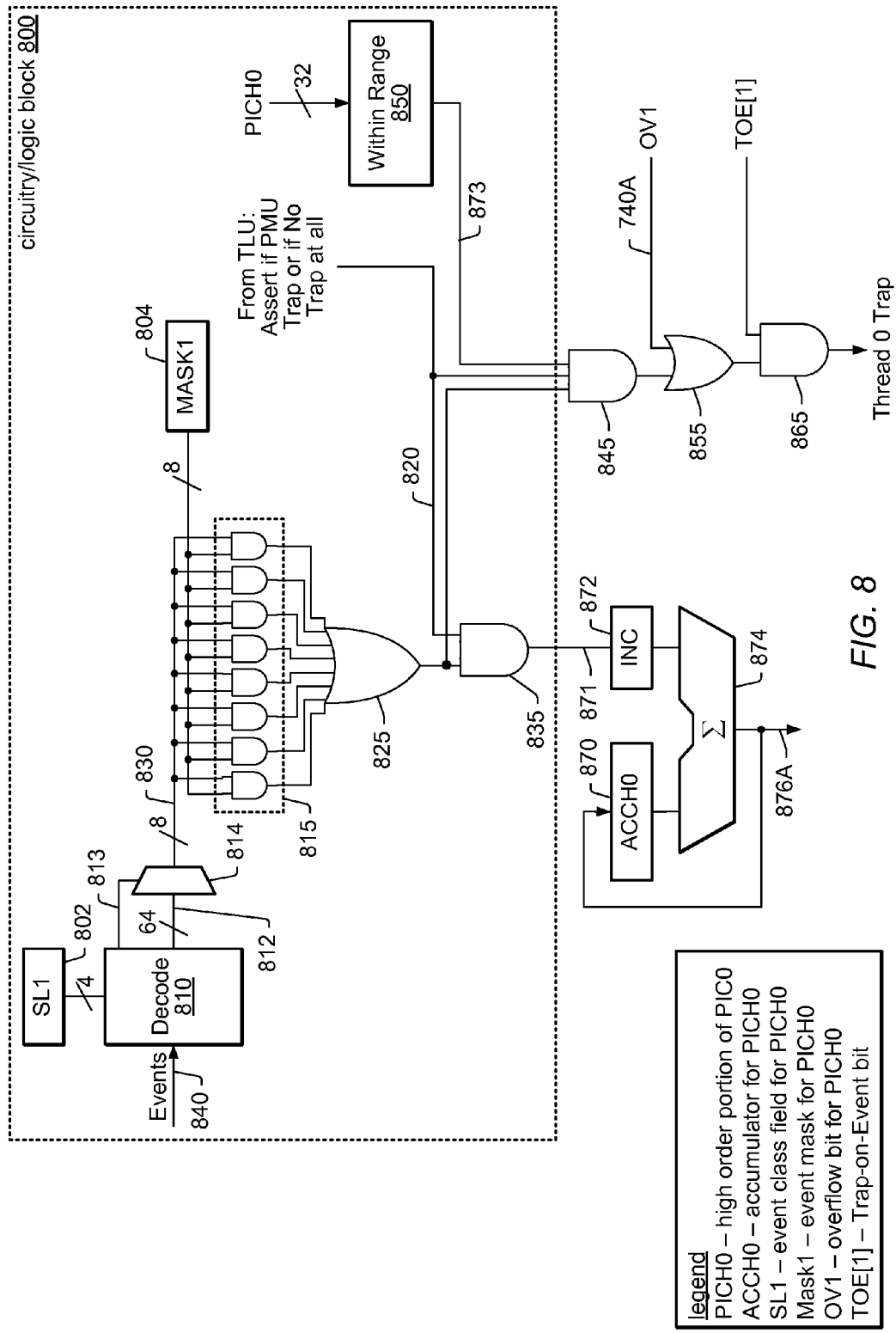
FIG. 8 depicts one embodiment of event counting logic corresponding to the instrumentation depicted in FIG. 7.

Turning now to FIG. 8, one embodiment of logic associated with one of accumulator and PIC registers 704A-704D is shown. In general, logic similar to that depicted in FIG. 8 is associated with each of the accumulator and PIC registers 704. In the example shown, PCR register fields SL1 802 and Mask1 804 are shown. Also shown is an accumulator register ACCH0 870. Generally speaking, the circuitry and logic depicted by block 800 is configured to convey a signal 871 which indicates whether an event to be counted has been detected. In response to signal 871 being asserted, logic 872 conveys a value of "1" to summation logic 874 which adds the received value of "1" to the current value of the ACCH0 register 870. In this manner the value of the ACCH0 register 870 is incremented. Likewise, the sum of the ACCH0 register 870 and the value conveyed by logic 872 are conveyed via bus 876A.

As described in Table 1, the SL1 field 802 may include 4 bits capable of identifying one of 16 classes of events. In addition, Mask1 804 includes eight bits and may identify a subclass of events. In one embodiment, the SL1 field 802 may be used to identify only 8 classes of events. For example, SL1 values of 0-7 may be actively used for identifying classes of events, while SL1 values of 8-15 may be reserved for other purposes. Of course numerous such alternatives are possible and are contemplated.

In the embodiment shown, Decode logic 810 is configured to receive the 4 bits of the SL1 field 802. In addition, also conveyed to decode logic 810 is an indication 840 identifying a detected event. Decode logic 810 is coupled to a multiplexer via a 64 bit bus 812. In one embodiment, the 64 bits of the bus 812 represents 8 bits for each of 8 classes of events. SL1 bits 802 may then be decoded to provide a signal 813 for conveying a particular group of 8 bits from the multiplexer 814. Generally speaking, the group of bits selected for conveyance from the multiplexer 814 corresponds to a class of events which is being monitored. In one embodiment, only 8 classes of events are actively monitored. Accordingly, fewer than all 4 bits of the SL1 field 802 may be required.

In response to receiving an event indication 840, Decode logic 810 asserts the bit(s) of bus 812 which correspond to the detected event. If the SL1 field 802 is configured to monitor a class of events which corresponds to the detected event, the 8 bits corresponding to the class of the detected event will be selected for conveyance from the multiplexer 814 via bus 830. On the other hand, if the SL1 field is not currently configured to monitor classes of events which include the detected event, bits corresponding to the detected event will not be selected for conveyance from the multiplexer 814.

Each bit of bus 830 is coupled to one of 8 logic AND gates 815. In addition, each of the AND gates 815 is also coupled to receive as input one of 8 bits of the Mask1 804. Consequently, if one or more bits of the Mask1 804 are currently set, and a corresponding bit of bus 830 is also asserted, the output from the corresponding AND gate will likewise be asserted to indicate detection of a monitored event. Still further, the assertion of any of the inputs of logic OR gate 825 will results in the output from OR gate 825 being asserted. Generally speaking, the output from logic OR gate 825 may indicate an event which corresponds to a monitored class of events has been detected.

However, as not all events are to be counted, an additional signal 820 may be utilized to qualify detected events. In the embodiment shown, the TLU 270 may convey a signal which indicates whether a trap corresponds to a PMU 280 trap or otherwise. If the TLU 270 is indicating a trap, then any currently detected event conveyed from OR gate 825 should not be counted unless the trap is the result of PMU 280 activity. For example, upon a mispredicted branch, the TLU 270 may take a trap. In such a case, instructions along the mispredicted branch path may be flushed from the pipeline. In order to avoid polluting the performance monitor counts, events corresponding to the flushed instructions should not generally be counted. Accordingly, the output from OR gate 825 may feed logic AND gate 835 along with signal 820. If no trap is detected, signal 820 is asserted. In addition, a PMU related trap will cause assertion of signal 820. Signal 820 is negated in the event of a non-PMU trap. In this manner, the signal conveyed from OR gate 825 may be additionally qualified by signal 820, with the resulting signal being signal 871.

In an embodiment where 8 of 16 identifiable events encodings of the SL1 field 802 are reserved, the 4 bits of the SL1 field 802 may be decoded to 8 bits, each of which corresponds to one of the 8 remaining classes of events which may be monitored. Each of the 8 bits conveyed via bus 812 to an 8:1 multiplexer may then correspond to a single class of events. In addition, decode logic 810 may also determine to which of the 8 classes of events a detected event 840 corresponds. Based upon this determination, a select signal 813 may be asserted which selects the corresponding class of events from bus 812. If select signal 813 (corresponding to a detected event) selects for conveyance from multiplexer 814 a bit which corresponds to an event being monitored (as indicated by SL1 field 802), then the signal 830 will be asserted. Those skilled in the art will appreciate there are numerous alternative ways of decoding, masking, and combining the signals depicted in FIG. 8. All such alternatives are contemplated.

FIG. 8 also depicts a comparator 850 coupled to receive the value of a given PICH or PICL register (PICH0 or PICL0). Comparator 850 is further configured to convey a signal 873 to logic AND gate 845. Generally speaking, the comparator 850 is configured to determine whether the received value of a PICH or PICL register is within a given range, or epsilon, of a predetermined value (e.g., 0). If the value of the PIC register is within the given range of the predetermined value, then signal 873 is asserted. Further, if a performance event occurs which does not correspond to a flushed instruction as described above, then AND gate 845 generates a signal to logic OR gate 855 which signals that the respective PICH or PICL register may overflow. This signal 873 thus identifies an instruction which should be counted and potentially trapped on. Logic OR gate 855 is further coupled to receive as input the current value of the overflow field OV for the corresponding PCR register. In the example shown, OR gate 855 receives as input OV1 signal 740A which was described in FIG. 7. Consequently, the output of OR gate 855 will be set if either the OV1 signal 740A is set or the output of logic AND gate 845 is asserted. In one embodiment, the output of logic OR gate 855 may be further qualified by a corresponding TOE field as described in Table 1. In the example of FIG. 8, the output of logic OR gate 855 is fed to logic AND gate 865 which also receives as input the TOE[1] bit for the corresponding PCR register (PCR0 in this example). Therefore, when asserted, the output of logic AND gate 865 signals a trap for the corresponding thread. It is noted that AND gate 835 in this case will allow the accumulator 870 to be incremented, properly recording the fact that an event occurred. The addition of the accumulated value 876A to the PIC register in 730A-B will thus correctly result in the PICH or PICL register being properly updated to reflect the correct number of performance events which occurred.

In one embodiment, comparison logic 850 determines whether the received value is within a fixed count (e.g., 15) of zero. For example, in the scenario described above, each PIC register (PICH and PICL) includes 32 bits. If 3000 I-Cache misses are to be detected, a given register PICH2 may be initialized to the value 0xFFFFF448 (i.e., −300010 in this example). Each time the PICH2 is selected by mechanism 710 for updating, the count stored in corresponding ACCH2 is added to the value stored in PICH2. Then comparison logic 850 may determine whether the value stored in PICH2 is any value within 15 of zero. For example, comparison logic 850 may detect whether the PICH2 count equals any of values −15, −14, −13, . . . −2, or −1. Therefore, if the value received by comparison logic 850 is anywhere between 0xFFFFFFF0 and 0xFFFFFFFF, comparison logic 850 will convey an indication that the trapping event (i.e., detection of 3000 I-Cache misses) has occurred. It is noted that the range which comparison logic 850 checks may be either hardwired or configurable (e.g., via a configuration register).

While it is possible that the comparison logic 850 may convey an indication that a particular event occurred prior to its actual occurrence (e.g., an indication that 3000 I-Cache misses have occurred when only 2991 have actually occurred), the mechanism ensures that the instruction causing the event which resulted in the I-Cache miss indication is in fact a type of instruction which is being monitored for causation of I-Cache misses. In this manner, the instruction identified by the PMU 280 does in fact correspond to the class of instruction which is being monitored.

As an example, consider the case of a load instruction in a loop which causes many more data cache misses than other loads. Each time this load is executed, and causes a cache miss, the counter is incremented. If the counter is within some epsilon (e.g., 15) of wrapping, then a trap is registered and a corresponding signal conveyed. Software may then correctly identify this load as the instruction which was executing when a cache miss occurred, even though the counter has not yet wrapped. This may be considered equivalent to sampling the cache miss on a different iteration of the loop than would be the case if the counter actually wrapped. However, this does not affect the conclusion that this load instruction may be responsible for most cache misses.

Similarly, consider a case where there are two load instructions which cause most of the misses. In this case, given a large enough number of samples, the trap will be taken on one of these 2 load instructions. Again a trap may be taken as described above and diagnostic software may be utilized to isolate the important program statements. Even if it turns out that only one of the load instructions is always recorded as executing when the trap is taken, software may correctly identify this load and its associated program statement. Once corrected, software can rerun and the remaining load will be seen as causing the most cache misses.

It should be noted that a trap will not generally be indicated except on a class of instructions which actually experience the event. For example, if a trap was signaled on a load instruction which did not have a cache miss, then it would be more difficult for diagnostic software to isolate the load(s) which actually cause the majority of the cache misses. In such a case, the sample may falsely point to an unrelated event and effectively inject noise into the analysis.

Finally, it should be noted that is generally desirable that hardware generate precise traps in order for software to be effectively utilized. A trap is precise if, when control is transferred to the software trap handler, all instructions prior to the one causing the trap have completely executed, and neither the instruction causing the trap nor any subsequent instructions have been executed. In a pipelined embodiment, then, it becomes necessary to suppress the effect of an instruction which traps as well as instructions from the same thread which are at earlier stages in the pipeline. In the absence of a method and mechanism such as that described above, meeting these desired goals may be quite difficult.

For example, consider a case where software has configured a PIC to count load instructions and there are multiple instructions from the same thread in the pipeline. In particular consider a case where there may be a load instruction in each or any pipeline stage of FIG. 6, all from the same thread. Ideally hardware should be able to identify the exact load which will cause the counter to wrap. However, this may generally require mass-balance logic in conjunction with multiple comparators. For example, assume the PIC has a value of −1. Then the first (oldest) load in the pipeline will cause the counter to wrap. Referring to the pipeline stages in FIG. 6, in one embodiment the load in Bypass (being the oldest load in the pipeline) will cause the counter to wrap. But, if there is no load in Bypass, and there is a load in Memory, then that load will cause the counter to wrap. Similarly, if there is no load in Bypass or Memory, the load in Execute will cause the counter to wrap. Similarly this can be carried all the way to Decode where an instruction type (load, store, branch, etc.) is discovered and becomes known.

Now consider the case where the PIC has a value of −2. In this case the 2nd load in the pipeline will cause the counter to wrap. So it is clear to one of ordinary skill in the art that the logic for pinpointing which load will cause a trap needs to be qualified based upon the current value of the PIC for that thread, and how many loads from that thread precede this load in the pipeline. The logic to accomplish this may quickly become untenable as the number of threads, the number of pipeline stages, and the number of different events grows. Yet in the exemplary embodiment described above, comparator 850 in conjunction with AND gate 845 enables hardware to identify an instruction as a precise "candidate" which may cause a PIC to overflow. In turn this enables the TLU 270 to identify both the thread ID and the pipeline stage such that all later instructions from that thread should be suppressed. In turn this enables the hardware to transfer control via a precise trap to a software trap handler.

Thus the above mechanism may, in a sense, be seen as a "fuzzy" trap implementation. This approach may generally simplify hardware design and still allow software to effectively debug performance issues. In large part, the following may be met by the above described approach: First, hardware indicates a trap upon overflow within an appropriate precision of when the trap would actually occur and the precision (epsilon) is small enough such that it may be deemed relatively insignificant given a sufficiently large sampling interval. In addition, the trap is generally indicated only for a class of instructions which actually experienced or caused the performance event, and not on unrelated instructions. Second, hardware maintains an accurate count of performance events.

Hardware counts only the events it is actually configured to count, suppresses speculative events whenever possible, and accurately counts events which did in fact occur. Third, in a pipelined embodiment, it enables hardware to take a precise trap on a candidate instruction which caused the performance event.

Application of Performance Instrumentation Mechanisms to Data Space Profiling

The performance instrumentation mechanisms described herein may be applied to a system and method for data space profiling of applications executing on a given computer system. Data space profiling is described in greater detail in commonly assigned, co-pending U.S. patent application Ser. No. 11/517,085, entitled, "Method and Apparatus for Specification and Application of a User-Specified Filter in a Data Space Profiler", filed Sep. 7, 2006, and naming Nicolai Kosche, Oleg V. Mazurov, and Martin S. Itzkowitz as inventors; and commonly assigned, co-pending U.S. patent application Ser. No. 11/516,980, entitled, "Method and Apparatus for Sorting and Displaying Costs in a Data Space Profiler", filed Sep. 7, 2006, and naming Nicolai Kosche, Arpana Jayaswal, and Martin S. Itzkowitz as inventors, which are incorporated herein by reference in their entirety.

Modern computer systems may use increasing numbers of ever-faster processors to solve larger and larger problems. However, performance of those processors may be limited by the need to supply data to them at ever increasing rates. In some systems, a hierarchy of caches between the processors and main memory may be used to improve performance. In these systems, the processors may run at full speed when using data from the caches closest to the processors, but may be frequently stalled loading data from or storing data to the primary caches through secondary or tertiary caches and, ultimately, to or from main memory. Understanding how an application's data is structured in memory and how it passes from memory through the cache hierarchy may facilitate understanding and improving the performance of applications on these systems.

The data space profiler described herein may provide per-instruction details of memory accesses in the annotated disassembly, and may provide data aggregated and sorted by object structure types and elements, in some embodiments. This may in some embodiments provide a new observability perspective for application developers. For example, the underlying framework of the profiler may provide a system and method for providing cache miss data to compilers and dynamic code generators, thus allowing cache-related application optimizations. The system and method may be applied to profiling data related to other types of runtime events, or execution hindrances, in some embodiments.

While conventional profiling tools provide per image, per procedure, per source line, or per instruction level profile information, these tools do not provide profile information in relation to other aspects of code behavior. In particular, conventional profiling tools do not perform data space profiling. For example, while the majority of stall time may be caused by memory related operations or load type instruction instances, conventional tools do not provide information about these memory related operations from the perspective of data profiling objects, addresses (identifiers) of data profiling objects, or data profiling object definitions. Hence, conventional profiling tools do not provide information about data profiling objects that consume the most execution time. In addition, conventional tools do not correlate multiple code behavior attributes to consumed execution time. A system and method of data space profiling, as described herein, may allow the application developer (user) to optimize application code, data structures, memory hierarchy, and/or other hardware and software components by helping him or her understand the relationships between and contributions of these elements to the performance of the application.

In the following description, references are made to source-level data objects, data objects, data profiling objects, profiling objects, extended addresses, extended address elements, address elements, runtime events, sampled runtime events, instruction instances, and language constructs. The terms "source-level data object" and "data object" may be used to describe any of various representations of data identifiable in source code, including variable names, data types, data structures, elements of data structures, data type definitions, operands, statically linked objects, expressions, etc. The terms "data profiling object" and "profiling object" may be used to describe any hardware component, software construct, data allocation construct (e.g., virtual to physical memory mappings done at runtime), or user-defined abstract component from whose perspective costs may be viewed. The term "extended address" may refer to a vector containing a plurality of "extended address elements" or "address elements", each of which represents an identifier associated with a runtime event from the perspective of a particular data profiling object. The term "runtime event" may be used to describe an event that occurs during execution of code (e.g., during execution of a software application being profiled). For example, runtime events may represent data references, cache misses, cache references, data translation buffer misses, data translation buffer references, branch mispredictions, etc. Runtime events may be of particular interest because they may hinder execution of an application. For example, runtime events may consume execution time, or may be associated with consumption of execution time; hence, execution hindrance may be revealed in terms of execution time. "Sampled runtime events" may comprise a subset of all runtime events and may in some embodiments statistically represent all runtime events for a given execution run of a software application. The term "code behavior attribute" may refer to a cost metric, an extended address element or any other attribute associated with a runtime event. For example, a time (e.g., a timestamp value), a program counter (PC) value, execution time, number of cycles, virtual address, or process identifier (PID) may all be considered code behavior attributes, in some embodiments. They may also be considered extended address elements, in various embodiments. These attributes (or their values) may be used by the profiler in filtering and sorting profile data and in defining custom profiling objects and/or cost metrics, in some embodiments. The term "instruction instance" may be used to describe an instance of an instruction or machine operation, such as a macro instruction or a micro instruction, which corresponds to a construct in a source-level representation of program code. For example, an instruction instance may be an instance of a load type instruction. Finally, the term "language construct" may be used to describe a syntactically allowable portion of code formed from one or more lexical tokens in accordance with the rules of a source-level programming language.

In some embodiments, instruction sequences and computer program products may be made using techniques in accordance with the present invention. For purposes of description, certain aspects of the present invention are detailed in the context of data profiling that includes associating sampled cache miss runtime events with different code behavior attributes, such as values of physical addresses, source-level data objects, or other data profiling objects and that includes presenting profile data that has been filtered based on addresses and source-level data objects. More generally, data space profiling may in some embodiments include associating any runtime event with one or more extended address elements and/or source-level data objects and presenting profile data filtered with one or more other code behavior attributes (e.g., source-level data object definitions, source-level data object addresses, stall time, cycle time, function/methods, instruction instances, etc.).

Overview of Data Space Profiling

Providing source-level data object profile information along with other data profiling object information may in some embodiments allow targeted and more efficient optimization of application code. The combined profile information may enhance understanding of code behavior generally and with regard to specific hardware and/or software platforms. Correlating traditionally collected code behavior attributes and data profiling object profile data may further enhance understanding of code behavior.

Profiling may in some embodiments involve translating code, executing the translated code and collecting statistical profile data about the code during execution, analyzing the collected profile data, and providing the analyzed profile data. In some embodiments, the profile data collected and analyzed following a runtime event may include execution costs associated with data movement in addition to, or instead of, traditionally collected profile data. In some embodiments, the profile data may be indexed according to multiple extended address elements associated with the event.

Tagging code during code translation may provide the basis for identifying relationships between code execution time and language constructs representing source-level data objects of the code, in some embodiments. During data collection, sampled runtime events that consume execution time may be attributed to source-level data objects based on the tagging, in these embodiments. Profile data may then be presented that facilitates identification of execution hindrances based on one or more source-level data objects.

During data collection, profile data, including correlations between extended address elements and sampled runtime events, may be collected. In some embodiments, while collecting this data, a determination may be made as to the validity of the addresses. If an address is determined to be valid, then the corresponding runtime event may be attributed to the valid address. Otherwise, an indication that the address is invalid may be made. The profile data, including any correlations between data addresses and execution hindrance, may be provided, and may facilitate optimization of the code, in some embodiments. In some embodiments, these correlations may be based on the association between data addresses and sampled runtime events.

Furthermore, correlations between multiple code behavior attributes may be presented, in some embodiments. For example, data illustrating correlations between traditionally collected code behavior attributes (e.g., execution time) and the additional code behavior attributes associated with data profiling (e.g., virtual or physical addresses) may be presented. Profile data revealing execution hindrances may be aggregated based on source-level data objects, profiling object profile data and other code behavior attributes, in different embodiments. In some embodiments, profile data may be aggregated based on a first code behavior attribute, and then filtered based on an instance of the first code behavior attribute. The aggregated and filtered profile data may then be aggregated and filtered based on one or more additional code behavior attributes. In some embodiments, this capability to aggregate and filter profile data based on multiple code behavior attributes may allow code optimization decisions to be made based on presentation of profile data from various perspectives and on correlations between various code behavior attributes, including source-level data objects, their addresses, their definitions, instructions, functions/methods, etc.

Figure 9:
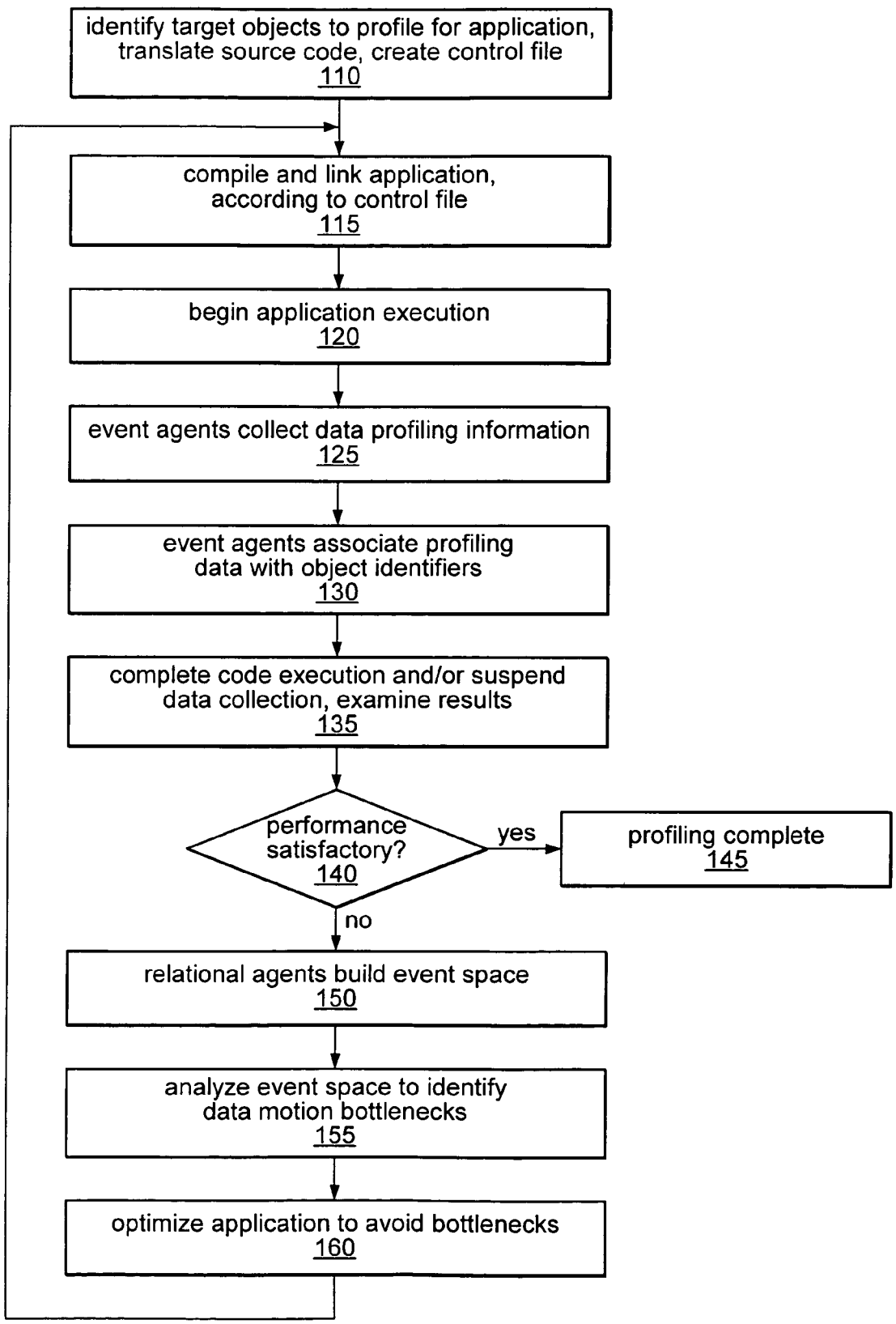
FIG. 9 illustrates a method for performing data space profiling, according to one embodiment.

An exemplary method for performing data space profiling, as described above, is illustrated by the flow chart in FIG. 9. In this example, a developer (user) may first identify target objects to profile for a given application, as shown in 110. These objects may include hardware components and/or programming (software) structures, in different embodiments. The user may create a control file specifying associations between hardware components and identifiers thereof, relational agents (functions) defining user-specified data objects, presentation (display) options, etc., in some embodiments. In some embodiments the user may translate the source code of the application to be profiled, such as by annotating the code to add tags or index structures. The source code may be a function or procedure, a library file, a data object class, a segment of code from an application, code for an entire application, etc., and may be written in any source-level language including, but not limited to, C, C++, Java, Lisp, Basic, Perl, COBOL, Fortran, etc. In some embodiments, software event agents may be inserted into the source code to assist in collecting profile data.

In addition to the user-specified relational agents, standard or platform/application-specific relational agents may be generated for use in profiling an application, in some embodiments. In some embodiments, these relational agents may be generated by operating system software, such as by the compiler system or by a stand-alone component of the operating system configured for this purpose. These relational agents may be configured to associate various address elements with instructions, instances and data types, in some embodiments. For example, relational agents may associate procedures, line numbers, load objects, etc., with instructions. In another example, relational agents may associate scalars or complex data definitions with data types. In yet another example, relational agents may associate variable names and/or locations with instances of instructions. In some embodiments, standard or platform-specific relational agents may be generated by the operating system in parallel with the compilation of the application to be profiled, and may be dependent on the application itself and/or an associated control file.

The operating system may also include various software event agents, in some embodiments, and/or may be configured to receive profile information from hardware event agents and to store or communicate this data for use during an analysis phase.

After the code and control files have been prepared, the application may be compiled and linked with all applicable files, functions, tasks, etc., needed to support profiling, as shown in 115. Execution of the application, as shown in 120, may in some embodiments include the steps of booting the collection framework, and then transferring control to the application program itself. Booting the collection framework may include initializing hardware event agents, interposing any address space modifications (e.g., changes to the address space made by the operating system) and allocating repositories for profile data collected during execution, according to various embodiments. For example, in one embodiment, each thread of a multi-threaded process may be allocated a separate repository for storing profile data, and each thread may be allocated a different portion of the available address space.

Thus, the separate repositories may be thought of as per-thread or per-address-space repositories, in such embodiments.

Once control is transferred to the application, event agents may begin collecting profiling information, as in 125. In some embodiments, when certain hardware events occur, one or more software event agents may be executed in order to collect more profile data than any hardware agents collecting data for that event. Event agents may associate collected profiling data with various object identifiers, as will be discussed in more detail later. This is illustrated at 130. The collected and associated profiling data may be stored in per-thread repositories, as described above, or in any suitable data structure, such as files, registers, tables, linked lists, databases, etc., for later use by the analyzer.

At 135, execution of the application may end, in some embodiments, before analysis begins. In other embodiments, the application may continue to run and collect more profiling data, or the application may continue to run, but with data collection disabled during analysis. The initial results may be examined at this point, in some embodiments.

At 140, it is determined if the performance of the application is satisfactory, in this example. In some embodiments, if the performance is satisfactory, profiling may be complete, as in 145. If not, analysis of the profiling data may be initiated in order to identify and correct performance bottlenecks. In some embodiments, analysis may be performed even if the initial performance results were acceptable, such as in order to further optimize an acceptable application.

To being the analysis phase, relational agents may be applied to the profile data collected by event agents and may be used to build the event space, as in 150. The event space may in some embodiments include multi-dimensional correlations between costs (such as execution time), programming language constructs (such as functions) and hardware components (such as cache lines.) Relational agents may build the event space by recursively operating on each element of the profile data collected by event agents, in some embodiments. This will be described in more detail later.

The analysis engine may in some embodiments be used to probe the event space in order to identify performance bottlenecks, such as those related to data motion in the system. This is illustrated at 155. This analysis may include displaying costs associated with various hardware and software components of the system and the application being profiled, in some embodiments. The analysis may also include filtering the profile data for a given data object and aggregating the data with respect to additional data objects and/or filter criteria, in some embodiments. The analyzer may display the aggregated and filtered profile data by writing to a profiling report file, for example, or may include a graphical user interface that allows the developer to select data objects to display, zooming and position options, binning (aggregation) functions, filter clauses, etc. The analysis engine and an exemplary graphical user interface for the analyzer will be described in more detail later. As noted at 155, the use of the analysis engine and graphical user interface thereof may allow a user to identify data motion bottlenecks from the event space data, such as those caused by resource sharing or conflicts between resources, in some embodiments. These tools may also allow the user to identify the root cause of the bottleneck, by allowing the user to display the extended address associated with a runtime event, and to trace the data motion back to source code. For example, the analyzer may allow a user to determine that a particular variable is being inefficiently shared between two threads.

Once any bottlenecks and their underlying causes have been identified, the application may be optimized to correct a conflict, reduce sharing, or make whatever changes may be needed to avoid the identified bottleneck, as in 160. In some embodiments, this may be done by the developer, while in other embodiments, the results of the data profiling analysis may serve as an input to an optimizing compiler or code generator, which may take advantage of this information to produce optimized code.

Translating Code

When translating application code for profiling, annotations may be made to source code for use during data collection. In some embodiments, these annotations may be used to connect source-level language constructs that represent source-level data objects to runtime events. For example, language constructs, such as labels or define statements, may be added to source code and these constructs may be associated with runtime events.

Figure 10A:
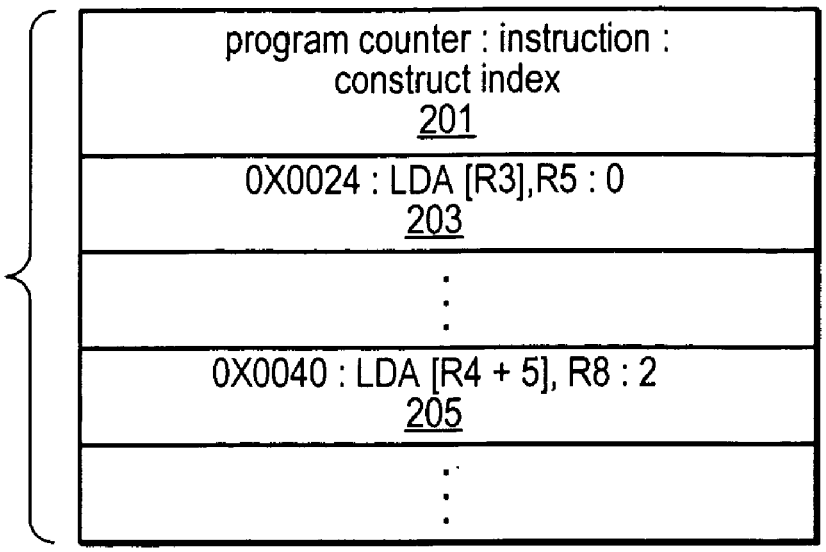
FIGS. 10A and 10B are block diagrams illustrating annotation of code to associate instruction instances with language constructs of source-level data objects, according to various embodiments.
Figure 10B:
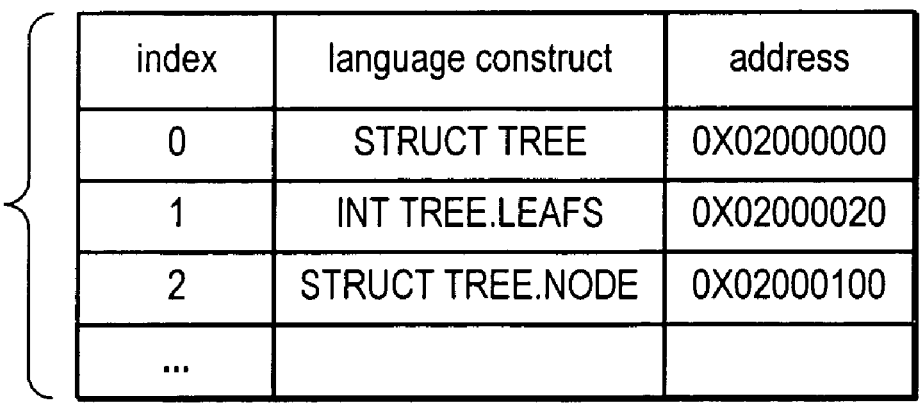

In another example, code may be annotated to insert an instruction index construct into the code, in one embodiment, and the index may be mapped to a source-level language construct and/or an extended address element. This is illustrated in FIGS. 10A and 10B. These diagrams illustrate annotation of code to associate instruction instances with language constructs of data objects, according to various embodiments. FIG. 10A is a block diagram of annotated code, according to one embodiment. FIG. 10B is a block diagram of a language construct index table, according to one embodiment.

Although FIGS. 10A and 10B illustrate one level of indirection for code annotation (i.e., one table lookup to determine a data language construct that corresponds to an annotation), in other embodiments there may be more than one level of indirection, or no indirection.

The annotated code shown in FIG. 10A includes code lines 201, 203, and 205. In this example, each code line includes a program counter, an instruction instance, and a construct index, as indicated in code line 201. For example, code line 203 includes an instruction instance LDA [R3], R5 at program counter 0x0024. Code line 203 has been tagged with the construct index "0". Code line 205 includes an instruction instance LDA [R4+5], R8 at program counter 0x0040, and has been tagged with the construct index "2". In other embodiments, code lines may be tagged differently and/or may include different elements. For example, code annotations may be added in a separate section of the code, may be inserted inline with the code, or may be in a separate file, according to different embodiments.

The exemplary language construct index table 231 of FIG. 10B illustrates example entries corresponding to the tags (i.e., construct indices) shown in the annotated code 209 of FIG. 10A. The language construct index table 231 includes construct index entries 0-2. Construct index 0 corresponds to the source-level data object STRUCT TREE, which is a structure TREE. Construct index 1 corresponds to the source-level data object INT TREE.LEAFS, which is an integer data type that is an element of the structure TREE. The construct index 2 corresponds to the source-level data object STRUCT TREE.NODE, which is a structure NODE that is an element of TREE. Annotations and language construct index tables, such as those illustrated in FIGS. 10A and 10B, may in some embodiments be used during data collection to associate a sampled runtime event with a source-level data object language construct. The language construct index table 231 also indicates exemplary addresses of the source-level data objects.

Annotated code, such as annotated code 209, may in some embodiments be byte code specific to a platform, or may be generic across multiple platforms. Source-level data object language constructs may be indexed according to a variety of techniques in different embodiments. Source-level data objects may be indexed with respect to different source-level data objects in a sequential or hierarchical manner, according to different embodiments. In addition, other types of data objects (e.g., physical addresses, data object types) may be indexed, in some embodiments.

Annotations or tagging done during translation and/or generation of code may in some embodiments provide the basis for associating sampled runtime events with source-level data object language constructs during data collection and later analysis. As previously noted, this information may facilitate a targeted and efficient optimization of code with respect to data objects.

Collecting Profile Data

During code execution, profile data may be collected and recorded by various software and/or hardware event agents, examples of which will be described in more detail later. In some embodiments, profiling may be based on the collection of statistical data during execution of code. In some embodiments, statistical data may not be collected for every runtime event because the overhead may significantly impact performance of the code. Therefore, as previously described, in some embodiments, runtime events may be sampled. In some embodiments, in order to provide more detailed information about code behavior, additional information may be collected about runtime events than is collected using a traditional profiling tool. For example, in some embodiments, information may be collected that facilitates associating runtime events with source-level data object language constructs or other extended address elements associated with the events. One such embodiment is illustrated in FIG. 11.

Figure 11:
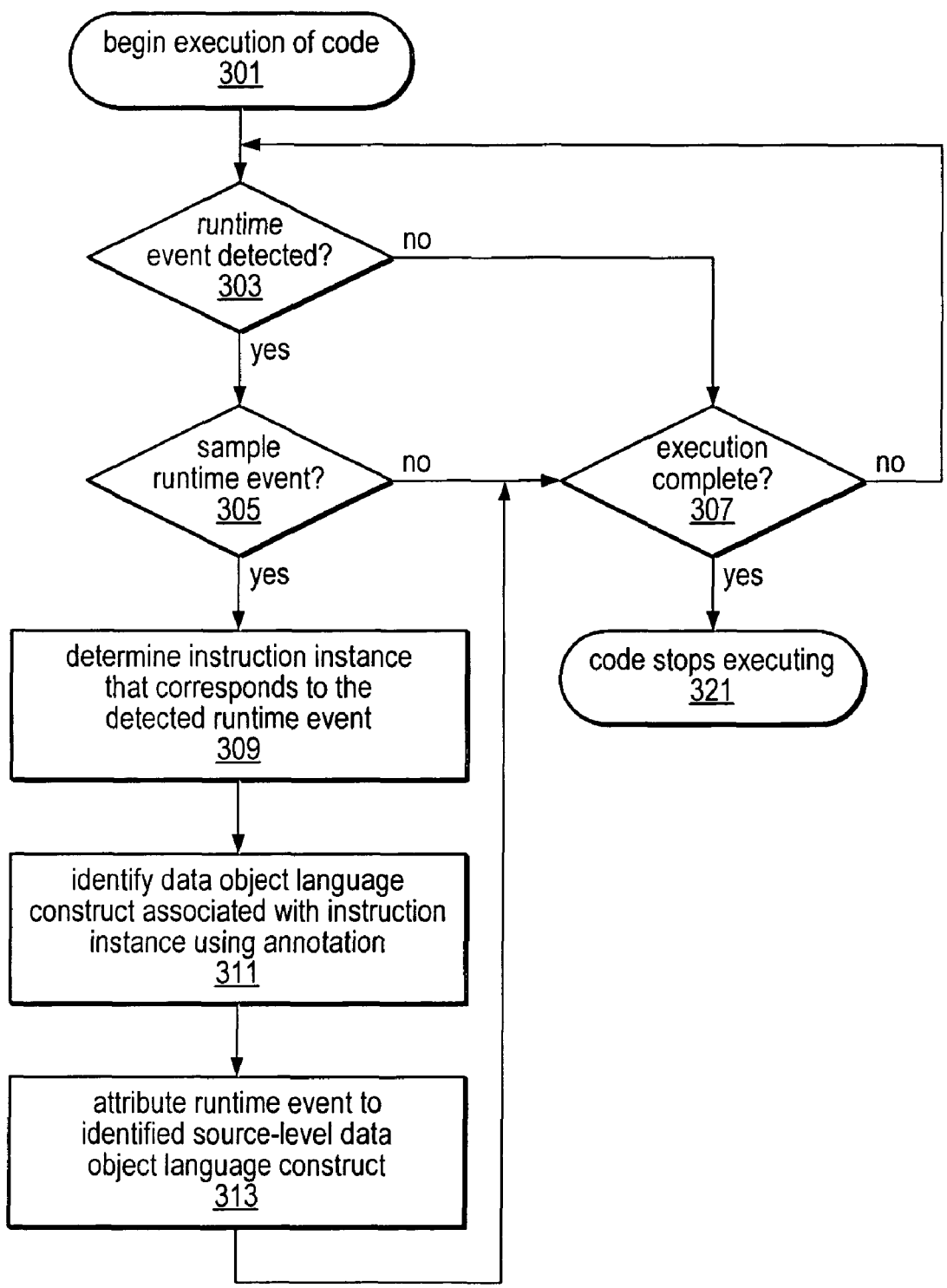
FIG. 11 is a flow chart illustrating a method for attributing sampled runtime events to source-level data object language constructs, according to one embodiment.

In the example embodiment illustrated in FIG. 11, runtime events may be attributed to source-level data object language constructs. In this example, at block 301, execution of code begins. At block 303, it is determined if a runtime event is detected. If a runtime event is not detected, then control flows to block 307. If a runtime event is detected, then control flows to block 305. In some embodiments, additional actions may be performed in response to detecting a runtime event (e.g., incrementing hardware counters associated with the detected events, generating a runtime event mask, etc.).

At block 305, it is determined if the runtime event is to be sampled. In some embodiments, a trap or interrupt may be generated when a runtime event to be sampled occurs. The trap or interrupt may include, reference, or be accompanied by a statistical packet(s) that provides information describing the sampled runtime event (e.g., processor identifier, type of runtime event, process identifier, cycle time, time stamp, thread identifier, type of cache miss, etc.). In some embodiments, runtime events may be sampled when a hardware counter reaches a certain threshold, while in other embodiments, runtime events may be sampled according to a configuration file or logic. In some embodiments, all runtime events may be profiled, while in others, only particular runtime events may be profiled. If the runtime event is to be sampled, then control flows to block 309.

At block 309, the instruction instance that corresponds to the sampled runtime event is determined. Various techniques may be employed to determine the corresponding instruction instance in different embodiments. For example, in some embodiments, a technique is employed whereby an instruction instance that corresponds to a detected runtime event is determined by backtracking from a point in a representation of the program code, which coincides with the detection toward a preceding instruction instance associated with the sampled runtime event. Backtracking may identify the preceding instruction instance at a displacement from the detection point unless an ambiguity creating location is disposed between the detection point and the preceding instruction instance. Such a technique is described in greater detail in commonly-owned co-pending U.S. patent application Ser. No. 10/050,358, entitled "Techniques for Associating Instructions with Execution Events", filed Jan. 16, 2002, and naming Nicolai Kosche, Brian J. Wylie, Christopher P. Aoki, and Peter C. Damron as inventors, the entirety of which is incorporated herein by reference. In other embodiments, the instruction instance may be identified without backtracking (e.g., by using performance instrumentation mechanisms described herein). One such embodiment is described in detail later.

At block 311, the source-level data object language construct associated with the determined instruction instance may be identified using the annotation. For example, if the determined instruction instance is the instruction instance at code line 205 of FIG. 10A, then the associated source-level data object language construct is STRUCT TREE.NODE. At block 313, the sample runtime event is attributed to the identified source-level data object language construct (e.g., STRUCT TREE.NODE). In some embodiments, attributing includes recording the sampled runtime event as associated information in a profile database. In some embodiments, the source-level data object language construct may be indicated in the profile database along with the sampled runtime event. Other associated information (e.g., program counter value, runtime event type, etc.) may be written to the profile database and associated with the source-level data object language construct during data collection, in some embodiments. From block 313, control flows to block 307. At block 307, if execution is determined to be complete, control flows to block 321, and the code stops executing. If at block 307 it is determined that execution is not complete, control flows to block 303. Control flows back and forth between blocks 307 and 303 until another runtime event is detected, at which time the collection process repeats.

Collecting profile data that describes source-level data object language constructs and their associated sampled runtime events, may facilitate optimizing code from the perspective of source-level data objects. A developer or an application with optimization intelligence may modify code (e.g., using structure padding, member reordering, structure merging, structure splitting, etc.) based on code behavior related to particular source-level data objects based on identification with the language constructs.

In addition to optimizing code with profile data that reveals code behavior with respect to source-level data objects, profile data that reveals code behavior related to data addresses (which are extended address elements) may also provide for more efficient and targeted code optimization. The data addresses may be associated with memory reference objects. Memory reference objects may include physical memory reference objects (e.g., cache levels, cache lines, cache sub-blocks, memory controllers, memory management page translation units, etc.) and/or logical memory references (e.g., memory segments, heap variables, stack variables, variable instances, expressions, data structures, etc.). With profile data from the perspective of data addresses, the memory reference objects associated with the data addresses may in some embodiments be correlated with sampled runtime events. As previously stated, attributing runtime events to data addresses may also provide for more efficient code optimization. Sampled runtime events may be attributed to data addresses during data collection.

Figure 12:
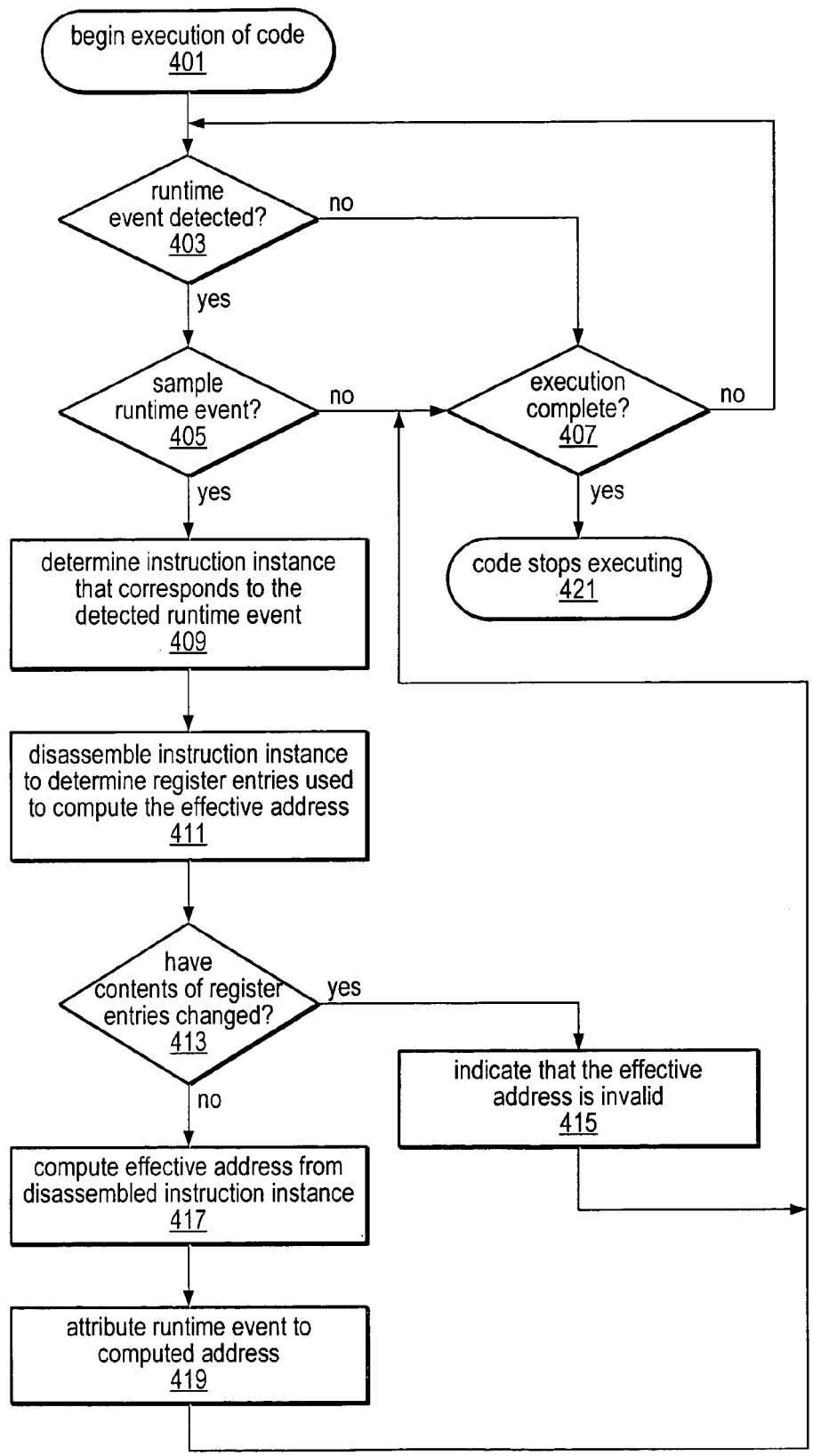
FIG. 12 is a flow chart illustrating a method for attributing sampled runtime events to source-level data addresses, according to one embodiment.

FIG. 12 illustrates a flowchart for attributing sampled runtime events to data addresses, according to one embodiment. Blocks 401-409 are similar to corresponding blocks 301-309, described above.

At block 411, a determined instruction instance is disassembled, or decoded, to determine the register entries used to compute the effective address. In some embodiments, the effective address is an address indicated by the instruction instance, and may correspond to the location of operand data, another address, etc. This address information is often dependent on the content of one or more registers at the time the instruction instance is executed. In some embodiments, at block 413, it is determined if the contents of these registers have changed. If the contents have changed, then control flows to block 415. If the contents have not changed, then control flows to block 417.

At block 415, the effective address is indicated as invalid and control flows from block 415 to block 407. At block 417, the effective address is computed from the disassembled instruction instance. At block 419, the sampled runtime event is attributed to the computed effective address. Control flows from block 419 to block 407, and the collection process is repeated if any additional runtime events are detected during execution.

In other embodiments, the operations depicted in FIG. 12 may be implemented differently. For example, software implementations may perform the operations individually and sequentially, as depicted, or in parallel and combining certain operations. In addition, various hardware implementations may implement hardware to perform operations depicted in FIG. 12. For example, in one embodiment, hardware is utilized to determine which instruction instance is of interest, and to determine validity of the determined instruction instances of interest. In another example, hardware is utilized to effectively perform the operations depicted at blocks 409, 411, 413, 415, and 417. In such embodiments hardware may compute effective addresses without decoding instruction instances, thus de facto determining validity of the instruction instances. Such a technique is described in greater detail in commonly assigned, co-pending U.S. patent application Ser. No. 10/113,357, entitled, "Sampling Mechanism Including Instruction Filtering", filed Jan. 16, 2002, and naming Adam Talcott and Mario Wolczko as inventors, which is incorporated herein by reference in its entirety.

Figure 13:
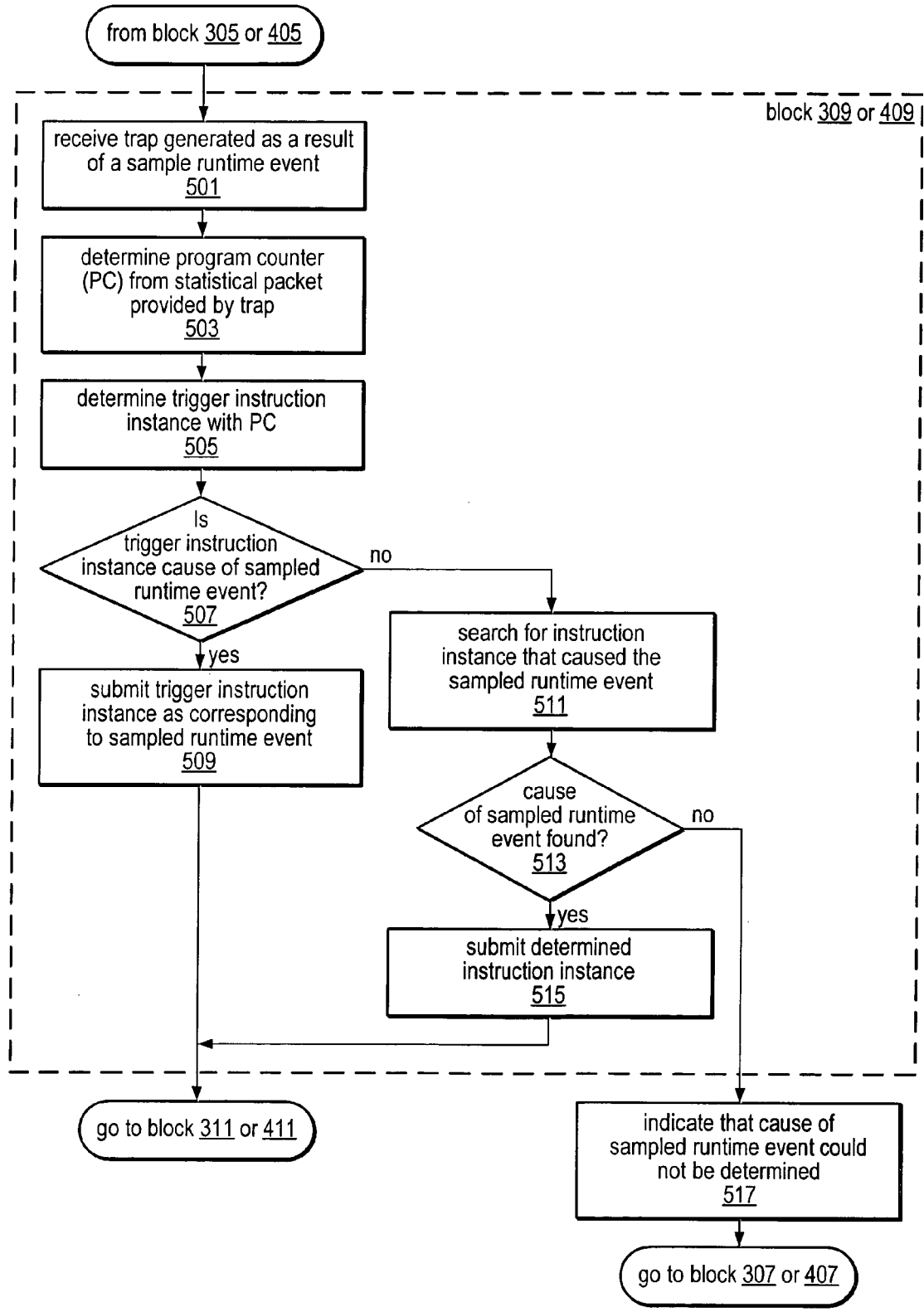
FIG. 13 is a flow chart illustrating a method for determining an instruction instance that corresponds to a detected runtime event, according to various embodiments.

FIG. 13 is a flowchart for determining an instruction instance that corresponds to a sampled runtime event as described in block 309 of FIG. 11 or block 409 of FIG. 12, according to one embodiment. In this example, control flows from block 305 (or 405) to block 501. At block 501, a trap generated as a result of a sampled runtime event is received. At block 503, a program counter value (PC) is determined from a trap or a statistical packet provided by the trap. At block 505, the trigger instruction instance is determined according to the program counter value. At block 507, it is determined if the trigger instruction instance is the cause of the sampled runtime event. If the trigger instruction instance is not the cause of the sampled runtime event, then control flows to block 511. If the trigger instruction instance is determined to be the cause of the sampled runtime event, then control flows to block 509.

At block 509, the trigger instruction instance may be submitted as corresponding to the runtime event. From block 509, control flows to block 311 of FIG. 11 or to block 411 of FIG. 12. At block 511, a search may be initiated for the instruction instance that caused the sampled runtime event. At block 513, it is determined if the instruction instance that caused the sampled runtime event is found. If the instruction instance is found, then control flows to block 515. If the instruction instance is not found, then control flows to block 517.

At block 515, the instruction instance determined to cause the sampled runtime event may be submitted as corresponding to the runtime event. Control flows from block 515 to block 311 of FIG. 11 or block 411 of FIG. 12. At block 517, it is indicated that the cause of the sampled runtime event could not be determined. Control flows from block 517 to block 307 of FIG. 11 or block 407 of FIG. 12.

Figure 14:
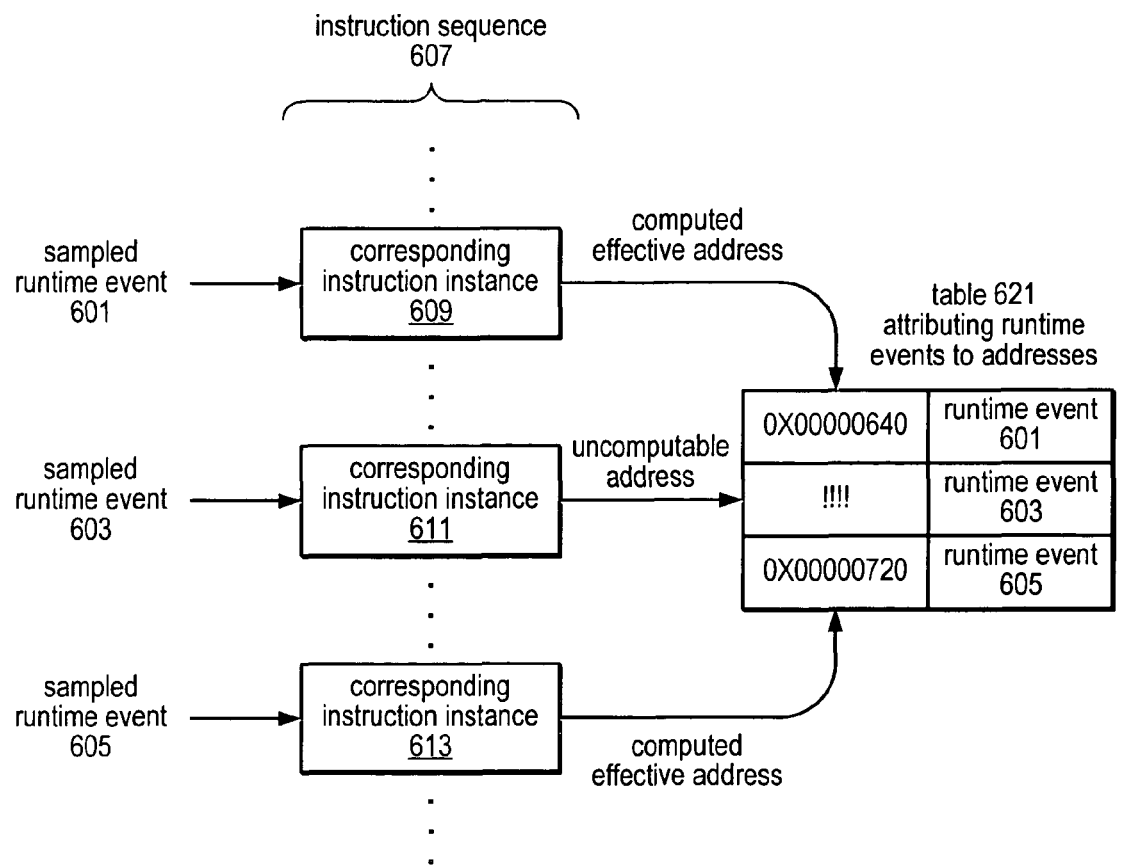
FIG. 14 is a conceptual diagram illustrating data addresses being attributed to sampled runtime events, according to one embodiment.

FIG. 14 is a conceptual diagram illustrating data addresses being attributed to sampled runtime events according to one embodiment. In this example, an instruction sequence 607 includes instruction instances 609, 611, and 613. A sampled runtime event 601 is attributed to the corresponding instruction instance 609. An effective address "0x00000640" is computed from the disassembled instruction instance 609 and stored in an entry in a table 621 along with an association between the sampled runtime event and the effective address. In other embodiments, table 621 may be implemented differently (e.g., using different physical structures, logical structures, a file, various data structures, etc.) and may include more, fewer, or different amounts and types of information than that described in this example.

In this example, another sampled runtime event, event 603, is attributed to the corresponding instruction instance 611. Contents of the register entries corresponding to instruction instance 611 have changed, so the effective address may not be computed, in some embodiments. In other embodiments, if the contents of the registers have changed, the effective address may be computed by means other than that described in FIG. 12. One such means is described in more detail later. In the second entry in the table 621, a null value or a value indicating "uncomputable address" may be stored and associated with the sampled runtime event 603, in one embodiment. In other embodiments, an entry may not be included at all in table 621 if the effective address cannot be computed.

A third sampled runtime event, event 605, may be attributed to the corresponding instruction instance 613. In this example, an effective address "0x00000720" may be computed from the disassembled instruction instance 613 and stored in the third entry of the table 621. The address "0x00000720" may also be associated with the sampled runtime event 605 in the table 621, in some embodiments.

Data address profiling may in some embodiments facilitate determination of execution hindrance with different perspectives of memory references. For example, a user may be able to identify the cache line that consumes the most execution time, and correlate delay times with data addresses or statically linked objects (e.g., global or static variables in C/C++). In another example, a user may be able to ascertain which cache line consumes the most execution time based upon which associated addresses (either virtual or physical) are associated with the most delay. These associations between sampled runtime events and addresses may provide for efficient and targeted optimization of code with respect to data addresses and statically linked objects (e.g., static variables, global variables, etc.). In some embodiments, additional information, such as address type, may be associated with sampled runtime events and data address. In addition, data addresses may be converted between different representations at different times, in different embodiments. For example, virtual addresses may be converted to physical addresses during data collection or after data collection, according to different embodiments.

Recording Profile Data

Figure 15:
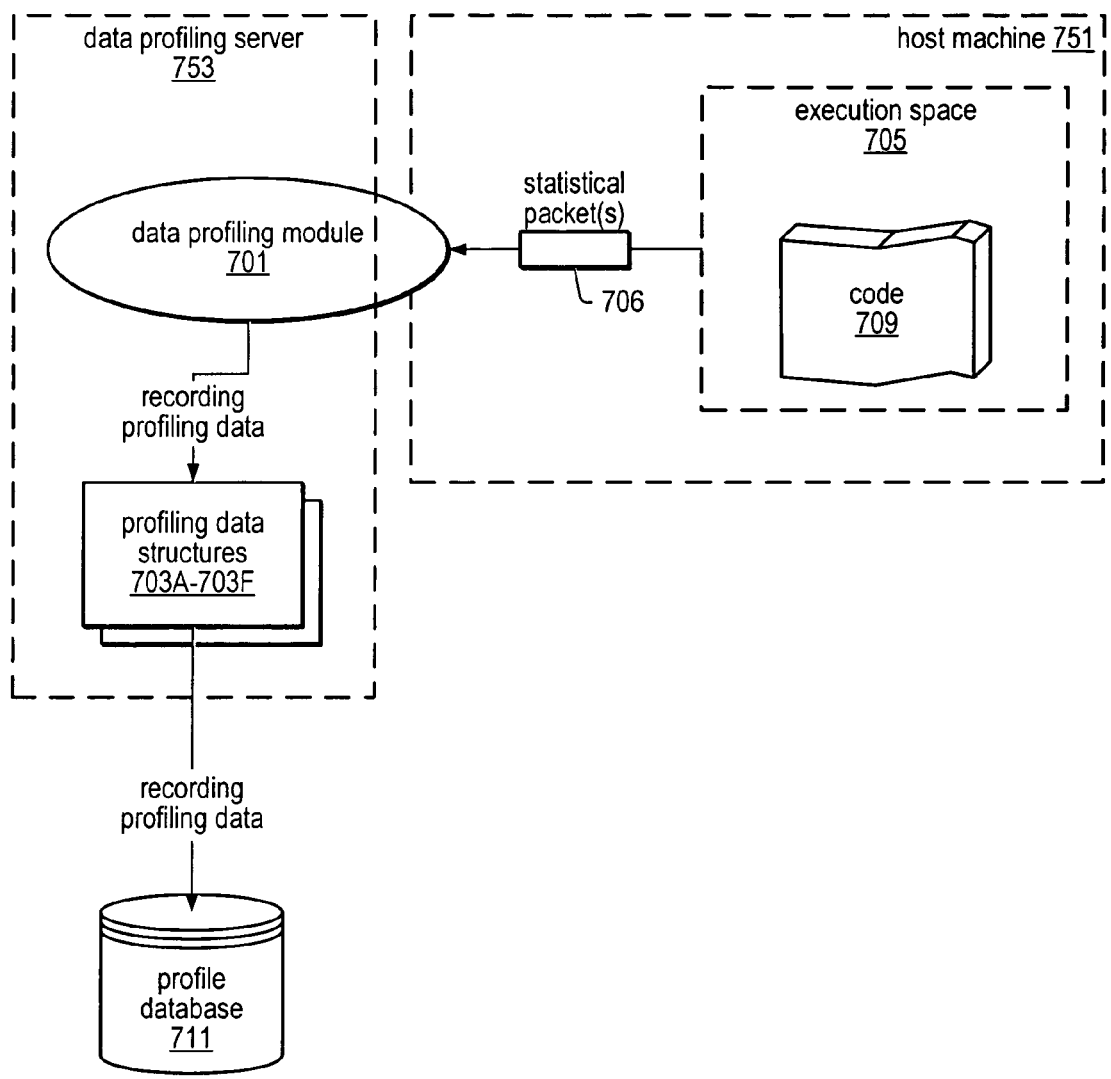
FIG. 15 is a conceptual diagram illustrating recording of profile data, according to one embodiment.

The statistical data collected for data profiling may be recorded using various techniques, according to different embodiments. For example, FIG. 15 illustrates one embodiment of a method for recording profile data. In this example, a data profiling module 701 receives statistical packets 706 for one or more sampled runtime events. The statistical packets 706 may be generated by one or more sampled runtime events that occur in execution space 705 for a code 709. In FIG. 15, execution space 705 is located on a host machine 751. The host machine 751 may also host all or part of data profiling module 701 (e.g., host machine 751 may host one or more daemon processes that collect statistical data). A data profiling server 753 may host the remaining parts of data profiling module 701, which may periodically retrieve or receive collected statistical data from a daemon process on host machine 751. In other embodiments, the data profiling module may be implemented differently. For example, data profiling module 701 may include multiple processes and/or sub-modules distributed between a host and a server, data profiling module 701 may be distributed over multiple nodes of a network, data profiling module 701 may be implemented within a single host machine, data profiling module 710 may work in conjunction with a code profiling module, etc.

In this example, the data profiling module 701 may record the profile data generated from the statistical packets in profile data structures 703A-703F. Afterward, the profile data in the data structures 703A-703F may be recorded into a profile database 711. In other embodiments, the profile database 711 and/or recording profile data may be implemented differently. For example, the profile database 711 may be an on-disk database or may be instantiated in main memory, in different embodiments. In some embodiments, the profile data may be recorded directly to the profile database and then analyzed, or may be stored in main memory for analysis. The results of analyzing the profile data in main memory may be stored in the profile database on a storage media, or elsewhere, according to different embodiments. In one example, collected profile data may be written to an on-disk database and organized into non-overlapping epochs. In some embodiments, the profile database 711 may be hosted by the data profiling server 753. In other embodiments, the profile database 711 may be remote from the data profiling server 753. In such embodiments, the profile data may be transmitted over a network (e.g., Ethernet, ATM, wireless, Frame Relay, etc.).

Figure 16A:
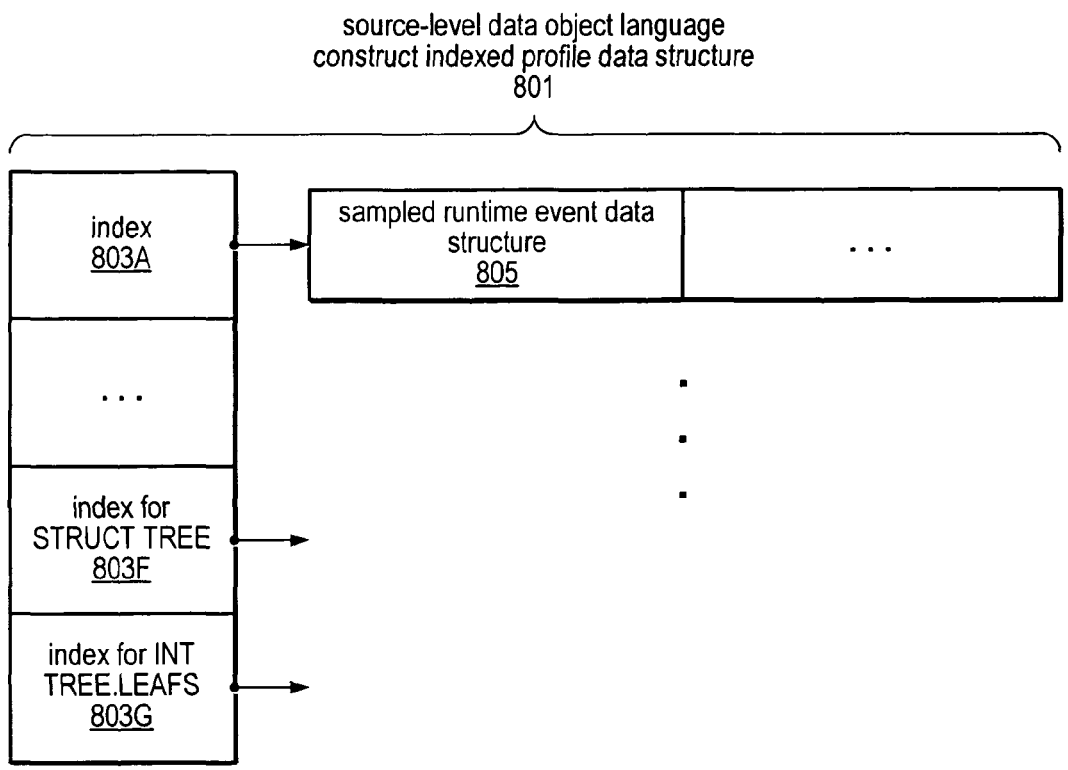
FIGS. 16A and 16B are conceptual diagrams of exemplary profile data structures, according to different embodiments.
Figure 16B:
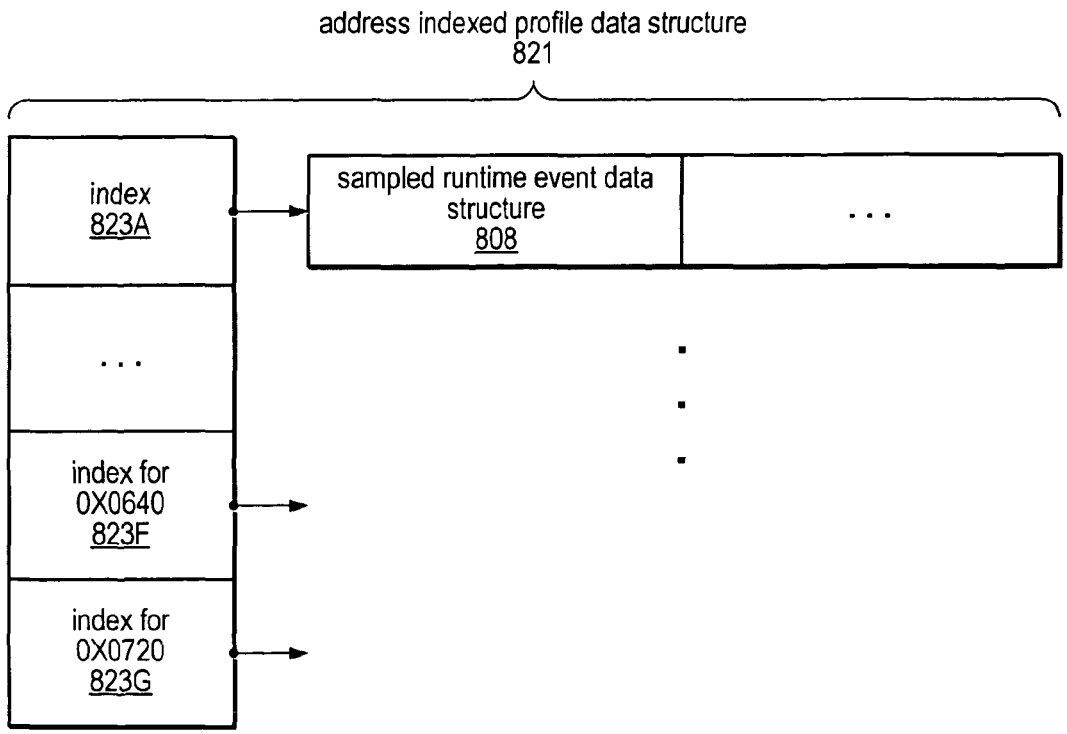

FIGS. 16A-16B are conceptual diagrams of exemplary profile data structures according to different embodiments. FIG. 16A illustrates an exemplary source-level data object language construct indexed profile data structure, according to one embodiment. In FIG. 16A, the source-level data object language construct indexed profile data structure 801 includes an index into sampled runtime event data structures. The index includes indices 803A-803G (e.g., each index may be a clustered index). Structures indicating profile data may be implemented differently in different embodiment (e.g., using unclustered indices, clustered indices, hashed indices, etc.). Each of the indices 803A-803G references a sampled runtime event data structure. For example, index 803A of FIG. 16A references a sampled runtime event data structure 805. In some embodiments, each index references a single sampled runtime event data structure, which may reference other sampled runtime event data structures. In other embodiments, each of the indices may reference multiple sampled runtime event data structures. In the example illustrated by FIG. 16A, the index 803A may be a clustered index and the sampled runtime event data structure 805 may be a data array. Details of an exemplary sampled runtime event data structure are illustrated in FIG. 17.

In this example, index 803F is an index for STRUCT TREE. The source-level data object language construct STRUCT TREE may be hashed to generate a unique index that is the index 803F, in some embodiments. Various techniques may be used for indexing in different embodiments (e.g., using a string "STRUCT TREE" as the index, assigning a unique value for each source-level data object in the code, etc.). Similarly, the index 803G may be a hash of the source-level data object language construct INT TREE.LEAFS, in some embodiments.

FIG. 16B illustrates an exemplary data address indexed profile data structure, according to one embodiment. In this example, FIG. 16B illustrates an address indexed profile data structure 821 that is similar to the data structure illustrated in FIG. 16A. In contrast to the source-level data object language construct indexed profile data structure 801 of FIG. 16A, a data address indexed profile data structure 821 indexes sampled runtime event data structures using indices based on data addresses. The data address indexed profile data structure 821 is indexed with indices 823A-823G. In some embodiments, these may correspond to actual data addresses or may be computed values based on the actual data addresses. In this example, the index 823A may reference a sampled runtime event data structure 808, which may be similar to the sampled runtime event data structure 805 of FIG. 16A. In different embodiments, the combination of data structures may vary (e.g., sampled runtime event data structures across different profile data structures may be the same or different). In this example, the index 823F may be based on a hash of the address "0x00000640" and the index 823G may be based on a hash of the address "0x00000720." As with the indices described in FIG. 16A, indices 823A-823G may be implemented differently in different embodiments.

Figure 17:
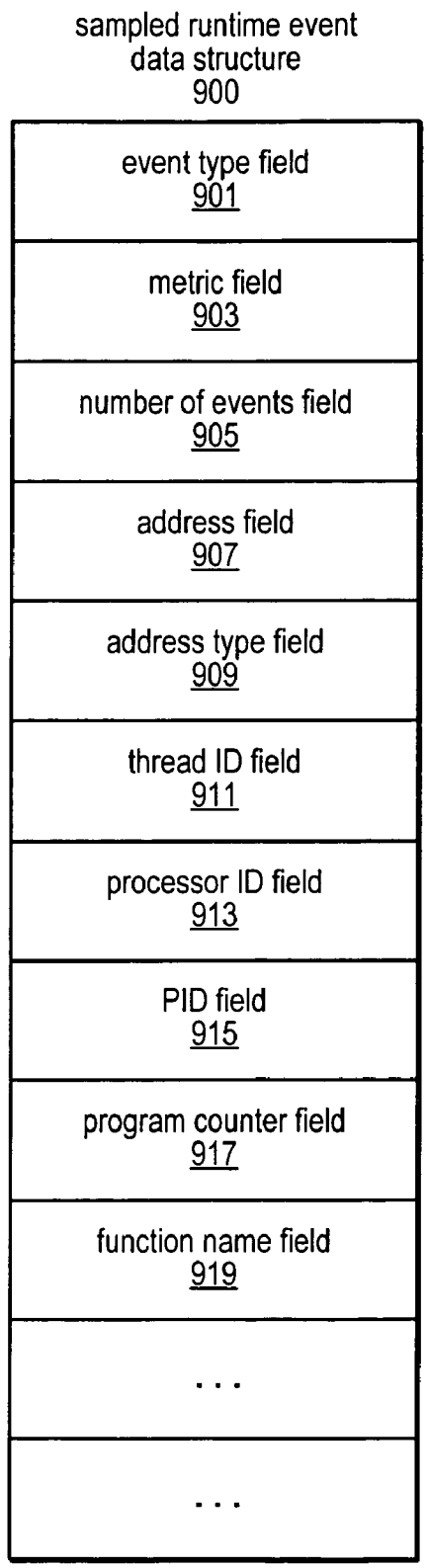
FIG. 17 is a block diagram illustrating an exemplary sampled runtime event data structure, according to one embodiment.

FIG. 17 is a block diagram illustrating an exemplary sampled runtime event data structure, according to one embodiment. The sampled runtime event data structure 900 illustrated in FIG. 17 includes numerous fields as examples of statistical information that may be associated with sampled runtime events. This information may be extracted from statistical packets generated by a corresponding interrupt or trap, or may be collected by various other types of hardware or software event agents. The sampled runtime event data structure 900 illustrated in FIG. 17 includes the following fields: an event type field 901, a metric field 903, a number of events field 905, an address field 907, address type field 909, a thread identifier field 911, a processor identifier field 913, a process identifier (PID) field 915, a program counter field 917, and a function name field 919. The sampled runtime event data structure 900 may include more, fewer, or different fields in different embodiments. For example, the sampled runtime event data structure 900 may be referenced by a corresponding address, therefore, the address field 907 may be removed or may be replaced with a different field, such as a source-level data object language construct field, an instruction instance field, an instruction instance type field, an event mask, an indexing structure, etc. In other embodiments, multiple address fields may be included, corresponding to the addresses of different hardware components and/or additional software constructs associated with the event. For example, addresses may be included to identify a memory board, core, strand, function, task, etc.

In this example, the event type field 901 may indicate the type of sampled runtime event tracked by the sampled runtime event data structure 900 (e.g., data reference, cache miss, cache reference, data translation buffer miss, data translation buffer reference, etc.). The metric field 903 may indicate a metric associated with the sampled runtime event (e.g., number of cycles, execution time in seconds, memory stall time, etc.). In some embodiments, the metric field 903 may correspond to multiple metrics (e.g., a list of metrics for one or more sampled runtime events). The number of events field 905 may indicate the number of sampled runtime events that have occurred of the same type and/or with the same associated statistical information, in some embodiments. In some embodiments, the metric field 903 may be optional and the value may be inferred from the number of events field. Alternatively, the number of events may be inferred from the metric field 903. In addition, a sampled runtime event data structure 900 may be maintained for each individual sampled runtime event that occurs, despite repetition of statistical information, some embodiments. In different embodiments, sampled runtime event data structures may share fields or a sampled runtime event data structure may indicate information for multiple sampled runtime events, for example.

The address field 907 may indicate an address (e.g., in identifier of a cache line or cache sub-block, a random access memory address, a storage address, etc.) associated with the sampled runtime event. The address type field 909 may indicate the address type (e.g., physical address, virtual address, page, segment, memory board, cache line, etc.) of the address element indicated in the address field 907. In different embodiments, the runtime event data structure may be implemented differently and may include more or less information than illustrated in FIG. 17. For example, a runtime event data structure may include multiple extended address element fields and accompanying address type fields, or it may include multiple address element fields but not address type fields because the address types may be inferred from the address elements themselves.

The thread identifier field 911 may identify a thread associated with the runtime event. The processor identifier field 913 may identify the processor associated with the runtime event. The process identifier (PID) field 915 may indicate the PID provided by the host operating system to identify the process associated with the runtime event. The program counter field 917 may indicate value of the program counter(s) corresponding to the sampled runtime event. The function name field 919 may identify a function that corresponds to the sampled runtime event.

As previously noted, in different embodiments, the sampled runtime event data structure may be implemented and/or utilized differently. For example, the sampled runtime event data structure 900 may be instantiated for each type of runtime event associated with a particular code behavior attribute, or as an element of a data structure associated with a particular code behavior attribute. The fields illustrated in FIG. 17 are for illustration alone and are not meant to be limiting upon the invention. Various embodiments may include some or all of these fields, and may include additional fields not illustrated in FIG. 17. In addition, the sampled runtime event data structure 900 may be N-indexed in some embodiments. For example, the sampled runtime event data structure may be indexed by a hash table of addresses and by a hash table of source-level data object language constructs. In this example, the runtime event data structure may refer to the indexing elements of both hash tables. In some embodiments, a hash table may have indices corresponding to different types of sampled runtime events. Each of the indices may reference statistical information for that particular type of runtime event. In some embodiments, the fields may be grouped into nodes of a binary search tree for a particular runtime event.

The data structures described above may correspond to profile data collected and stored in a per-thread or per-address-space repository, in some embodiments, or may represent profile data that has been processed by an intermediate agent for inclusion in the primary event space for the application. These data structures may be stored in separate tables of a single file, in separate files, in one or more databases, or in any other suitable memory structure on the machine on which the data was collected, on the machine on which the analyzer is run, or on a remote storage device, according to different embodiments.

Analyzing Profile Data

After profile data is collected, tools may analyze the profile data. In some embodiments, the tools may employ artificial intelligence and/or neural networks. The tools may be used to analyze the profile data to determine the cause of certain code behavior, such as stall cycles, in some embodiments. The profile data may be analyzed based on correlations between sampled runtime events (or consumed execution times corresponding to runtime events) and various code behavior attributes (e.g., source-level data object addresses, source-level data objects, source-level data object definitions, functions/methods, threads, time, processes, processors, etc.).

Figure 18:
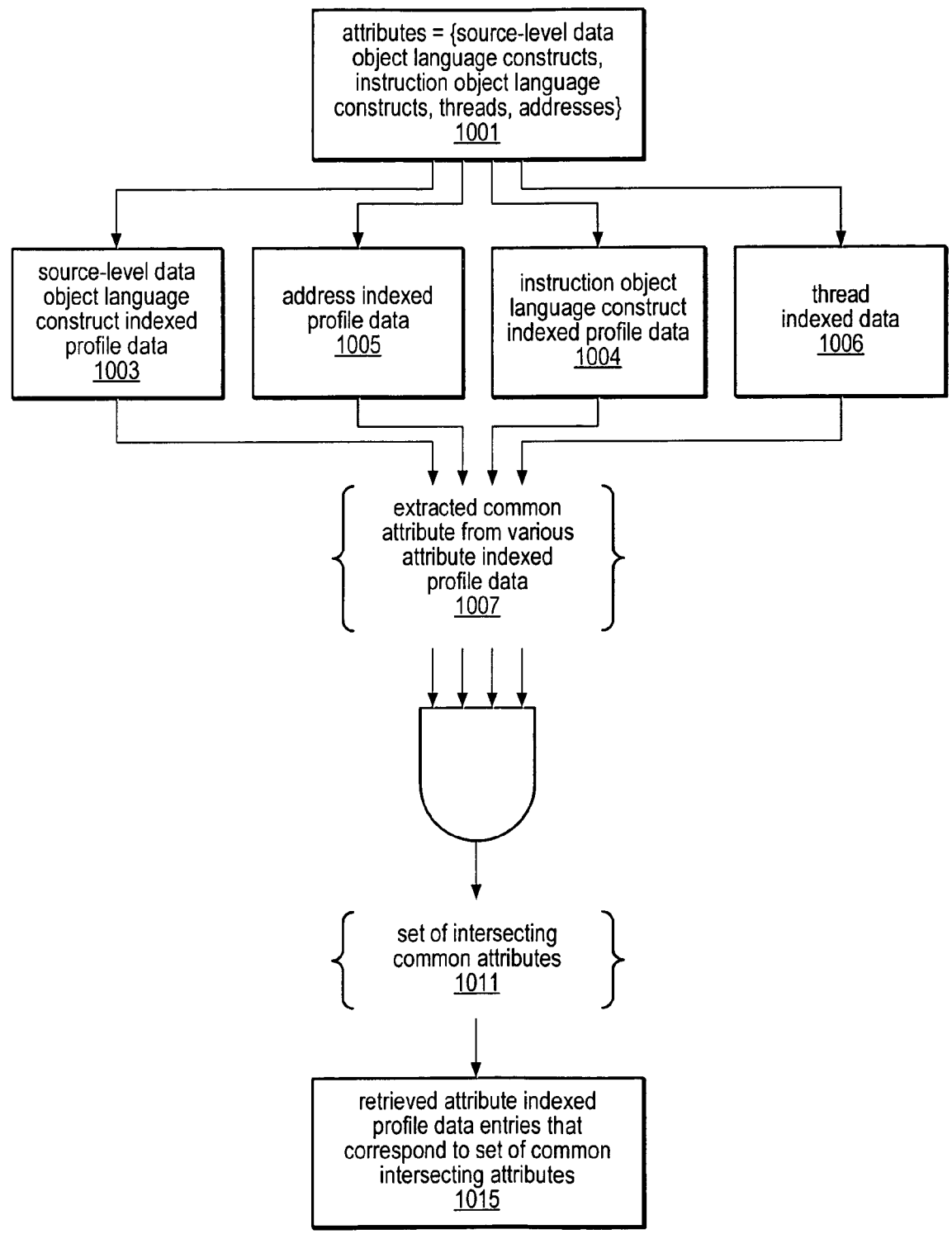
FIG. 18 is a conceptual diagram illustrating correlation of multiple code behavior attributes according to realizations of the invention.

FIG. 18 is a conceptual diagram illustrating correlation of multiple code behavior attributes according to one embodiment. At block 1001, code behavior attributes have been indicated. These code behavior attributes may have been specified directly by a user, in a configuration file, through default settings, etc., in different embodiments. In the example illustrated by FIG. 18, the code behavior attributes include source-level data object language constructs, instruction object language constructs, threads, and addresses. A profile data correlation report may be generated that includes correlation between specific instances of these code behavior attributes, correlation between all code behavior attributes, correlation between conventional profile data and all or particular ones of the code behavior attributes, correlation between the code behavior attributes and other code behavior attributes not listed here, between instances of these exemplary code behavior attributes and instances of other code behavior attributes, etc., in different embodiments.

The code behavior attributes shown in block 1001 may be used to retrieve entries from source-level data object language construct indexed profile data structure 1003, instruction object language construct indexed profile data structure 1004, thread indexed profile data structure 1006, and address indexed profile data structure 1005, in some embodiments. In this example, a set of common attributes 1007 may be extracted from the various attribute indexes profile data structures 1003-1006. For example, all addresses included within the various attribute indexed profile data structures 1003-1006 may be extracted. An operation may be performed on the extracted common set of attributes 1007 to find a set of intersecting common attributes 1011. For example, an intersecting set of addresses may include each of the addresses that can be found in all of the various attribute indexed profile data structures 1003-1006. With the set of intersecting common attributes 1011, entries from the attribute indexed profile data structures 1003-1006 that correspond to the set of intersecting common attributes 1011 may be retrieved and the retrieved attribute indexed profile data entries 1015 may be displayed, stored, transmitted, analyzed, filtered, ordered, etc. The profile data of these retrieved entries may provide insight into code behavior, such as cycle time or memory stall time, from the perspective of any number of code behavior attributes. In different embodiments, fewer, more, or different code behavior attributes than those illustrated in FIG. 18 may be utilized.

Figure 19:
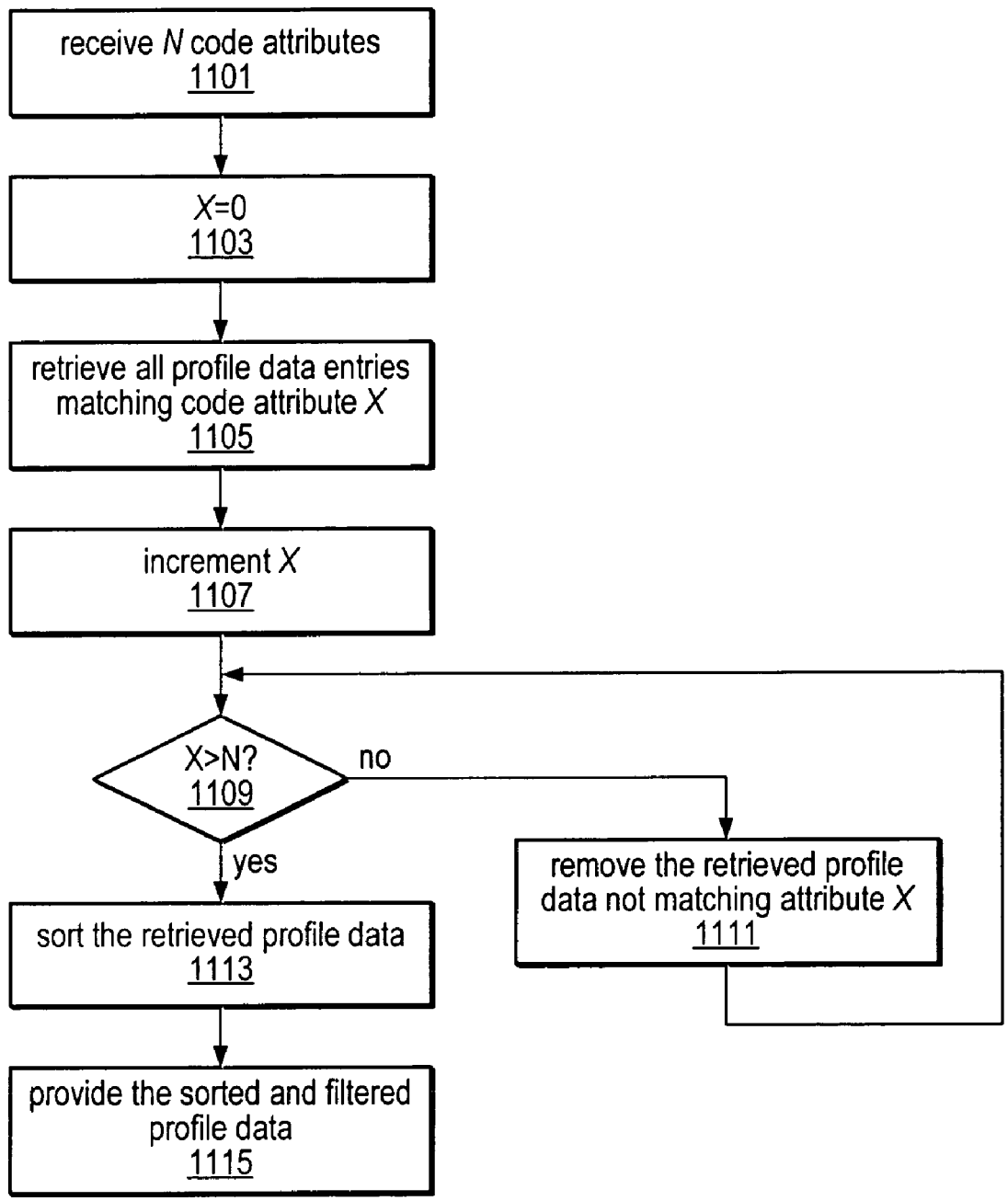
FIG. 19 is a flow chart illustrating a method for analyzing source-level data object profile data from the perspective of multiple code behavior attributes, according to one embodiment.

FIG. 19 is a flowchart for analyzing source-level data object profile data from the perspective of multiple code behavior attributes, according to one embodiment. In this example, at block 1101, N code behavior attributes are received. At block 1103, a control value X is set to 0. At block 1105, all profile data entries matching code attribute X are retrieved. At block 1107, the control value is incremented. At block 1109, it is determined if the control value is greater than N. If the control value is greater than N, then control flows to block 1113. If the control value is not greater than N, then control flows to block 1111.

At block 1111, the retrieved profile data that does not match attribute X is removed. Control flows from block 1111 back to block 1107. At block 1113, the retrieved profile data is sorted. At block 1115, the sorted and filtered profile data is provided. The profile data can be provided for display on a monitor, for saving to a file, for transmission over a network, etc.

While the flow diagrams described above depict a particular order of operations performed by certain embodiments, it should be understood that such order is exemplary (e.g., alternative embodiments may perform the operations in a different order, may combine certain operations, may overlap certain operations, may perform certain operations in parallel, etc.). For example, the loop in FIG. 19 at blocks 1107, 1109, and 1111 may be performed differently in different embodiments. In different embodiments, block 1113 of FIG. 19 may not be performed at all, may be combined with block 1111, or may be performed in parallel with block 1111. In addition, profile data aggregated by a code behavior attribute may be further aggregated and/or filtered with one or more selected instances of the code behavior attribute and/or other code behavior attributes, some embodiments.

Filtering profile data based on combinations of various code behavior attributes may in some embodiments allow analysis of the profile data from numerous perspectives. Correlating multiple code behavior attributes may in some embodiments facilitate more sophisticated code optimization than optimization based on traditional profiling techniques. Correlation of multiple code behavior attributes may also provide additional/alternative views of profile data (e.g., a view of profile data at a more thorough source-level) in some embodiments.

Parallelism and Scalability

As previously noted, developers may attempt to maximize performance by exploiting parallelism (e.g., by executing multiple threads of a multi-threaded process on multiple processor cores in parallel). However, data motion between hardware resources may inhibit application scalability and, thus, application performance. The data profiler described herein may in some embodiments facilitate performance improvements by allowing identification of bottlenecks caused by data motion between hardware resources. For example, data motion of a shared variable among processors exemplifies true sharing that may inhibit performance. In one example, a cache line full of data may migrate among two or more processors requesting a shared variable. References to data migrating between processors may be substantially slower than a local reference to the data. Identifying the migrating cache line and relating the cache line to the shared variable may facilitate solving the scaling problem, in this example. The data space profiler described herein may in some embodiments allow a developer to identify all data migrations within hardware and, thus, to resolve scaling challenges. The profiler may profile data motion in hardware and relate the costs to application source code (e.g., data definitions, function/methods, scheduling and memory allocations), in some embodiments.

The data space profiler described herein may in some embodiments be used to profile a complete system through a coupling of event agents, relational agents, and the application of business intelligence, on-line analytic processing (OLAP), to performance engineering. Hardware and software event agents may capture data motion and runtime events involving data motion. These event agents may tightly couple the extended address elements of the event with the cost of the event. In other words, a specific cost (for example, execution time) may be associated with a specific address, where the address may include any combination of a program counter value, an effective address of the data, a physical address of the data, a processor address, a thread address, and other addresses.

Figure 20:
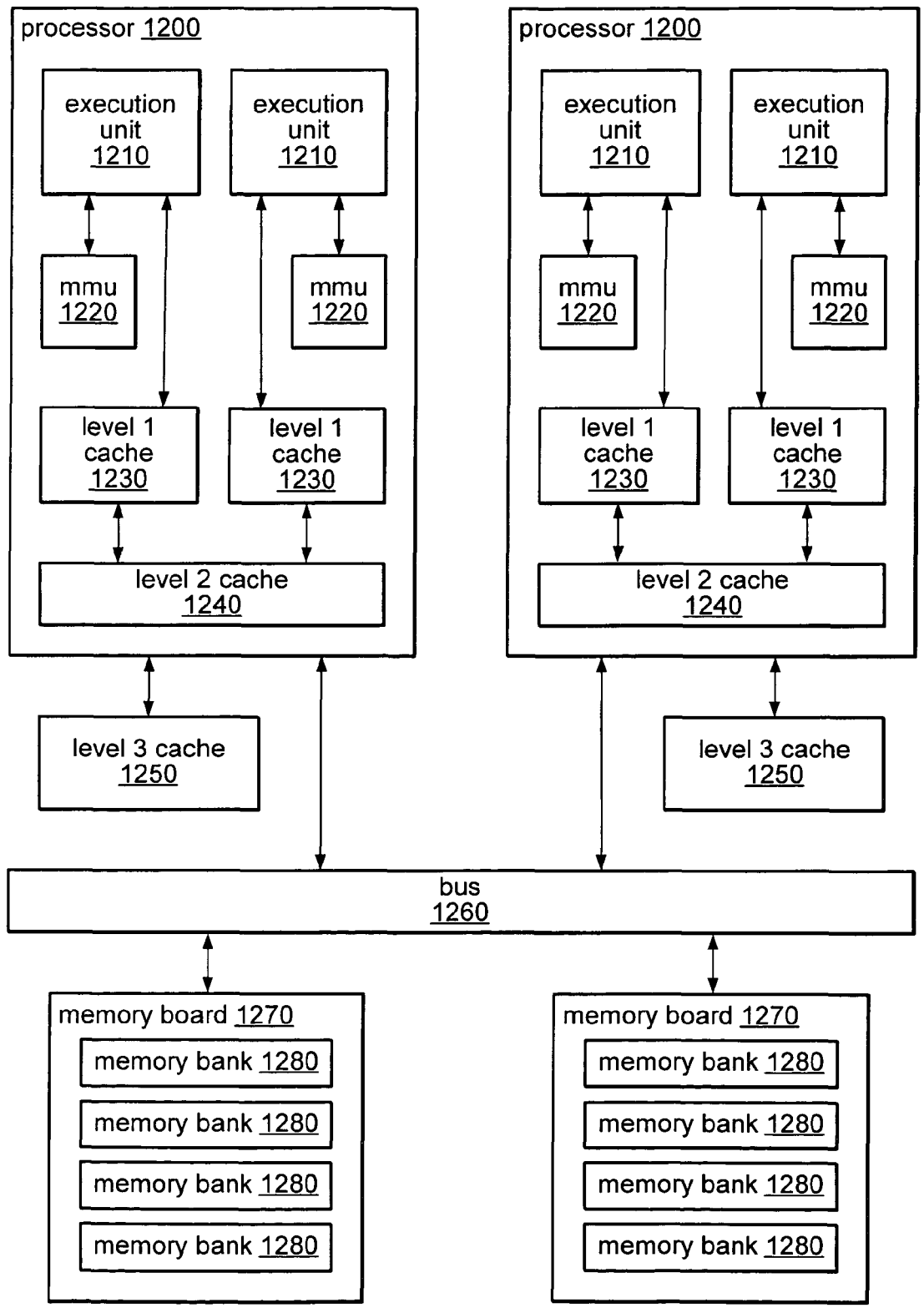
FIG. 20 is a block diagram illustrating various hardware components of an exemplary computer system, each of which may be identified by one or more extended address elements, according to one embodiment.
Figure 21:
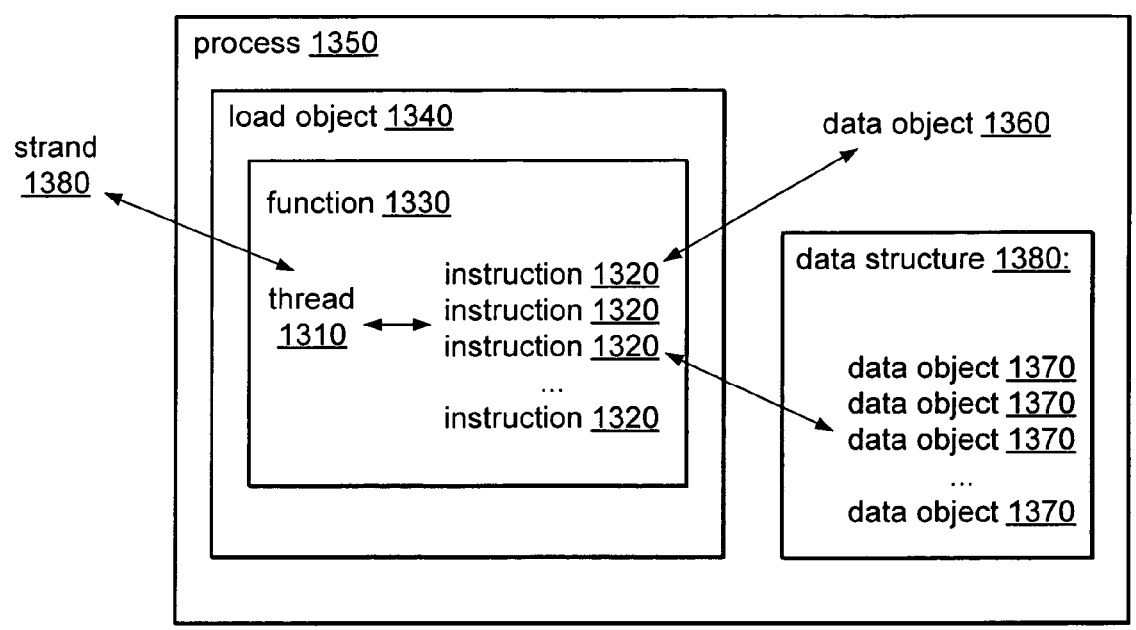
FIG. 21 is a block diagram illustrating various software components of an exemplary software program, each of which may be identified by one or more extended address elements, according to one embodiment.

Examples of the different types of address elements that may be associated with data motion instructions and/or runtime events are illustrated in FIGS. 20 and 21. FIG. 20, for example, illustrates hardware components of the system, each of which may be identified by an "address." These addresses may be used by the profiler as identifiers of profiling objects corresponding to the hardware components. In one embodiment, the address of each hardware component may include a virtual or physical address in the memory map of the system and/or the address space of a software application (e.g., each memory bank 1280 may be addressed by a starting address for the address bank, or using an offset from an address for the corresponding memory board 1270). In another embodiment, the address of each hardware device may include a label or index for the component (e.g., each processor 1200 may be assigned a label: processor1, processor2, etc.) In other embodiments, some hardware components may be addressed using a memory-mapped address, while others are addressed using a label, index, or other identifier. In still other embodiments, the addresses identifying each hardware component in a system may include a combination of memory-mapped addresses, labels, indices, and other identifiers. As illustrated in FIG. 20, each memory sub-system component, board, integrated circuit device or functional module thereof, interface, or storage location may be considered a data profiling object and may be identified by a corresponding extended address element. In addition, functional or arbitrary sub-modules or sub-components of the data profiling objects illustrated in FIG. 20 (e.g. a TLB within an MMU 1220) may also be considered data profiling objects. In other examples and embodiments, more, fewer, or different hardware components may correspond to data profiling objects and each may be associated with one or more extended address elements.

Each programming structure and source-level data object in a system may also be identified by an address, in some embodiments. FIG. 21, for example, illustrates various software components that may be identified by one or more addresses. In this example, each process 1350 may be identified by its PID and/or by a corresponding source-level language construct. Similarly, each load object 1340 may be identified by a corresponding source-level language construct or by a virtual or physical address corresponding to the start of the instructions therein, for example. Each function 1330, thread 1310, and instruction 1320 may also be identified by one or more addresses, including source-level language constructs, virtual and physical addresses, program counter values at the start of execution of the function/thread/instruction instance, etc., in various embodiments. Data objects, whether corresponding to individual data items (e.g., data objects 1360) or elements within more complex data object structures (e.g., data objects 1370 within data structure 1380), may be identified by source-level language constructs (e.g., variable names), virtual or physical addresses of the data objects, etc. FIG. 21 also illustrates that a software thread 1310 may be executed on a particular hardware strand 1380. The addresses associated with both software thread 1310 and strand 1380 may be considered address elements of runtime events associated with thread 1310, in this example. Relational agents may map these address elements and associated runtime event costs, to other hardware and software data profiling objects involved in the events, such as cache lines or variable names, in various embodiments.

The analysis engine may be used to drill down to the cause of observed bottlenecks by applying set arithmetic on the relationships mapped the event set, in some embodiments. For example, a user may display virtual addresses and then display physical addresses used by only the most costly cache line. By examining the two displays, the user may identify whether true sharing (e.g., between one physical and/or virtual address and one cache line) or conflicts (e.g., between many physical addresses and one cache line) may inhibit application scalability, and if so, where (e.g., by identifying the shared variable). The data space profiling system and method described herein may be applied to profiling data motion in networks of computers, computer sub-components, and networks of storage devices, in various embodiments.

Profiling Using Turing Machine Model

Figure 22:
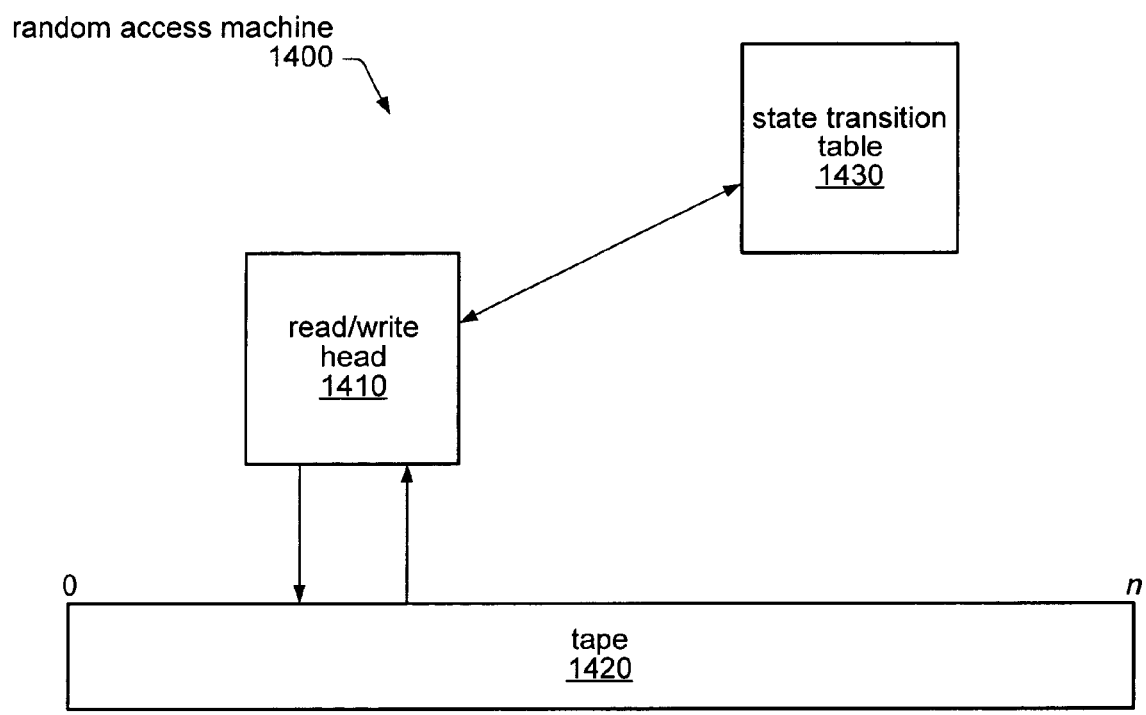
FIG. 22 illustrates an exemplary computing system modeled as a Random Access Machine, according to one embodiment.

It has been proven elsewhere that all computation devices may be expressed using Turing Machines. In other words, if a system can be used to profile a Turing Machine, then it may be used to profile any/all computing system(s). Computing systems may be modeled as a Turing Machine sub-set or variant called a Random Access Machine. Traditional profiling tools focused on the state transition aspect of the Turing Machine. The data space profiler described herein models profiling of the machine tape of a Turing Machine instead. For example, FIG. 22 illustrates a computing system modeled as a Random Access Machine, according to one embodiment. In this example, random access machine 1400 includes a tape 1420, having storage locations numbered 0 to n, a state transition table 1430, and a read/write head 1410. In this example, the event set for the computing system is addressed by finite locations on tape:

A={s, n}

Event Set: E={A, c}

In this example, A (Addresses) may be represented as a tuple comprising s (the state from the state transition table) and n (the address on the tape). Each event in the event set comprises an address (A) and a cost (c).

Early profilers focused on s in the state transition table because data transformations (i.e., processors and execution units) were the most costly components in early systems. The data space profiling tool described herein provides a superset of existing profiling technologies, because in modern machines the state transitions are actually modeled in the random access tape. Virtually all hardware may all be profiled using this tool, because all computer hardware (computer memory, computer processors, computer networks, storage systems, and others) may be modeled as being equivalent to a Random Access Memory Turing Machine. For example, internal components of computers, networks of computers, computing grids, and storage networks may all be profiled and related to the objects that are most relevant to the developer (e.g., elements of the memory hierarchy that affect data movement.)

The profiling methodology and tools described herein may be used to extend multidimensional data to the profiling of complete systems, not just instructions, in various embodiments. For example, they may not only capture virtual addresses of instructions (e.g., Program Counter values), as traditional profilers do, but they may capture a more complete set of extended address elements associated with runtime events. Event agents may include software and/or hardware to capture multiple extended address elements associated with an event. For example, in one embodiment the extended address may include: one or more virtual addresses (program data allocations), one or more program counter addresses (instructions), one or more physical addresses (hardware allocations), one or more cache addresses (identifies which caches are used), one or more software execution entity addresses (threads), one or more execution device addresses (HW strands), one or more temporal addresses (time), and other addresses (e.g., network addresses, storage locations, etc.)

Topology and Set Theory

The architecture of the data space profiler described herein is based on a mathematical model using n-space topology. This model allows instruction execution information and data movement information to be merged. For example, instructions with high stall times caused by data movement may be traced to cache and/or memory bank conflicts, in some embodiments. These in turn may be traced to inter- or intra-thread conflicts or to interactions with other programs. Once these are identified, they may be traced back to the instructions that caused the conflict, in some embodiments. The mathematical model that under girds the profiler and enables correlations between these data objects is described below.

The profiler architecture collects, manages, processes and presents multidimensional performance data for analysis. The profiler may in some embodiments expand on statistical event sampling mechanisms. Various event agents, or collectors, may be used to capture events that collectively create an event space, in some embodiments. This event space may then be mapped to hardware and software components. Relational operators may provide cost breakdowns from the event space for hardware components and software constructs. Events may be sliced, filtered, and viewed across different dimensions, in various embodiments. In other words, actionable insight may be drawn out of the data by slicing, dicing, and drilling down on it, using the relational agents and analysis engine of the profiler, in some embodiments.

As previously noted, throughput performance is often achieved by improving concurrent program execution, reducing contention, and lowering the cost of coherency. However, in many of these cases, data movement constrains the achievable gain. In these situations, processors may spend more time waiting for data movement than executing instructions. Computer architects, recognizing this dependency, introduced multi-threaded cores to hide data latency. In these systems, while one thread is blocked fetching data, another can execute.

Optimization that takes into account the scalability of threads may depend on the accurate identification and characterization of data motion. Despite evidence that data motion is a key determinant in throughput, an instruction-centric profiling paradigm persists. Analysis of instruction execution, such as using traditional profilers, yields limited scalability insights. Performance analysts may determine that algorithms have certain characteristics but only with great difficulty may they understand the effects of the memory hierarchy on performance. Hardly ever will they understand interactions with other parts of the program, other threads of execution, or other programs, yet these may be more important for system throughput and scalability than the choice of the best software algorithm.

The architecture and mathematics of the data space profiler may be described using set theory and topology. Topology, as used herein, is the study of the properties that are preserved through deformations, twisting and stretching, or, the set of a collection of subsets that satisfy defining properties. Topological space, as used herein, is a set with a collection of subsets that together satisfy a certain set of properties that define that set.

Topology may give more or maximum flexibility in discussing data space as compared to other descriptions. With topological analysis, employing propositions based on set theory (i.e., doing analysis based on numbers in lists) may be used. Whereas there are traditional set theory boundaries, flexibility may be obtained by means of abstraction. In this respect, sets may be viewed as ordered lists appearing in other lists.

A Digital Continuous Profiling Infrastructure (DCPI) is described in the ProfileMe paper from WRL by Jefferey Dean, et al. This paper describes an event vector, $\vec{E}$, which expresses the required correlation between {PC, VA, cost}. In some embodiments of the data space profiler, hardware may enable profiling of the program counter, PC, on an out-of-order processor, and the virtual address, VA, with associated cost events. In this example, cost refers to the performance cost of execution of an associated instruction and the access to the virtual address.

The Event Space, S, is described by:

$$S=\vec{E}$$

Each element in vector $\vec{E}$ is defined as:

$$E=\{PC,VA,Cost,time\}$$

This paper states that in a constant cost gradient, one can infer PC costs and VA costs by the probability function $P_{PC}(\vec{E})$ and $P_{VA}(\vec{E})$ within the constant cost gradient. The functions approximate cost for the instructions and virtual addresses used. For example, take this Event Set:

$$E = \{PC, VA, L2CacheMiss, time\}$$

$$E = \{\{0 \times 1f0, 0 \times 20000004, 1003, 10.05\},$$
$$\{0 \times 200, 0 \times 1\mathit{fffff}8, 1003, 10.13\},$$
$$\{0 \times 1f0, 0 \times 20000004, 1003, 10.14\},$$
$$\{0 \times 2c8, 0 \times \mathit{fffff}800, 1003, 10.16\},$$
$$\{0 \times 200, 0 \times 1\mathit{fffff}8, 1003, 10.20\}\}$$

In this example, the probabilities of the instructions at 0x1f0 and 0x200 incurring a cache miss are double the probability of the instruction at 0x2c8. The L2CacheMiss cost at 0x1f0 and 0x200 were each 2006 while that at 0x2c8 was 1003. In this example, the VA 0x1ffffff8 incurred a cache miss twice as often as the other addresses. Its cost was approximately 2006 compared with 1003 for the other VAs.

In some embodiments, performance counters (e.g., hardware counters implemented in the processor) may include support for trap-on-overflow. In some embodiments, the pipeline may support approximate correlation for cost when cost is time or L2 read misses. In some embodiments, the analyzer portion of the data profiling tool may supports events that are not tightly correlated between the event and the PC, such as L2 read stalls.

In some embodiments, compiler support may facilitate some of the functionality involved in data profiling. For example, type information may be propagated from a C front-end to the code generator or all the way to the data profiling tool analyzer, in some embodiments. In other embodiments, typing rules may be defined for developers that use C as a portable assembler. In some embodiments, weakly typed languages tightly associate types with the instruction. For example, in embodiments in which different instructions operate on different data types, the type may be represented as a function of the program counter (PC):

$$refType=Func(PC)$$

There may be many more of these tightly associated functions for other objects, in some embodiments. For example, the virtual page number may be a function of the virtual address and the cache line accessed may be a function of the physical address associated with a runtime event:

$$Virtual\ Page=Func(VA)$$

$$Cacheline=Func(PA)$$

Even physical address, PA, may actually be represented as a function of VA (although in some embodiments it may be represented by a long function, i.e., the page tables for the process):

$$PA=Func(VA)$$

In some embodiments, the PA value may be collected at event collection time, while in other it may be calculated from the VA value at a later time, such as by one of the relational agents.

The Event Vector $\vec{E}$ in the analyzer may in some embodiments look like:

$$E=\{\vec{PC},Cost,time,VA,PA,CPU,process,strand, thread, refType\}$$

In this example, the instruction vector, $\vec{PC}$, is the call stack of the thread for the event and refType is the referenced type of the instruction at the leaf of $\vec{PC}$, which may be added by the analyzer during post-processing.

The analyzer may collect a set of isomorphic event vectors, $\vec{E}$, each based on what cost was collected: VA and PA may be collected in specialized records when profiling is selected for hardware counter events. Homeomorphism is an equivalence relation and a mappable correspondence that is continuous in both directions between points in two topological spaces. In some embodiments, the collection may be represented as a homeomorphic Event Vector:

$$E=\{\vec{PC},\vec{Cost},time,VA,PA,CPU,process,thread, refType, \ldots\}$$

In this modification cost is represented as a vector that is execution time-based, memory-subsystem time based, L2 Cache Miss based, etc. That is, cost is based on execution time, as affected by the memory hierarchy (e.g., an L2 cache miss). Using this model may in some embodiments result in a unified Event Space S, where the event space is the union of all event vectors:

$$S=\vec{E_{exectime}} \cup \vec{E_{memtime}} \cup \vec{E_{L2miss}}$$

Software may also have layers of structures similar to the memory hierarchy. In some embodiments, a similar approach may be taken to profile user-defined objects within an application with additional association operators.

Memory hardware structures are predominantly of two types: content-addressed memory (CAMs), and address-indexed structures. Indexed structures are also functions of a portion of the address.

For virtually indexed structures, the index into the structure I, may be defined as a function of the virtual address element of the event vector:

$$I=Func(VA)$$

For physically indexed structures, the index I, may be defined as a function of the physical address element of the event vector:

$$I=Func(PA)$$

Most of the hardware structures of computers may be described by using topological spaces. With this technology, the pages, cache lines, and software structures in use may be observed, according to different embodiments. Event agents capturing these structures may be implemented as hardware event agents, in some embodiments, or as software agents, in others. These event agents may be standard for most instantiations of the profiler, or may be specific to the particular platform on which the profiled application is executed.

Clock-based profiling may be enabled, in some embodiments, by treating a clock event as a hardware counter-type event. A backtracking mechanism may be used to unwind a single instruction and decode it for a memory operation to create a memory sub-system hardware counter-typed Event Space, S. This space, S, has a cost type of memory sub-system time, instead of hardware counter event type:

$$E=\{\vec{PC},Cost,time,VA,PA,CPU,process,strand,thread, refType\}$$

Arbitrary object definitions (e.g., memory objects, other hardware components, software constructs, etc.) may be allowed in the profiler, in some embodiments. Along with user and system object association operators, they may make the profiler highly adaptable, and may enable space S to be mapped into S' by an arbitrary function:

$$S'=Func(S)$$

These association operators may replicate the mappings found in applications, operating systems and hardware. The operators may enable the mapping of space S, into cost Scost by aggregating the user-defined spaces and associated cost functions. For example, the instance of time spent in memory subsystem vs. cache line may be represented as:

$$Scost=\{CostInterval \times Count(Funccacheline(S)), Func-cacheline(S)\}$$

Some of the operators that may be included in the profiler are: bit-wise operators; and, xor and or (&, ^, |), shifts (>> and <<), arithmetic operators, comparators (==, <, >, ...), logical operators (!, &&, ||) the ternary range operators (?:). All of these operators may help fold space into components usually found in hardware and software structures. In some embodiments, all of the event vector elements may be available as tokens (TSTAMP, PADDR, etc.). Such embodiments may also include various vector operators, such as the inclusion operator (scalar IN vector) returning a Boolean, and the terminator operator (LEAF vector) returning a scalar.

The Funccacheline( ) function maps an Event Space, S, by aggregating based on the definition of the hardware indexing operation for the cache line. In this example, the Count( ) of events that match a cache line may be aggregated, and the sum may be multiplied by the CostGradient per event. However, an arbitrary function can be used to generate cost:

$$S\ cost=\{Func\ cost(S),Funcobject(S)\}$$

In this example, Funcobject( ) returns the hardware or software object from space S; and FCost( ) is the arbitrary cost function. This flexibility may in some embodiments enable a user to create profiles by costs such as cycles-per-instruction, something that may not be practical to do from a cache line perspective in hardware.

Note that Funcobject( ), a user-specified object, may be used to define existing maps, such as inclusive costs within the function object:

$$Funcinclusive\_func(S)=\{(Funcfunction(S)\ IN\ Func-callstack(S)\}$$

In this example, Funcfunction( ) returns the source-level language object view for the collection of instructions named Function; and Funccallstack( ) returns the call stack from the event space.

The function for exclusive costs within a function object may be defined as:

$$Funcfunction(S)=\{Funcpc\_to\_function(S)\}$$

Slices

The true power of data profiling may be in its ability to extract slices from space S. An operator that slices the event space by a specific time interval may be applied to the event set, as in this example:

$$S'=\{((Func_{second}(S) \geq 10) \cap (Func_{second}(S)<11))\}$$

In this example, the function Funcsecond( ) returns the time interval for the event space in seconds.

With this slice, a user may be able to observe the system as it changes over time and observe, in detail, any phase of the program, machine, or hardware device. In this example, behavior may be observed over a period of one second commencing 10 seconds from the start of the application.

Then using this new space S', the cost, Scost may be generated:

$$SCost=\{FuncCost(Funcobject(S')),Funcobject(S')\}$$

In this example, Fobject( ) is a user-defined function that returns the aggregate of the related objects, and FCost( ) generates the cost. Note that in this case, the cost is two-dimensional. In other cases, multidimensional costs can be generated.

$$SCost=\{FuncCost(Funcfunction(S')),FuncCost'(S'), FuncCost''(S'),Funcfunction(S')\}$$

In this example, FuncCost'( ) and FuncCost''( ) may be arbitrary cost functions and the cost, SCost, may be transformed by sorting on any of the dimensions to provide the most insight. For example, $$SCost=\{FuncCost(S),Funcsecond(S)\}$$

The data may be presented by FuncCost(S), ordered by the costliest second through the least costly second, or by Funcsecond(S), the execution sequence. Graphical representations of the cost may also provide in-depth insights, in some embodiments. A graphical user interface (GUI) implementation for the analyzer is described in more detail later.

Another example of a data selection may be to slice the event space by a single cache line (e.g. the nth set in the cache structure):

$$S'=\{Funccacheline(S)=n-1\}$$

Then using this new space S', the cost, Scost may be generated:

S'cost={Funccost(Funcobject(S'), Funcobject(S'))}

In this example, Funcobject( ) is a user-defined function that returns the aggregate of the related objects, and FuncCost( ) generates the cost. In this case, the cost is two-dimensional. In other cases, multidimensional costs may be generated and these costs may be displayed as multi-colored surfaces in a display, for example The cost, SCost, may be transformed by sorting on any of the dimensions to provide greater insight. For example:

SCost={Sort(FuncCost(S),Funcsecond(S))}

The data may be ordered primarily by FuncCost(S) and secondarily by Funcsecond(S); that is, from most costly to least costly with ties shown in execution sequence.

After an aggregation operation, the costs may be generated from an associated selection that offers further insight, as in this example:

$$SCost = \{FuncCost(FuncVA\_by\_cacheline(S')),$$
$$FuncVA\_by\_cacheline(S')\}$$

The FuncVA_by_cacheline( ) association selector is designed to compare virtual addresses with cache hierarchy structures. It segments the virtual address space by the same alignment and size restrictions as by the cache hierarchy selector. By way of contrast, Funccacheline( ) lacks the address folding effects. FuncVA_by_cacheline( ) and Funccacheline( ) allow the performance analyst to trace virtual addresses to physical addresses to hardware structures and back.

The associated operations may allow the observer to infer the characteristics of the virtual address to physical address to hardware structure mapping.

For any physically indexed hardware:

S'=Funchardware(FuncPA(FuncVA(S)))

Note that FuncPA( ) may be a complicated mapping operation. The effects of FuncPA( ) may be captured when the event space is created. Later, the properties of the operation FuncPA( ) may be observed by comparing spaces defined by: FuncVA_by_hardware(S) and FuncPA_by_hardware(S). These are the associated operations for the hardware object using either virtual or physical addresses.

These association operators may enable the analyst to filter on one object in any of the association operators and then view the costs in the other association operators.

Note that these associated mappings may be created to compare two spaces from the viewpoint of any arbitrary dimension. Additional association operators enable the analyst to drill down to processor boards, (e.g., Funcprocessor_board(S)), or memory boards, (e.g., Funcmemory_board (S)).

When comparing the spaces produced by these mappings, the profiler may provide insight into whether or not memory references are remote or local to the processor. Set operators may then be applied to determine if an access is local or remote by comparing these association operators:

Funcremote(S)={Funcprocessor_board(S)≠Funcmemory_board(S)}

In this example, the Funcremote( ) operation returns the space where processors reference memory on remote memory boards. As noted earlier, this space can be mapped onto any cost space, SCost.

As previously noted, the data space profiler architecture may provide various operators to manipulate set elements: bit-wise, arithmetic, comparators, logical, and ternary, in different embodiments. Set operators may also be available: union, intersection, inclusion, terminator, etc. Built-in functions may be used to manipulate data; e.g., to sort the data. The profiler may be readily implemented with in-order processors that support trap-on-overflow performance counters. For systems that lack hardware counters or hardware-based profiling infrastructure to drive sampling, clock events may enable data profiling, in some embodiments. A clock event may generate a Hardware Counter-Typed event representing retire latency. A backtracking mechanism may unwind a single instruction and decode it for a memory operation to create a Memory Sub-System Hardware Counter-Typed event space, S, which has a cost representing memory subsystem time.

As noted earlier, a processor's memory subsystem may be viewed as a subspace, in some embodiments. In an exemplary system this might comprise an execution unit, L1 and L2 caches, bus, and memory, although the actual names and architecture are not significant. Cost may be attributed in this subspace as shown in Table 1. Using logic operations, events may be traced to each memory subsystem. By comparing event spaces, the time cost of each memory sub-system component cost may be related to other events, in some embodiments. In other words, latency for specific hardware devices and under which specific conditions they arose may be determined, in some embodiments.

As previously noted, the association operator of types in weakly typed languages uses the instruction as an argument:

refType=Func(PC)

In some embodiments, data type information may be correlated with the instruction in the analysis engine. In some embodiments, data type information may be correlated with the PC, or address of the reference, by the runtime system. For example, a particular data type may in some embodiments be associated with a given memory location. In some embodiments, the compiler may generate a table that associates every instruction's memory reference with an identifier to its data type. During the analyzer's processing, the event set may be joined with the type tables and the result may be merged into the event set as the referenced type (refType).

To gain resolution (data density) in specific dimensions, mappings may be applied while building the Event Space, S. For example, if call stacks are not relevant, the Event Space S may be transformed into S' at data collection time:

$$S = \vec{E} = \{\vec{PC}, \overrightarrow{Cost}, time, VA, PA, CPU, process, thread, refType, \ldots\}$$

$$S' = \vec{E}' = \{PC, \overrightarrow{Cost}, time, VA, PA, CPU, process, thread, refType, \ldots\}$$

In this example, data may be aggregated on PC, instead of $\vec{PC}$. Specificity in one dimension, call stacks, may be lost, but data density may be gained in the other dimensions by reducing the cost gradient. Data may be sampled more frequently because the data is pre-aggregated.

Note that hardware may only need to guarantee the event tuple:

$$E=\{PC, VA, Cost\}$$

However, Cost may be the vector $\vec{Cost}$, rather than a scalar. Adding a cost dimension may enable attribution into the event space, S.

The memory subsystem of an exemplary large machine is described below. The actual names of the components are not significant; the concept to note is that the memory subsystem may be viewed as a dimension:

| Execution Unit | L1 Cache | L2 Cache | Bus Controller | Bus | Bus Controller | Memory |
|---|---|---|---|---|---|---|

The cost vector may provide attribution into this dimension with hardware that describes which component in the memory sub-system participated in the runtime event. In this example, logical unknown values are represented as X.

| Cost Type | Execution Unit | L1 Cache | L2 Cache | Bus Controller | Bus | Bus Controller | Memory |
|---|---|---|---|---|---|---|---|
| Instr Count | 1 | X | X | X | X | X | X |
| Memop Count | 1 | 1 | X | X | X | X | X |
| L1 Cache Miss | 1 | 1 | 1 | X | X | X | X |
| L2 Cache Miss | 1 | 1 | 1 | 1 | 1 | 1 | X |
| Mem Ref | 1 | 1 | 1 | 1 | 1 | 1 | 1 |
| Cache to Cache | 1 | 1 | 1 | 1 | 1 | 1 | 0 |

Note that with logic operations, all events may be attributed to each memory subsystem component that provides a type bit back to the event generating hardware device.

Note that spaces may be created for each of these hardware components and compared to spaces for time, in some embodiments.

In some embodiments, there may be a requirement to maintain a constant cost gradient. The collection device (e.g., event agents) may cycle through all possible event vectors that are meaningful, or may collapse certain ones at collection, by not attributing those components of the memory sub-system. The collection device may request an event stream with a constant gradient from the hardware for each specific element of $\vec{Cost}$ that is being cycled through, in some embodiments.

In some embodiments, by normalizing the cost gradient via an alternate source, each cost element in $\vec{Cost}$ may be guaranteed to be constant and the statistical profiling paradigm may be maintained.

The event space S may include both time and event cost type. Hardware devices (event agents) may provide a count, c, of the event cost type over time. The event scalar Cost may be normalized by the corresponding $$\frac{dc}{dt}$$

for every element in Event vector, $\vec{E}$.

By including more of these devices, more simultaneous attribution may be attained into the cost of the memory subsystem with the event space, S.

Note that in the tightly associated tuple, the virtual address, VA, may be just the process identifier (PID) and the address within that PID (PID+address). This address and cost may be arbitrarily descriptive: IPv6 address, port number, etc. A distributed application may thus be profiled.

$$E=\{PC, address, \vec{Cost}, time\}$$

As previously noted, software may include layers of structures similar to the memory sub-system cache hierarchy and user defined data-types. In some embodiments, a similar approach may be taken to profile the user-specified objects within an application with additional events and cost types, and the associated space definitions.

Note that because collection may be distributed and the operations may be implemented in parallel, the profiler may be easily scaled to arbitrarily large applications and arbitrarily large computer systems, for example, those employing the new generation of CMT processors.

Figure 23:
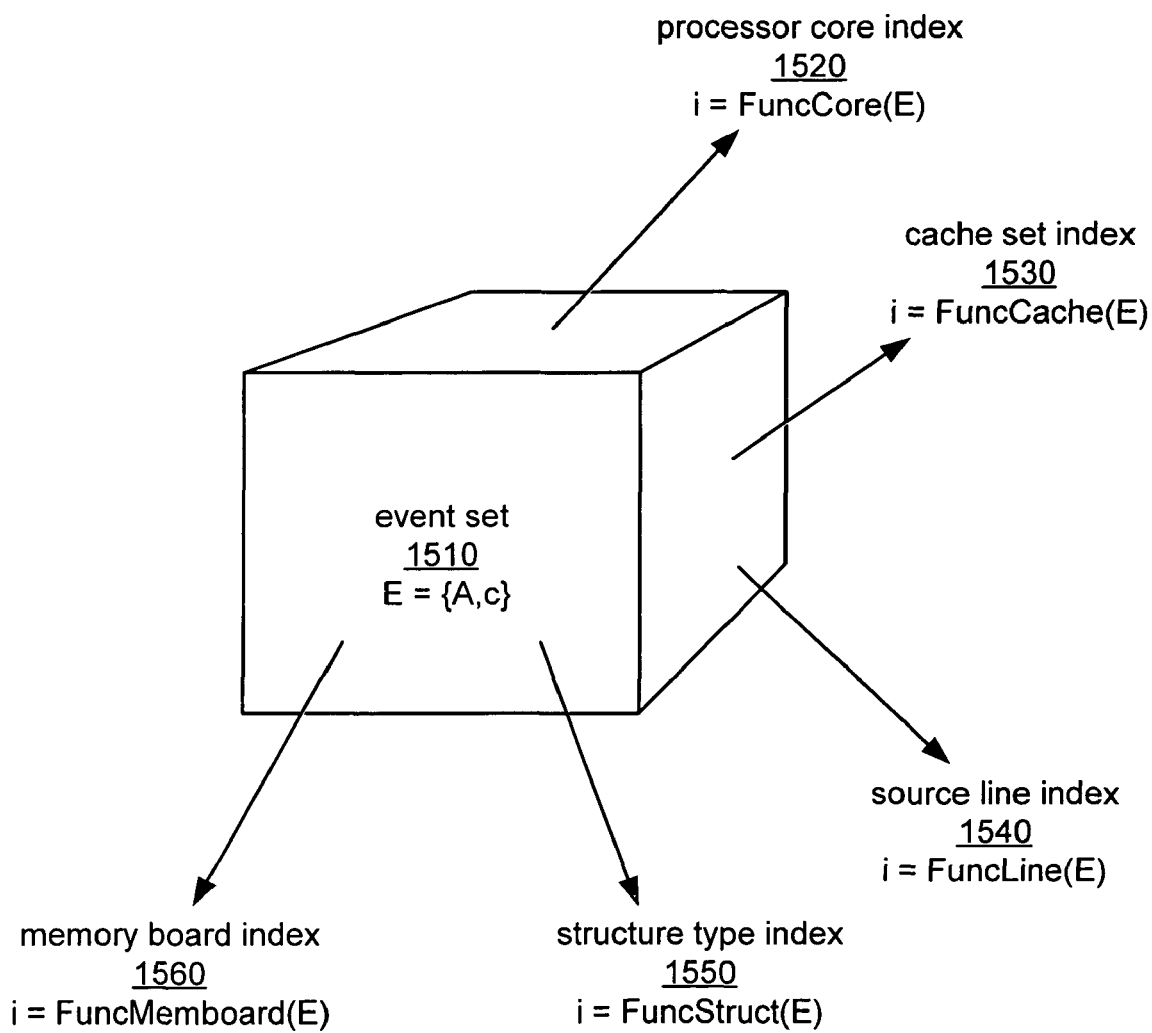
FIG. 23 is a conceptual diagram illustrating extracting profile data from an event space using multiple indices, according to one embodiment.

As discussed above, each member of the event space may be multiple-indexed, i.e., indexed according to each of the multiple data object addresses associated with the event. This is illustrated in FIG. 23. In this example, an event set 1510 includes multiple events, each including mappings between the cost of the event (c) and the extended address associated with the event (A).

The events in the event set, in this example, may be indexed according to the memory board accessed by the event (1560), the structure type of the event (1550), a source line associated with the event (1540), the cache set accesses by the event (1530), and the processor core associated with the event (1520). In this example, each index is dependent on the function defined by the relational agent corresponding to the data object. For example, each event may be associated with a source line index value n, where n is determined by a mathematical function dependent on the source code line number associated with the event. If a relational agent function defining source line index 1540 is applied to the events in the event space, the value of the source line index 1540 may be returned for each event, along with the cost of the runtime event associated with the source code line data object.

Applying multiple relational agents to the events in the event space may provide filtering and aggregation of the events with respect to one or more data objects and may display data object costs associated with the filtered and aggregated data, in some embodiments. This filtering and aggregation method is analogous to the application of multiple set operation functions and other functions to an event set, as described above.

User Model

The user model for the data space profiling tools may be thought of as consisting of three steps: compiling the target program, collecting the data, and analyzing the data. These steps are discussed in detail below.

Compiling the Target Program

The user may compile the target program (i.e., the application to be profiled) just as he or she would for production use, in some embodiments. In some embodiments, command line switches or flags may be set at compilation to enable data space profiling. In some embodiments, these flags may cause changes to the symbolic information recorded with the executable: first, by ensuring that symbolic information about data references are written into the symbol tables; second, by cross-referencing each memory operation with the name of the variable or structure member being referenced; third, by adding information about all instructions that are branch targets; and fourth, by associating each instruction (PC) with a source line number.

In some embodiments, enabling data profiling may cause the compiler to suppress optimizations, while in others it may not. When data profiling is enabled, the compiler may change the generated code slightly, in some embodiments. For example, it may add NOP instructions between loads and any join nodes (labels or branches) to help ensure that a profile event is captured in the same basic block as the triggering instruction. In another example, the compiler may avoid scheduling load or store instructions in branch delay slots. The impact of these modifications on performance may be highly application-dependant, but may be generally minor. For example, the runtime for a particular application, as compiled with profiling enabled, may be approximately 1-2% greater than the runtime of the application compiled without enabling data profiling.

Initiating Collection of Profile Data

Data collection may be initiated using a collect command, in some embodiments. The collect command may specify data collection parameters along with the target program and any arguments the target program requires. For example, clock and hardware-counter profiling may be specified, independently of or along with tracing of synchronization delays, memory (heap) allocation and deallocation, or MPI messages, in different embodiments. In some embodiments, the result of a collect run (referred to herein as an experiment) may be stored a file-system directory with a log file giving a time-stamped trace of high-level events during the run, a loadobjects file describing the target executable and any shared objects it uses, and additional files, one for each type of data recorded, containing the profile events and the callstacks associated with them.

To profile using hardware counters, the collect command may include one or more flags, which may specify one or more counters to be used. In such embodiments, if multiple counters are requested, they may be required to be implemented on different registers. Counters may be specified by name, and an overflow interval may be specified as "on", "high", or "low" or as a numerical value. The settings may be chosen to give overflow intervals corresponding to approximately 10 ms., 1 ms., and 100 ms. for the counter named "cycles", for example. For other counters, the time corresponding to the overflow value may depend on the program behavior. In some embodiments, the intervals are chosen as prime numbers, to reduce the probability of correlations in the profiles.

Event Agents

As noted earlier, event agents may be implemented in hardware, in software, or in a combination of hardware and software, according to various embodiments. One example of a hardware event agent is a hardware counter. Modern processors may include one or more hardware counter registers, each of which may count one of a number of events. For example, the members of the UltraSPARC-III™ family of chips each include two counter registers. In some embodiments, each counter may be preloaded with a value, and when the counter overflows, an interrupt may be generated. The interrupt may be translated by the operating system into a signal delivered to the process being profiled. In some embodiments, when the signal is received by a handler that is part of the data collection system, it may cause a data record to be written by that handler for the event.

As previously described, hardware counters may in some embodiments be usable for counting cycles, instructions completed, instruction-cache (I$) misses, datacache (D$) read misses, data-translation-lookaside-buffer (DTLB) misses, external-cache (E$) references, E$ read misses, E$ stall cycles, and other runtime events. Some of the counters may count actual events (i.e., the number of times the particular trigger occurred), but others may count cycles. For example, cache counters that measure in cycles may be especially useful, since they may count the actual time lost because of the events, not just the number of events. The collect command, if run with no arguments, may in some embodiments generate a list of available counters for the machine on which it is run.

Each proprietary processor may implement hardware performance counters tailored for its particular architecture, with considerable variation in the number of counters supported, the events counted, whether an interrupt is provided on counter overflow and whether such an interrupt is precise or not, or a detailed history is available for sampled instructions. As described earlier, some processors may include support for one or more dedicated hardware performance counters per thread. The Alpha™ 21264 processor and Pentium™ 4 processor are examples of processors which provide hardware counter support that may be used in implementing data profiling, as described herein.

Some processors employing hardware counters may not always deliver a precise trap when a hardware counter overflows. Since a counter may overflow quite late in the pipeline, the logic to deliver a precise trap may be complex, and may significantly affect the performance of the chip in normal operation. Therefore, the trap signal may be delivered after the event that caused the counter overflow and may arrive quite a bit later.

At the time the signal arrives, the program counter value (PC) that is delivered with it may represent the next instruction to issue, which may not be the instruction following the one that caused the counter overflow. The data space profiler may in some embodiments take this "skid" into account in recording and interpreting the data. The hardware may not capture the address of the data whose reference causes a memory-related counter overflow event, in these cases. Instead, only the register set at the time of the signal delivery may be reported.

Therefore, although a PC may be reported when the profile interrupt is delivered, the instruction at the location pointed to by the PC may not be the one triggering the event; that instruction may not yet have been executed. The instruction immediately preceding it in execution may be the one causing the event, but counter skid may add a great deal of uncertainty. To address this problem, the data space profiler may in some embodiments include an apropos backtracking search. In one embodiment, this backtracking search may be specified by the user by pre-pending a "+" to the name of a memory-related counter used for profiling. If the backtracking search is specified, then during data collection, the event agent may "walk back" in the address space from the PC reported with the overflow until it finds a memory-reference instruction of the appropriate type. In this example, the actual PC of the instruction causing the event may be called the trigger PC, while the PC determined by apropos backtracking may be referred to as the candidate trigger PC.

The first memory reference instruction preceding the PC in address order may not be the first preceding instruction in execution order. In particular, if there is any instruction that is a branch target, there may be no way to determine which path to the PC was taken, so the true trigger PC may not be able to be determined. In some embodiments, it may be too expensive to locate branch targets at data collection time, so the candidate trigger PC may always be recorded, but it may need to be validated during data reduction.

Once the event agent has backtracked to find the candidate trigger PC, it may be configured to disassemble the instruction and determine which registers are used to compute the effective address. However, as previously noted, the contents of the registers may have been changed by intervening instructions while the counter is skidding, so that even if the expression to compute the effective address is known, in some embodiments it may not be computable. The event agent may make this determination, and may either report a putative effective address, or may indicate that the address could not be determined. In other embodiments, a method for determining the effective address in these situations may be included in the data space profiler.

Some processors may not include hardware performance counters or may not include enough hardware performance counters to capture all of the information desired by an analyst. In some embodiments, a software version of one or more hardware performance counters may be implemented. This event agent may consist of multiple software counters located in machine addressable storage. Each of these counters may be modified based on data collected from a hardware instruction sampling device, in some embodiments. The hardware instruction sampling device may in some embodiments be configured to return instruction sampling information based on a constant instruction rate. Each event packet from the sampling device may be scanned by the event agent. In some embodiments, if the event contains data associated with the counter device, the event agent may increment one of the counters by an amount equal to the instruction rate detected between events. This instruction sampling method may be used in system where no hardware counters are present or to supplement existing hardware counters, in different embodiments. In some embodiments, it may provide libcpc (and cpustat) functionality on systems that lack hardware performance counters and have instruction sampling.

In some embodiments, clock-based profiling may be used as a basis of statistical sampling, and may use a fixed count of instructions for backtracking. In such embodiments, the fixed count may be any value (including zero) and may be a processor-specific or chip-specific predetermined number of instructions. In various embodiments, the instruction may be decoded, after being identified through backtracking, and if it includes a memory operation, a memory subsystem packet may be created, similar to those created when using hardware counter based profiling.

As described above, a hardware counter mechanism may be used in some embodiments as the basis for statistical sampling. In other embodiments, execution time may be used as an estimate of the cost to attribute to the memory subsystem as a whole. When execution time is used as an estimate of cost attributable to the memory subsystem, an association may be made between execution time and a sampled runtime event, and this association may be included as a code behavior attribute in the event space, in some embodiments. In addition, this association may enable mapping of execution time costs to any data profiling object (e.g., any hardware device, software construct, or data allocation construct involved in a sampled runtime event), when used in conjunction with the data profiling system and method described herein.

While the descriptions of runtime events included above primarily involve local runtime events, in some embodiments system-level events, such as cache-to-cache transfers and remote NUMA accesses, may be identified and profiled in much the same manner as local runtime events. In some embodiments, these system events may be the most costly runtime events in a modern multi-processor system. Precisely identifying these system events and associating them with computation objects and storage objects may in some embodiments enable observation, and optimization for these objects (e.g., through page migration or through another re-organization and/or re-allocation of the memory sub-system and hierarchy).

In some embodiments, in order to analyze these and other system events, the profiler (e.g., using one or more event agents) may be configured to maintain an identifier between a requesting thread and the request to the system. When the request is satisfied and returned, the source type of the data may be propagated into performance instrumentation for the requesting thread. The event agent may include the conduit between the memory-subsystem and the performance instrumentation. In one embodiment, the source types defined may include: remote memory reference, local memory reference, cache-to-cache transfer, and others.

In some embodiments, enabling observability and providing optimization tools with identification of system objects that may cause the most overhead may allow the user or optimization tools to optimize these system objects. Determination of a local or remote object references, as described above, may in some embodiments reduce the computation costs necessary to map memory locations based on operating system tables. This may also enable a quick determination of the volume of data movement, in addition to identification for optimization technologies. For example, this method may allow a user to identify stack pages that are remote to the execution unit and, thus, to enable migration with low overhead.

As previously described, there may be many different hardware and/or software events agents employed during data space profiling. For example, some software event agents described earlier may be configured to monitor data movement packets to collect profiling information related to a data movement instruction, such as by capturing and/or computing different portions, or elements, of the extended address associated with the execution of the instruction.

As described above, identifying an effective address associated with an event that modifies a source register (for example: ld[r1], r1) may be difficult using conventional profiling methodologies. In some embodiments, the data space profiler described herein may include means to extract the effective address from instructions associated with performance counters. In some embodiments, the method for extracting the effective address includes preventing the retirement of instructions associated with performance counter events. In some embodiments, this method may enable data space profiling on any application without the requirement for recompilation or backtracking. It may also enable data space profiling on kernel code. For example, in some embodiments, a performance monitoring unit, such as PMU 280 described above, may be configured to prevent an instruction that causes an event and/or overflow of an event counter from updating the architectural state of the machine (and thus, the values of source registers that may have been modified by the instruction) until information identifying the instruction can be captured. In such embodiments, information contained in various registers associated with the instruction (e.g., identifying a source or destination address or operand data) may be captured before the instruction modifies the contents of the registers.

In some embodiments, as instructions flow through the pipeline of a processor core, errors, exceptions and/or performance monitoring events (e.g., instruction cache misses, branches taken or mispredicted, etc.) may be detected and an indication of these occurrences may be conveyed to TLU 270 at the Memory stage (illustrated as signal 640 from stage 676 of FIG. 6). In one embodiment, during pipe stage Bypass (677), TLU 270 may prioritize exception reports and may transmit a signal to each unit that either flushes the instruction (and subsequent instructions from the thread) or not. As previously noted, instructions which are flushed from the pipeline 670 (e.g., due to a mispredicted branch) may be ignored by PMU 280 so that the performance monitor counters are not polluted by an instruction that will not complete (and therefore, will not cause an event of the type being monitored.)

As described above, if the instruction has not been flushed by the time it reaches pipeline stage Writeback (678), the architectural state may be updated (i.e., the results of the instruction are committed to the architectural state.) Therefore, in some embodiments, in order to determine one or more elements of the extended address associated with a given event or other event related data, PMU 280 and/or TLU 270 may be configured to cause the instruction (and any subsequent instructions from the same thread that are in the pipeline) to be flushed before committing the results of the instruction to the architectural state, to request and take a PMU trap, to execute trap handler software to capture the information needed to determine the extended address elements and/or other event data, and then to return control by indicating that a "retry" of the instruction should be initiated. In some embodiments, this "retry" indication may cause the hardware to refetch the instruction that caused the trap. For example, in some embodiments, a retry instruction may be executed, which may cause execution to continue at the program counter value saved on the trap stack when the trap was taken (the trap PC). In such embodiments, the instruction may be executed (or re-executed) upon being retried, but during the retry it may not be flushed before it is retired and the architectural state of the machine is updated.

Figure 24:
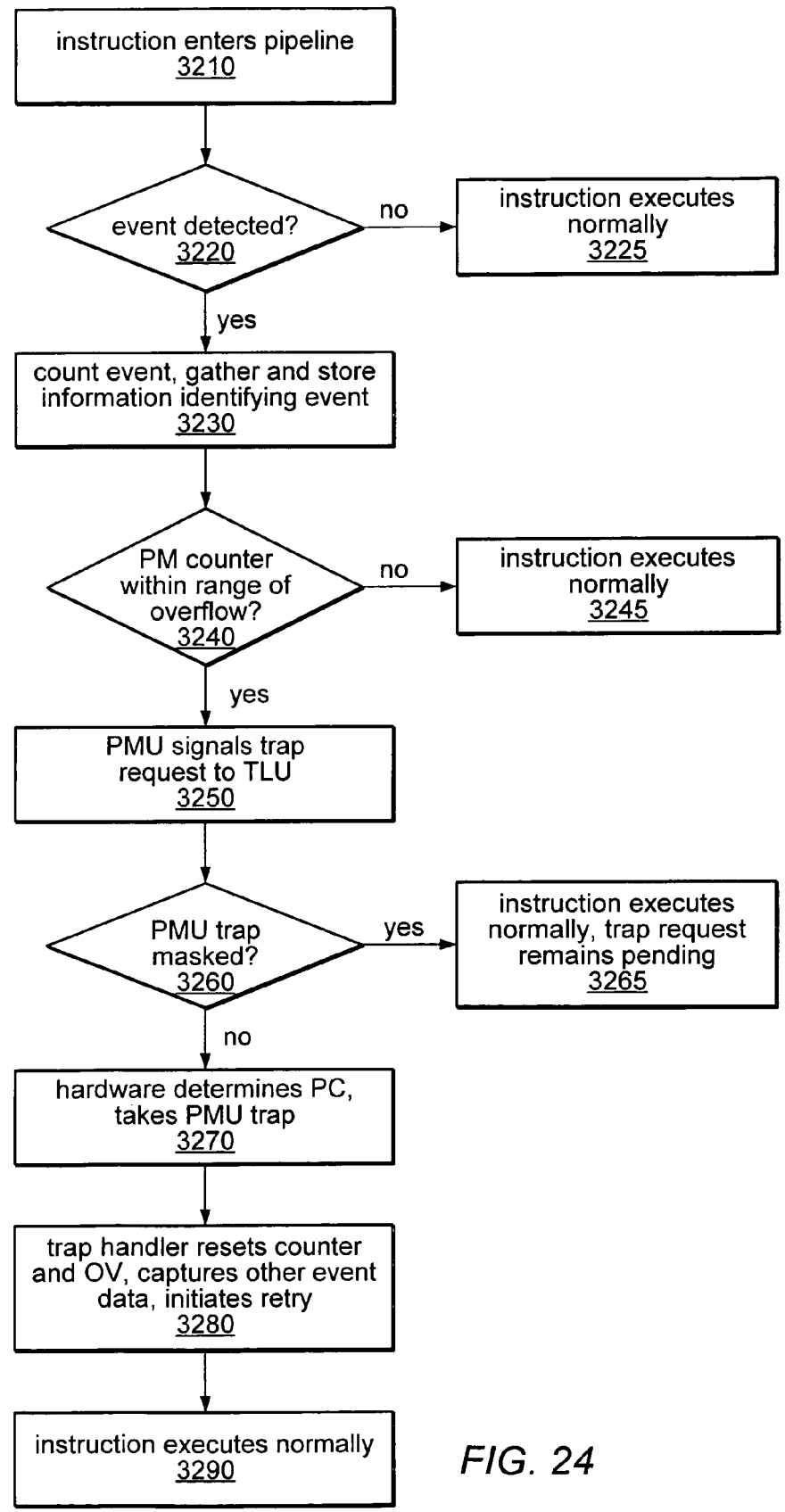
FIG. 24 is a flow chart illustrating a method for capturing identifiers of an instruction causing a performance-related event, according to one embodiment.

In one such embodiment, illustrated by the flow chart in FIG. 24, a comparator may be used to detect that a candidate instruction is in the pipeline and that the corresponding performance monitoring counter (e.g., PICH0) is within a specified range of overflowing. FIG. 24 illustrates a method for determining event data associated with an instruction that causes a PMU trap and for implementing the trap as a precise trap. In this example, an instruction may enter the pipeline, as in 3210. As previously noted, instructions may enter the pipeline of one processor from different threads without flushing the pipe between the instructions of the different threads. At 3220, hardware may detect that the instruction is a candidate for causing an event of a type being monitored by PMU 280. In one embodiment, the logic illustrated in FIG. 8 may be used to detect a performance monitoring event corresponding to an instruction in the pipeline. As described earlier, Decode logic 810, together with SL1 802, Mask1 804, and one or more event inputs 840 may be used to detect that an event of a type to be monitored is in the pipeline. Event inputs 840 may include signals from various hardware and software event agents and/or from other hardware or software configured to determine exceptions. For example, event inputs 840 may include one or more bits of an instruction or decoded instruction, an indication of an instruction cache miss (e.g., signal 610 from pipeline stage 672), an indication of a branch taken, not taken, or mispredicted (e.g., signal 630 from pipeline stage 675), etc. If it is determined that the instruction is a candidate for an event of a type to be monitored, this is indicated by an asserted signal on the output of gate 825 in FIG. 8 and as the positive exit of block 3220 in FIG. 24.

If an event candidate is detected, hardware may be configured to count the event and to gather and store information identifying the event, as in 3230. For example, hardware may be configured to store an identifier of the candidate instruction and/or the thread ID for the candidate instruction (e.g., signal 620 of FIG. 6), an indication of the event input signal that was received (e.g., signal 840 of FIG. 8), a "valid" indicator for the pipeline stage, the state of various registers associated with the instruction, the status of the overflow bit (e.g., OV1 740A) for the corresponding performance monitoring counter (e.g., PICH 702A), the value of the corresponding performance monitoring counter, an indication of the event from PMU 280 (e.g., signal 690 of FIG. 6), etc. This information may be stored in pipeline 660, pipeline 670, or in another similar pipeline structure included within TLU 270 or PMU 280, in various embodiments. In this example, counting the event may include incrementing the corresponding performance monitoring counter (e.g., PICH 702A). In other embodiments, the event may be counted using a software counter, rather than a hardware counter.

If, at 3240, it is determined that the event counter associated with the event type detected is not within range of overflowing (as indicated by a de-asserted signal 873 of FIG. 8), execution of the instruction may complete normally. This is shown at 3245 of FIG. 24. Counting an event based on signal 871 is described in detail above in regard to FIGS. 7 and 8.

If, at 3240, it is determined that the event counter associated with the event type detected is within range of overflowing (as indicated by an asserted signal 873 of FIG. 8), and an instruction associated with the type of event being monitored and counted by the counter is in the pipeline (as indicated by an asserted signal on the output of gate 825), a trap request to TLU 270 may be generated for the thread containing the candidate instruction. This is indicated in FIG. 8 as an asserted signal on the output of gates 845 and 865, and in FIG. 24 as the positive exit of block 3240. As described above in regard to FIG. 8, the output of gate 845 may be qualified by the current value of the overflow field OV for the corresponding PCR register and/or a corresponding TOE field as described in Table 1 to produce the output of gate 865. In this example, the output of gate 865 may signal a performance monitor trap request to the TLU, as shown in 3250.

In some embodiments, a trap request may not always be acted upon at the time it is requested, but may sometimes be masked and acted upon at a later time. For example, PMU traps may be masked during execution of a critical section of code and may not be taken until execution of the critical code has been completed. In the example illustrated by FIG. 24, if PMU traps are masked, as indicated by the positive exit from block 3260, the instruction may execute normally and the trap request may remain pending, as shown in 3265. In this example, when traps are subsequently unmasked and the pending trap is acted on, the pending trap may be taken as an imprecise trap. In other words, when the trap is finally taken, it may not be possible to determine the values of registers or other extended address elements corresponding to the instruction associated with the detected event. In other embodiments, however, specialized hardware and/or additional trap handling software may be configured to capture register values or other extended address elements corresponding to the instruction associated with the detected event (or to determine them using other available information) in the case of such imprecise traps. For example, in one embodiment, specialized registers may store enough information about instructions that cause a system event (e.g., the PC values corresponding to executed load operations and/or the effective address for a load instruction) that profiling information may be associated with the system event even if an imprecise trap is taken following detection of the system event.

If PMU traps are not masked, as indicated by the negative exit from block 3260, the trap hardware, which may be included in TLU 270, may be configured to determine the value of the PC for the candidate instruction and to store it in a register to be read by trap handling software, as in 3270. In some embodiments, the PC value may be determined using information captured and stored in the pipeline as the candidate instruction flows in the pipeline, or when the event itself is detected (e.g., by the logic illustrated in FIG. 8 and discussed above.) The trap hardware may also be configured to take the PMU trap, that is, to implement a context switch and initiate execution of a software trap handling routine.

In this example, when the trap handling routine is executed, as in 3280, software in the trap handler may be configured to capture and/or log information identifying the candidate instruction that corresponds to the event. In some embodiments, this information may include values of one or more extended address elements, such as the PC value, a thread identifier, an identifier of the counter that overflowed, the setting of one or more OV bits, the event type that the counter monitors/counts, etc. This information may in some embodiments have been stored in hardware registers by hardware or software event agents, or as a normal consequence of the operation of the processor core. In some embodiments, the trap handling software may also capture and/or log state information stored in pipeline 660 or 670, while in other embodiments, the trap handling software may capture or log state information stored in another similar pipeline within TLU 270. TLU 270 may in some embodiments be configured to store additional information about an instruction and/or event that is used to determine if or when a trap should be taken, such as information related to different priority or privilege levels for various exceptions and events.

The information captured and/or logged by the trap handling software may include the value of registers used to compute one or more addresses associated with the instruction (e.g., the source address or destination address) and/or the value of registers containing data associated with the instruction (e.g., operand data). In some embodiments, trap handling software and/or event agent software may be configured to compute one or more extended address elements (e.g., the effective address of the instruction) from the information captured when the event is detected and/or when the trap is taken. Trap handling software may in some embodiments include software event agents that associate the data captured and/or logged with the event and store information about the event and its associated extended address elements into an event space database, such as event set 1510 of FIG. 23. Thus, the instruction causing an event may be precisely identified and its extended address elements may be accessed in data space profiling of the application as described herein.

As shown in block 3280 of FIG. 24, in some embodiments, the trap handling software may be configured to clear the counter associated with the event or to reset it to an initial value corresponding to the number of events to be counted before generating a subsequent trap request. For example, the counter may be set to a negative value whose magnitude is equal to the number of events (within a pre-defined epsilon) to be counted. As noted earlier, the range which comparison logic 850 checks may be either hardwired or configurable (e.g., via a configuration register). The trap handling software may in some embodiments also be configured to reset the overflow bit corresponding to the counter that overflowed (e.g., OV1 740A). These actions may prevent a re-execution of the instruction following completion of the trap handling routine from causing another trap request or a series of such trap requests in an infinite loop.

As shown in 3280 of FIG. 24, once the trap handler routine has captured or logged information associated with the event (e.g., one or more extended address elements or other information that may be used to compute such elements), it may return control to the application being executed by initiating a retry of the candidate instruction. In some embodiments, retrying the candidate instruction involves re-fetching and executing (or re-executing) the candidate instruction, such as by executing a retry instruction that restores the PC to the trap PC value. In some embodiments, if the candidate instruction executed (i.e., passed the Execute stage 675), but the results of the execution were not committed (e.g., the instruction was flushed when the trap was taken), the instruction may be re-executed and then the architectural state may be updated according to the results of the instruction. In some embodiments, the candidate instruction executes normally following execution of the trap handling routine, as in 3290.

In some embodiments, retrying the instruction may cause the event counter to be incremented twice for the detected event. For example, even if the trap handler clears the counter before the instruction is retried, as noted above, the event may be counted again when it is retried because it may then correspond to a first event of that type detected after execution of the trap handling routine. In order to avoid this double counting of the event affecting the next trap request, the trap handler may in some embodiments reset the event counter to a value one less than the value needed to count the desired number of events before generating a trap request. In this way, the "extra" count of the event may be corrected and may not affect the count used to generate the next trap request for that event type. In other embodiments, the extra count may be corrected by other means or may not be corrected at all.

In the example described above, a precise trap is taken for an event candidate instruction in a pipeline that has not yet been retired when a counter corresponding to the event type is within a given range of overflowing. In one such embodiment, the performance instrumentation mechanism may be configured to determine that the next event of a given type will cause the corresponding performance counter to overflow. Therefore, if an instruction that is likely to cause such an event is detected in the pipeline and is not flushed, a trap may be requested and taken so that event data may be captured before the instruction results are committed to the architectural state. In other embodiments, a trap may be requested and taken only when an actual performance counter overflow occurs. In still other embodiments, a trap may be requested and taken if a single event candidate of a type being monitored is detected in the pipeline (i.e., regardless of the state of any counters.) In various embodiments, the instruction detected as an event candidate may or may not be executed before the trap is requested and/or taken. In various embodiments, the instruction detected as an event candidate may or may not be flushed (along with any subsequent instructions for the same thread in the pipeline) before the trap is taken or as a result of the trap request. Therefore, in various embodiments, the instruction (and any subsequent instructions from the same thread) may or may not need to be re-fetched and/or re-executed in order to commit the results of the instruction(s) to the architectural state of the processor.

The performance instrumentation mechanisms described herein may be considered hardware event agents, in some embodiments, since they may provide event data (e.g., one or more extended address elements or data that may be used to compute extended address elements) that may be used in data space profiling. Similarly, the trap handling software described herein in conjunction with the performance instrumentation mechanisms may include various software event agents, which capture and/or log event data that may be used in data space profiling.

Analyzing the Profile Data

As mentioned above, the result of a data-collection run for one or more software threads being profiled may be referred to as an experiment. In some embodiments, each experiment may be analyzed by an analyzer that includes a graphical user interface (GUI) program or a command-line equivalent (e.g., one that prints a profiling report based on analysis criteria entered). These two types of implementations may access the same shared-object (i.e., event space repository) to process the data, according to different embodiments.

For all experiments, the profiling data collected may be reduced to an annotated representation of the program graph, with performance metrics for each node in the graph, in some embodiments. The nodes may correspond to PCs (i.e., program counter values) and the graph may correspond to the dynamic call graph of the program. The reduced data may be used to show a function list, for example, or to show callers and callees of a function. In some embodiments the data may include information about how the performance metrics are attributed to the callers and callees, and/or to show annotated source or disassembly code of the target.

For hardware-counter based experiments, additional data structures may be built corresponding to the data objects referenced by the target. In these embodiments, the node in the program graph may correspond to an instruction, and, for memory reference instructions, the symbol tables may be used to determine the name (e.g., the virtual address, physical address, or variable name) of the data object being referenced.

Relational Agents

Figure 25:
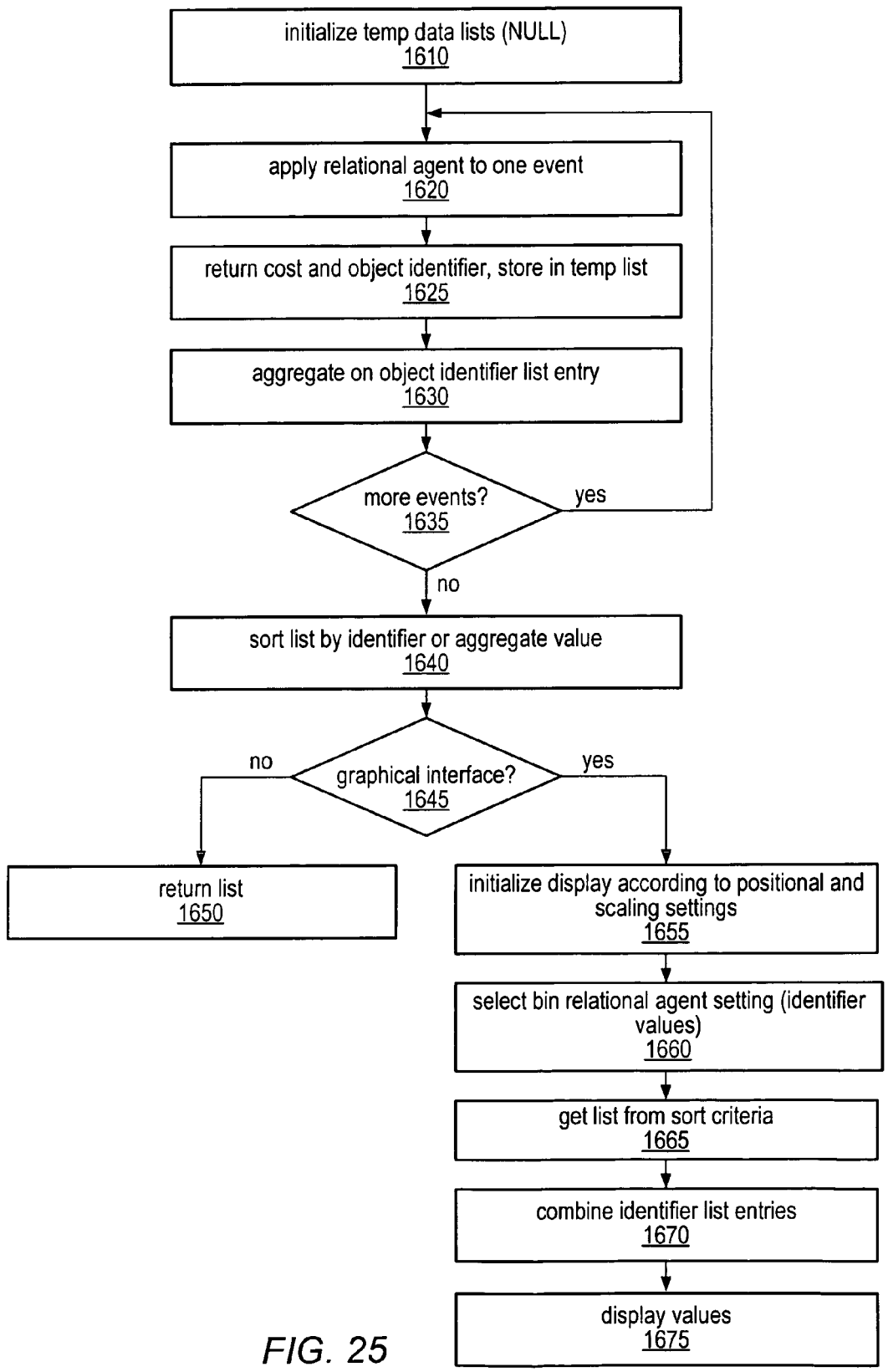
FIG. 25 is a flow chart illustrating a method for analyzing an event space by applying a relational agent to the events in the event space, according to one embodiment.

As previously mentioned, the data space profiler analysis (or OLAP) engine may include relational agents that map addresses (or identifiers) to profiling objects, including physical components and various software constructs. The relational agents map addresses to profiling objects by applying their functions to members of the event set and returning identifiers (addresses) of the events, as specified by their functions. FIG. 25 illustrates one embodiment of a method for analyzing the event space by applying a relational agent to the events in the event space and extracting event data corresponding to a particular profiling object.

In the example illustrated in FIG. 25, the analyzer may begin by initializing temporary event data lists (e.g., by clearing them, allocating memory for them, setting their values to NULL, etc.), as shown in 1610.

The analysis engine may then apply a relational agent to a first event in the event space and compute its value using the corresponding relational agent function, as shown in 1620. In different embodiments, the relational agent may be a standard relational agent included in all profiling exercises, may be a platform-specific relational agent, or may be a user-specified (custom) relational agent, defining a custom profiling object. As discussed earlier, relational agents may be used to define profiling object identifiers, so that cost data associated with the profiling objects may be extracted from the event space. Some examples of relational agent definitions are listed below:

```
obj_define Vaddr VADDR
obj_define Paddr PADDR
obj_define Process PID
obj_define Thread (PID*1000)+THRID
obj_define ThreadID THRID
obj_define Seconds (TSTAMP/1000000000)
obj_define Minutes (TSTAMP/60000000000)
obj_define L1DataCacheLine (VADDR&0x1fe0)>>5
obj_define L2CacheLine (PADDR&0x7ffc0)>>6
obj_define L3CacheLine (PADDR&0x7fffc0)>>6
obj_define VA__L2 VADDR>>6
obj_define VA__L1 VADDR>>5
obj_define PA__L1 PADDR>>5
obj_define Vpage__32M VADDR>>25
obj_define Vpage__256M VADDR>>28
obj_define Ppage__32M PADDR>>25
obj_define Ppage__256M PADDR>>28
obj_define Processor CPUID&0x1ff
obj_define Core CPUID&0x3ff
obj_define Processor__Board (CPUID&0x1fc)>>2
obj_define CoreID CPUID>>9
obj_define Valid ((Error > 0)? 0 : 1)
```

Some of the information needed to compute the value of each of these profiling objects may be captured by event agents during execution (e.g., by monitoring event data packets) or may be requested from the operating system by event agents during execution and data collection. For example, in some embodiments, the values of CPUID, PID, and TSTAMP may be requested of the operating system by event agents during data collection. In other embodiments, these values may be read from a register or memory location by the event agents during data collection. Similarly, the values of VADDR and/or PADDR may be captured by event agents during data collection. The values of some or all of these profiling objects and/or other profiling objects may computed and stored in the event space during analysis, in some embodiments. In other embodiments, some or all of these values may be pre-computed and stored in the event space during data collection or at some point between data collection and analysis.

When a relational agent is applied to the first event in the event space, its cost data and profiling object identifier (e.g., the address associated with the profiling object referenced by the relational agent) may be returned to the analysis engine and stored in a temporary data list, as shown in 1625. For example, if the analyst (user) requests costs related to the profiling object "Processor", the relational agent for the profiling object "Processor" (defined above) may apply the function CPUID&0x1ff to the profile data associated with the event (in this case, the CPUID) and may return the profiling object identifier value for Processor that is equal to the CPU identifier value AND-ed with 0x1ff, along with the cost of the event.

An aggregation, or binning, may in some embodiments be applied to the data extracted by the relational agent, as shown in 1630. For example, event data returned by the relational agent may be grouped with other event data having the same profiling object address, in some embodiments. In other embodiments, event data returned by the relational agent may be grouped by cost, by a range of costs, or by the value or a range of values for another code behavior attribute. In still other embodiments, sorting criteria may be applied to the extracted profile data by the analysis engine before it is presented. For example, sorting criteria may specify that the data be sorted in ascending value order or in descending value order. In another example, sorting criteria may specify an aggregation formula or a number of bins in which to distribute values. Sorting criteria may also specify that sorting should be done based a particular execution cost (e.g., if several cost metrics are to be displayed) or on the values of a particular profiling object identifier for each event. Sorting criteria may be specified using the graphical user interface in various ways in different embodiments. For example, the cost or profiling object on which to sort may be selected by highlighting a column header, selecting a radio button on the display or using other gestures. In another example, the aggregation rules or the number of bins may be selected by choosing an option from a pull-down menu or by entering an expression in a text window. In some embodiments, sorting criteria may be specified in a control file or on a command line, rather than through a GUI.

As illustrated in FIG. 25, the analysis engine may apply the relational agent to each of the events in the event space, by repeating the operations shown in blocks 1620-1630, until the relational agent has been applied to all events in the event space, as indicated at 1635. In some embodiments, if the function for a particular relational agent cannot be computed for a given event (e.g., if the function is undefined for the event or not enough information was captured for the event to allow computation) the relational agent may return a NULL value or a value indicating that the profiling object identifier is unknown. In some embodiments, events returning a NULL or INVALID indication, may not written to the temporary data list for further analysis, while in others, they may be written to the temporary data list along with their NULL or INVALID indicator.

Once the relational agent has been applied to all of the events in the event space, the temporary data list may be sorted according to any presentation options specified for the results, as in 1640. For example, a default presentation option may specify that events should be sorted in descending cost order before being presented, in one embodiment. In other example, a user may specify in a control file or command line option that events should be sorted in an alphabetical or hierarchical order by their profiling object identifiers (e.g., one of their associated extended address elements). In some embodiments the list may be ordered according to the data associated with individual events, while in others the list may be ordered according to aggregated data, e.g., the aggregated data may be presented by bin.

The extracted profile data may be presented graphically in some embodiments, or in other ways in other embodiments, as shown by the decision block 1645. In some embodiments, the user may specify the manner in which to present the data in a configuration or control file or by entering a command line option upon invocation of the profiler or analyzer.

If the data is not to be presented graphically, the sorted list may be returned to the user by being written to a report file or log file, or may be printed directly from the analyzer, in different embodiments. This is shown in block 1650. In some embodiments, the output of the analyzer may be used as an input to an automated optimization process, such as an optimizing compiler or code generator. In other embodiments, a developer may use the results of the profiling exercise to determine changes to the application code, operating system code, system configuration, memory hierarchy, or other system resources in order to optimize the performance of the application being profiled for its target execution platform.

If the results of the analysis are to be presented using a graphical interface, the display may be initialized according to initial positional and scaling settings, as in 1655. For example, default values for positional settings (e.g., settings specifying which profiling objects, menus, function buttons, etc., to display) may be used for the initial display, in some embodiments. Similarly, a default scaling setting (e.g., specifying the zoom level for the data display) may be applied to the initial display of the results. In other embodiments, the user may specify the initial settings in a control or configuration file or by using a command line option. The initial display of the extracted events may include the corresponding cost data and profiling object identifier(s) of the events in text form (e.g., displayed as a text listing with data for each event on a separate line) or in graphical form (e.g., with cost data displayed in a histogram, and with each cost data value displayed as a separate bar). In some embodiments, the data displayed may be aggregated data. For example, one bar of the histogram may represent the sum of the execution costs for all events accessing a given L2 cache line and, thus, having the same L2 cacheline address associated with them. In another embodiment, one bar on a histogram may represent the sum of the costs for the three highest cost events, where or not they correspond to the same profiling object identifier.

The amount of aggregation may be dependent on the selected zoom level for the display and/or on aggregation rules applied to the profile data, in various embodiments. These aggregation rules may be specified by the user, in some embodiments, in a control or configuration file, on a command line, or using the graphical user input of the analyzer. In other embodiments, the analyzer may be configured to automatically determine a suitable zoom level and/or aggregation formula dependent on the amount of data to be displayed, the type of data to be displayed, the distribution of data displayed, or using some other criteria.

Using the graphical interface, the user may select a particular extracted event on which to perform further analysis, as in 1660. In one embodiment, for example, the user may select the profile data entry from the display that is associated with the highest cost for further analysis. In another embodiment, the user may specify a value or range of values for a particular profiling object for further investigation. For example, the user may wish to investigate all events for which the memory stall time was between 10 and 20 seconds and may select these events by highlighting them in the display. In another example, the user may wish to display all events accessing a particular virtual address, and may select an aggregated data entry corresponding to that particular address from the display.

Once a particular extracted event, or set of events, is selected, the analysis engine may access the previously sorted data list, as in 1665, and may filter the list according to the profiling object identifier value(s) selected, as in 1670. In some embodiments, the analysis engine may combine individual entries into one or more aggregated values by cost or by identifier, depending on the sort criteria and/or on one or more current presentation options (e.g., zoom level).

Finally, the extracted, sorted, filtered, and aggregated data may be displayed, as in 1675. The format, zoom level, and content of the display may again depend on the presentation options selected and any aggregation rules that may be applicable, according to various embodiments.

Some embodiments of the data space profiler do not use a graphical interface for presenting profile results at all, while others may provide the user with an option to present the results using a GUI or not. FIGS. 26-28 illustrate profiling results presented in tabular form, for example. Although any number of formats may be utilized to present the data gathered and analyzed as previously described, this tabular format may be used to aid in illustrating the described inventions without obscuring the described inventions. The tables illustrated in FIGS. 26-28 are exemplary and include example data, according to particular embodiments. In other embodiments, the profile data may be displayed differently. For example, in some embodiments, a graphical user interface may be used to select profile data to be displayed and to display the desired profile data. The tables illustrated in FIG. 26-28 are provided to aid in understanding the inventions and are not meant to be limiting upon the described inventions.

FIG. 26 is a table illustrating example profile data, according to one embodiment. In this example, the profile data may reveal an execution hindrance in terms of consumed execution times and may indicate a relationship between the execution hindrance and one or more addresses. In this example, three columns are illustrated. In other embodiments, more or fewer columns of data may be included. In this example, the first column of data indicates the amount of data stall, in seconds. The second column of data indicates corresponding addresses associated with each data stall event. The third column of data indicates the type of address indicated in column two. The first exemplary row in the table indicates the total number of seconds of data stall for the profiled code. The second exemplary row of the table indicates the amount of data stall attributed to the address "0x02000640", which is indicated as a physical memory address. In the example illustrated in FIG. 26, the third row indicates the number of data stall seconds attributed to the physical address "0x0000720." Another row within the table may indicate a virtual address. In another embodiment, an address column may indicate a tag and an address type column may indicate that the address refers to particular a cache line or cache sub-block, for example.

FIGS. 27A-27B are exemplary tables displaying profile data according to different embodiments. In these examples, execution hindrance is indicated in terms of consumed execution times and in relation to source-level data object language constructs. For example, FIG. 27A is an exemplary table of profile data with respect to various source-level data object language constructs, according to one embodiment.

The table illustrated in FIG. 27A includes five columns of profile data. Each row of profile data corresponds to a source-level data object language construct indicated in the fifth column of profile data, except for the first row of profile data. The first row indicates an aggregation of profile data for all source-level data object language constructs. The second and third rows of profile data respectively correspond to the source-level data object language constructs TREE and TABLE. The source-level data object language construct TREE is attributed with 166.402 seconds of external cache stall, 59.4% of data external cache read misses, 37.3% of data external cache references, and 70% of DTLB misses. The source-level data object language construct TABLE is attributed with 124.601 seconds of external cache stall, 39.5% of data external cache read misses, 41.4% of data external cache references, and 29.7% of data DTLB misses.

FIG. 27B is an exemplary table of profile data with respect to source-level data object language constructs, which represent members of a source-level data object, according to one embodiment. The columns of profile data in FIG. 27B are similar to the columns of profile data in FIG. 27A. In contrast to FIG. 27A, the first row of profile data in FIG. 27B corresponds to all of the sampled runtime events (or execution hindrances) attributed to the source-level data object language construct TREE (an instance of the code behavior attribute of FIG. 27A). The second row of profile data in FIG. 27B corresponds to a particular member of the source-level data object language construct TREE. The particular member is the source-level data object language construct TREE.LEAFS, of data type integer. The source-level data object language construct TREE.LEAFS has been attributed with 29.1 of the 166.402 external cache stall seconds attributed to TREE, 8.2% of the 59.4% of data external cache read misses attributed to TREE, 3.7% of the 37.3% of data external cache references attributed to TREE, and 0.1% of the 70% of data DTLB misses attributed to TREE. The profile data presented in the table of FIG. 27B indicates that the source-level data object TREE is involved with a large percentage of DTLB misses, but that this large percentage is not related to the source-level data object LEAFS, which is a member of the source-level data object TREE. The use of the information presented in FIGS. 27A and 27B, along with other similar data profiling results, may facilitate more efficient optimization of the code then optimization based on traditional profiling, in some embodiments.

FIGS. 28A-28F are tables illustrating aggregated and filtered profile data, according to different embodiments. These tables include correlated execution hindrances (observed as external cache stalls) and code behavior attributes, according to different embodiments. FIGS. 28A-28C each illustrate profile data aggregated and filtered by different code behavior attributes. FIGS. 28D-28F illustrate profile data aggregated and filtered by an instance of a first code behavior attribute (time range) and further aggregated by a second code behavior attribute. In FIGS. 28A-28C, a table includes three columns of profile data. The first column of profile data indicates external cache stall time in seconds. The second column of profile data indicates a percentage of cycles spent accessing external cache. The third column of profile data indicates a filter parameter (e.g., source-level data object, function/method, time, etc.). For example, FIG. 28A is an exemplary table illustrating profile data aggregating sampled runtime events by function, according to one embodiment.

The table in FIG. 28A identifies profile data for the specified functions STACK_CONTROL and GARBAGE_COLLECT. Each of the rows in the table corresponds to a specified function, except the first row of the table, which indicates profile data from the perspective of all functions of the application being profiled. The second row indicates profile data across the columns from the perspective of the function STACK_CONTROL. The third row of the table indicates profile data across the columns from the perspective of the function GARBAGE_COLLECT. The profile data of the table in FIG. 28A reveals that the function STACK_CONTROL is responsible for the largest amount of stall time of all functions. In this example, the function STACK_CONTROL has caused 39.262 seconds of external cache (E$) stall seconds, or 5.00% of the total 785.235 seconds of E$ stall. The table of FIG. 28A also indicates that the function GARBAGE_COLLECT has caused 38.477 seconds of E$ stall, or 4.9% of the total E$ stall.

FIG. 28B is an exemplary table illustrating profile data aggregated by source-level data object language constructs, according to one embodiment. The table in FIG. 28B is similar to the table in FIG. 28A, except that the third column of profile data indicates source-level data object language constructs. The first row of profile data indicates profile data for all source-level data object language constructs in the application being profiled. The second row of profile data indicates profile data for the source-level data object language construct TOS. The third row of profile data indicates profile data for the source-level data object language construct NUM_ENTRIES. The profile data in table 19B reveals that the majority of stall caused by source-level data object language constructs corresponds to the source-level data object TOS. The source-level data object language construct TOS is attributed with 117.785 seconds of E$ stall, or 15% of the total E$ stall. The source-level data object language construct NUM_ENTRIES accounts for 94.239 seconds of E$ stall, or 12% of total E$ stall.

FIG. 28C is an exemplary table illustrating profile data aggregated by time range, according to one embodiment. The table of FIG. 28C indicates profile data filtered by time range. In this example, 2% of E$ stall cycles persisted for 0-10 seconds, 3% of E$ stall cycles persisted for 10-20 seconds, and 25% of E$ stall cycles persisted for 20-30 seconds. In terms of E$ stall seconds, 15.704 stall seconds are attributable to stalls that persisted within 0-10 seconds, 23.557 stall seconds are attributable to stalls that persisted within 10-20 seconds, and 196.309 stall seconds are attributable to stalls that persisted within 20-30 seconds.

FIG. 28D depicts profile data aggregated and filtered by both time range and function, according to one embodiment. In FIG. 28D, the profile data has been filtered to include only stalls that persisted for 20-30 seconds, and then aggregated by function. In this case, the functions GARBAGE_COLLECT and STACK_CONTROL each contributed stalls of between 20-30 seconds. In this example, the function GARBAGE_COLLECT was attributed with 4% of all E$ stalls or 16% of the stalls that persisted for 20-30 seconds. The function STACK_CONTROL was responsible for 0.75% of all E$ stalls or 3% of the 20-30 second stalls.

FIG. 28E depicts profile data filtered by time for the function GARBAGE_COLLECT, according to one embodiment. In this example, a data structure H accessed in the function GARBAGE_COLLECT is responsible for 3.8% of E$ stalls, or 95% of the stalls attributable to the function GARBAGE_COLLECT. The data may be further filtered for finer granularity to determine which aspect of the structure H corresponds to the stalling in GARBAGE_COLLECT, in some embodiments.

FIG. 28F depicts profile data filtered by time for the structure H accessed in the function GARBAGE_COLLECT, according to one embodiment. In this example, the table includes statistics for members HEAD, TAIL, and VOLUME for the structure H. The members HEAD, TAIL, and VOLUME respectively correspond to 50%, 0%, and 50% of the stall related to the structure H. In terms of the total E$ stall, the members HEAD, TAIL, and VOLUME relatively correspond to 1.9% (1.49195 seconds), 0% (0 seconds), and 1.9% (1.49195 seconds) of the stall. The table of FIG. 28F also indicates offsets associated with each of the elements of the structure H. Using the profile data filtered by the selected parameters and the offsets, a developer may determine that H.HEAD and H.VOLUME should be put together, for example.

In order to facilitate identification of performance bottlenecks and the causes thereof, data space profiler described herein may include means to specify custom filter expressions and to apply them to the event space in order to further filter the profiling objects of interest. This functionality may provide a name space for user-specified mapping of costs to any hardware device and/or any software construct, in some embodiments. The analyzer may in some embodiments implement this functionality using four components: a parser, an expression generator, a token evaluator, and an expression evaluator. The parser may accept code specifying a filter expression entered by a user, such as in a file or through a graphical or command line user interface, according to different embodiments. The language constructs that may be used in custom filter expressions may be defined in a filter language specification, in some embodiments. In one embodiment, the filter language may be defined according a BNF grammar and the parser may be generated using yacc. The parser may first validate the expression, and if the expression is valid, the expression generator may generate a corresponding mathematical representation of expression for use in evaluating the expression as applied to the events in the event space. The parser or the expression generator may also be configured to associate a name with the filter expression, in some embodiments. The mathematical expression may contain scalar and/or vector operators for operating on tokens (e.g., cost data and/or extended address elements or other code behavior attributes associated with the events in the event space), according to various embodiments. Tokens may in some embodiments be generated using Lex.

In some embodiments, the expression name corresponding to the custom filter expression may be added to the token space and may be used to build complex expressions for filtering. For example, one custom filter expression named "slow_memory" may be used to select events for which the memory stall time is greater than 20 seconds:
(MaxMemStall>20)

Using this expression name, another filter expression may be built to further filter the slow_memory events in order to select only those that also meet the criteria "L2CacheLine=2805" using this expression: (slow_memory & (L2CacheLine IN (2805))

Filter expressions may be specified in terms of various combinations of vector and scalar operations, including set operations. For example, in the filter expression above, the set operator "IN" indicates that the filter should be used to select only events "in" the set (i.e., the subset of the event space) in which the L2CacheLine value (address) associated with the events is equal to 2805.

The token evaluator may return the values associated with the token name from the events selected by the filter expression, in some embodiments. Returning the values associated with the events selected by the filter criteria may involve providing the profiling object identifier (address) and cost data associated with the selected events. Each filter expression may be evaluated recursively by the expression evaluator, in some embodiments. This may involve evaluating operators and tokens to determine inclusion by the filter, in some embodiments. The use of custom filtering expressions is described later in conjunction with the detailed data space profiling example.

In some embodiments, the analysis (OLAP) engine may be configured to manage all bookkeeping of event data and relational information, and to report causal relationships between bottlenecks in physical objects and/or memory allocation and source-level objects. For example, the OLAP engine may be configured to receive event data from multiple repositories (e.g., per-thread or per-address-space repositories), directly from various hardware and software event agents, from operating system calls, etc. The OLAP engine may be configured to build the event space from these inputs and to keep it up to date during execution, data collection, and/or analysis. For example, in some embodiments, analysis may not begin until execution of the application to be profiled is complete, but in other embodiments, execution may continue during analysis, with or without additional data collection being performed. In some such embodiments, the OLAP engine may be configured to update or refresh the event space periodically or when explicitly requested to do so by the user.

In some embodiments, the event space may be implemented as a series of tables or as collection of linked lists. In other embodiments, the event space may be implemented in a database, such as an Oracle™ relational database. The OLAP engine may in some embodiments be configured to manage these tables, lists, or databases in order to maintain the relational information contained therein and to extract cost and other profile data therefrom, according to various relational agents and filters applied to the profile data in the event space. The OLAP engine may also be configured to maintain a list of relational agents, in some embodiments, while in others, lists of relational agents may be distributed between multiple hardware components or software modules of the data space profiler. In some embodiments, such as in various Java™ implementations, relational agents may be dynamically generated and applied, while in other embodiments (such as in various C implementations) relational agents may be static functions compiled once and then used later to build the event space.

Figure 29:
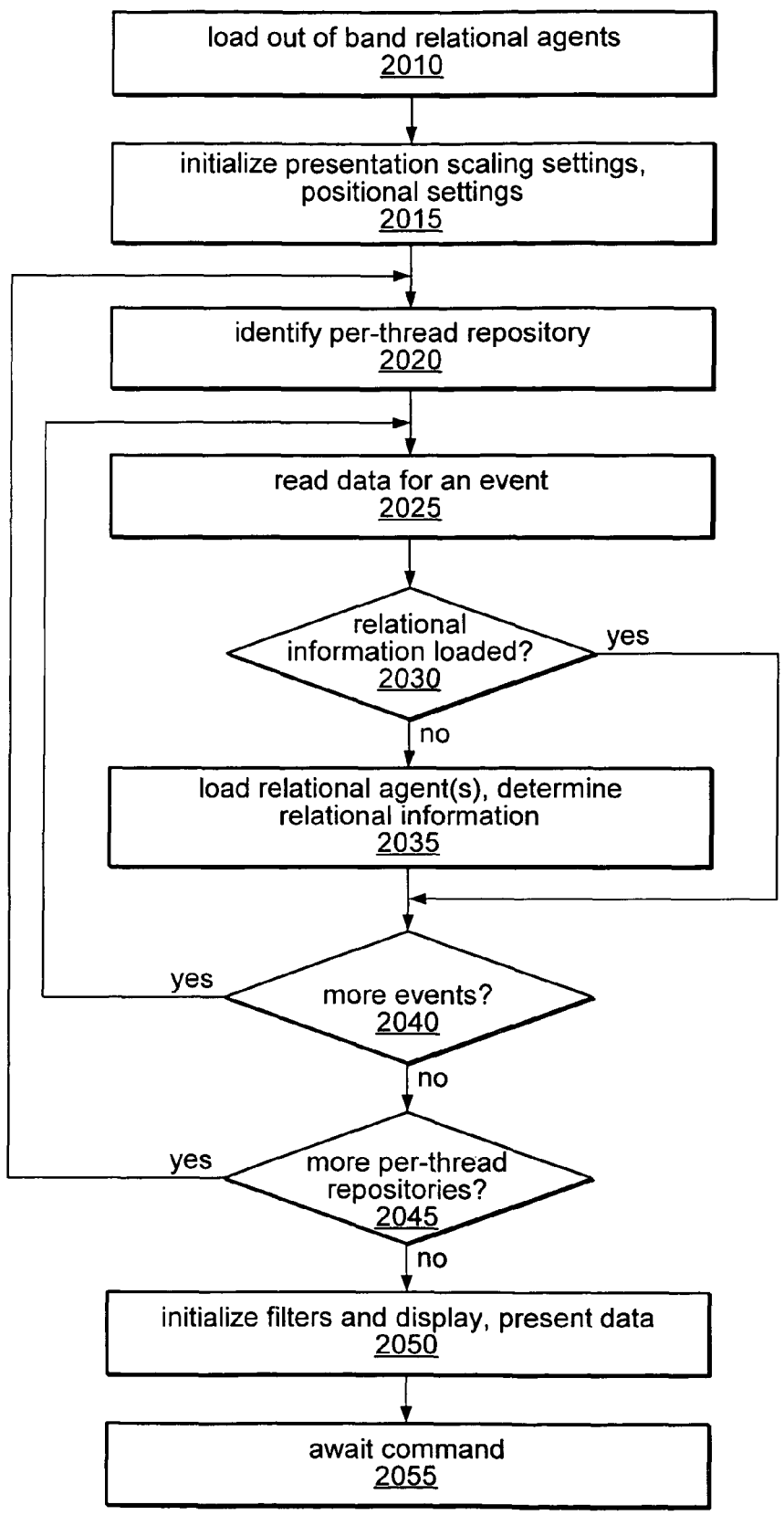
FIG. 29 is a flow chart illustrating a method for preparing for data space profiling analysis, including building an event space, according to one embodiment.

FIG. 29 illustrates an exemplary method for preparing for analysis, which includes building the event space, according to one embodiment. In this example, the analysis engine may first load any "out of band" relational agents, i.e., any platform-specific or user-specified relational agents that are not built into the standard profiler. This is illustrated at 2010. If a graphical user interface is included in the analysis engine, the presentation options for scaling and positioning of the initial display may be initialized, as in 2015. As described earlier, these options may in some embodiments be specified in a control file, by the user as a command line option, or as defaults settings of the analyzer.

The analysis engine may begin building the event space by identifying an event data repository from which to import event data, as in 2020. As previously noted, event data repositories may be allocated and populated on a per-thread or per-address-space basis, in some embodiments.

The analysis engine may read data associated with a first event in the first identified repository, as in 2025. If all of the relational information for the event is included (e.g., the extended address is completely specified and the cost is included), the analysis engine may proceed from 2030 to 2040. If not all of the relational information is included in the data set for the event, one or more relational agents may be accessed (i.e., loaded) and applied to the data that is included with the event record. In some embodiments, applying one or more relational agents to the data retrieved from the first repository may result in the remaining relational information being computed and the data associated with the event to be completely filled in. In some embodiments, not all elements of the extended address may be relevant or applicable to a given event. In such embodiments, the analysis engine may be configured to enter a NULL or INVALID value into the corresponding address field for the event. In some embodiments, after applying one or more relational agents to the data retrieved from the repository, some information may still be missing. In some embodiments, the analysis engine may be configured to access other event data records in order to determine the remaining values to be associated with the extended address of the event in question. The analysis engine may be configured to recursively compute values for the fields associated with the additional events and then to apply the results of those relationships in determining values for the remaining address fields of the event in question.

In one example, a runtime event may represent a cache miss associated with a known (i.e., captured) PC value, VA, and PA. The PC value may translate to a function foo. If the extended address element values for function foo have already been loaded into the event space, they may be filled in for the cache miss event of interest. If they have not yet been loaded, the analysis engine may be configured to locate these values elsewhere (e.g., in an event data repository) and to load the appropriate values into the event space for the cache miss event. In some embodiments, the analysis engine may access an event data table entry for foo to extract some of the extended address element values, such as a data type associated with the function. Recursively loading event data from a series of event data tables may be implemented as a join function for different forks of a file system.

At decision block 2040, if there are more events to be imported, the analysis engine may be configured to repeat the operations illustrated in blocks 2025-2035 until all events in the first repository have been imported and the relational information for each has been loaded into the event space. At decision block 2045, if it is determined that there are more repositories from which to import data, the analysis engine may be configured to repeat the operations illustrated in blocks 2020-2040, until all the data from the relevant repositories has been imported and the relational information for each has been loaded into the event space.

While in this example, the event space is built from multiple event data repositories sequentially, in other embodiments the event space may be built from multiple event data repositories in parallel. For example, the build process may spawn different threads, each of which may build a portion of the event space from a separate per-address-space event data repository.

Once the event space has been populated, the analyzer may be configured to initialize any filters and displays, and to present initial results of the profiling exercise, such as by displaying the costs associated with each function of the application being profiled. This is illustrated in block 2050. In some embodiments, the initial results displayed may always include the costs in view of each function, which may be a default result. In other embodiments, the user may specify the initial results to display using a control file, command line option, or other means. Similarly, as previously noted, initial presentation settings may be based on default values, user-specified values, or on the data to be displayed, in various embodiments. For example, the analyzer may be configured to initially display cost in view of the application's functions, and aggregated (binned) according to a zoom level that allows all of the data to be presented at once using a default number of bins.

Once the user (analyst) identifies the cause of a performance bottleneck, he or she may take steps to eliminate the bottleneck, thereby optimizing performance of the profiled application. In the example described above, the analyst may examine other profiling objects, (e.g., virtual pages, processors, or other profiling objects) in order to determine how best to reorganize the memory mappings so that the observed conflict misses are reduced or avoided all together. In the example described above, the analyst may be able to reduce the total memory stall time for the application being profiled by shattering the virtual page associated with the many different physical addresses (in other words, by repairing the data allocation conflicts).

While the examples above primarily describe the use of a GUI to display two-dimensional profile data (e.g., a cost on one axis and a profiling object identifier value on a second axis) the data space profiler and GUI may in some embodiments support the display of more than two event data dimensions at once. For example, the data may be displayed as a 3-dimensional object (e.g., a 3-dimensional histogram, drawn using perspective), in which cost may correspond to one axis and two different profiling object identifier values may correspond to the other two axes. In another example, a 3-dimensional object may be displayed as above, but a surface color on different portions of the object may represent a $4^{th}$ profiling data identifier value or other cost or code behavior attribute.

As shown in the example above, the data space profiler may allow custom data profiling objects and/or custom filter clauses to be specified by a user during analysis, in some embodiments. The data space profiler described herein may also include a method and apparatus to associate costs with a user-specified high-level data type, in some embodiments. In other words, it may provide a mechanism to operate on context specific data and costs. The apparatus may include two components: a descriptor apparatus and an event agent. The descriptor apparatus may allow input of a user-specified function defining a high-level data type, or user specified debugging commentary, or other specified definition of the high-level data type of interest. The descriptor apparatus may be inserted into the source code of the application by the compiler or other automated tools, or by a developer, in different embodiments.

The event agent may be implemented in hardware or in software, according to different embodiments, and may be configured to collect profile data related to the data type description specified using the descriptor apparatus. In some embodiments, the event agent may be a function inserted into the source code of an application to be profiled.

The event agent may enable users to monitor their user-specified data as it flows through an application, in some embodiments, and may enable a developer to associate costs with user-specified data and/or data types. For example, a developer may be able to view costs associated with an Oracle™ database row on behalf of a specific Solaris™ user that initiated an ODBC (Open Database Connectivity) Transaction.

The data space profiler may in some embodiments include means to extend the profiling techniques for profiling network applications. Traditionally, in order to profile network applications, they needed to be booted in an artificial network with "nodes" in different network zones and the "network" encapsulated by the operating system. This technique may be limited in the number of nodes that may be supported and in the size of applications that may be profiled. The data space profiler described herein may in some embodiments include a tagging component, an event generating component, and a synchronization component to support data space profiling techniques as applied to network applications.

In some embodiments, the tagging component may associate network addresses, ports, protocols, source user-specified types, and other profiling objects and/or extended address elements with network event costs. The event cost through the protocol stack may be treated as a user-specified event within the operating system, in some embodiments.

The event generating component (or event agent) may in some embodiments compute the latency for the network event, and based on required cost, may issue an event when the cost exceeds a threshold. Thus, the data space profiler may be configured to use statistical sampling for profiling distributed applications of any size, supported by the extensions described above.

Computing System and Data Flow

The described invention may be provided as a computer program product, or software, that may include a machine-readable medium having stored thereon instructions, which may be used to program a computer system (or other electronic devices) to perform the techniques of the present invention. In various embodiments, a machine-readable medium may include any mechanism for storing or transmitting information in a form (e.g., software, processing application) readable by a machine (e.g., a computer). The machine-readable medium may include, but is not limited to, magnetic storage medium (e.g., floppy disk); optical storage medium (e.g., CD-ROM); magneto-optical storage medium; read only memory (ROM); random access memory (RAM); erasable programmable memory (e.g., EPROM and EEPROM); flash memory; electrical, optical, acoustical or other form of propagated signal (e.g., carrier waves, infrared signals, digital signals, etc.); or other type of medium suitable for storing electronic instructions.

Figure 30:
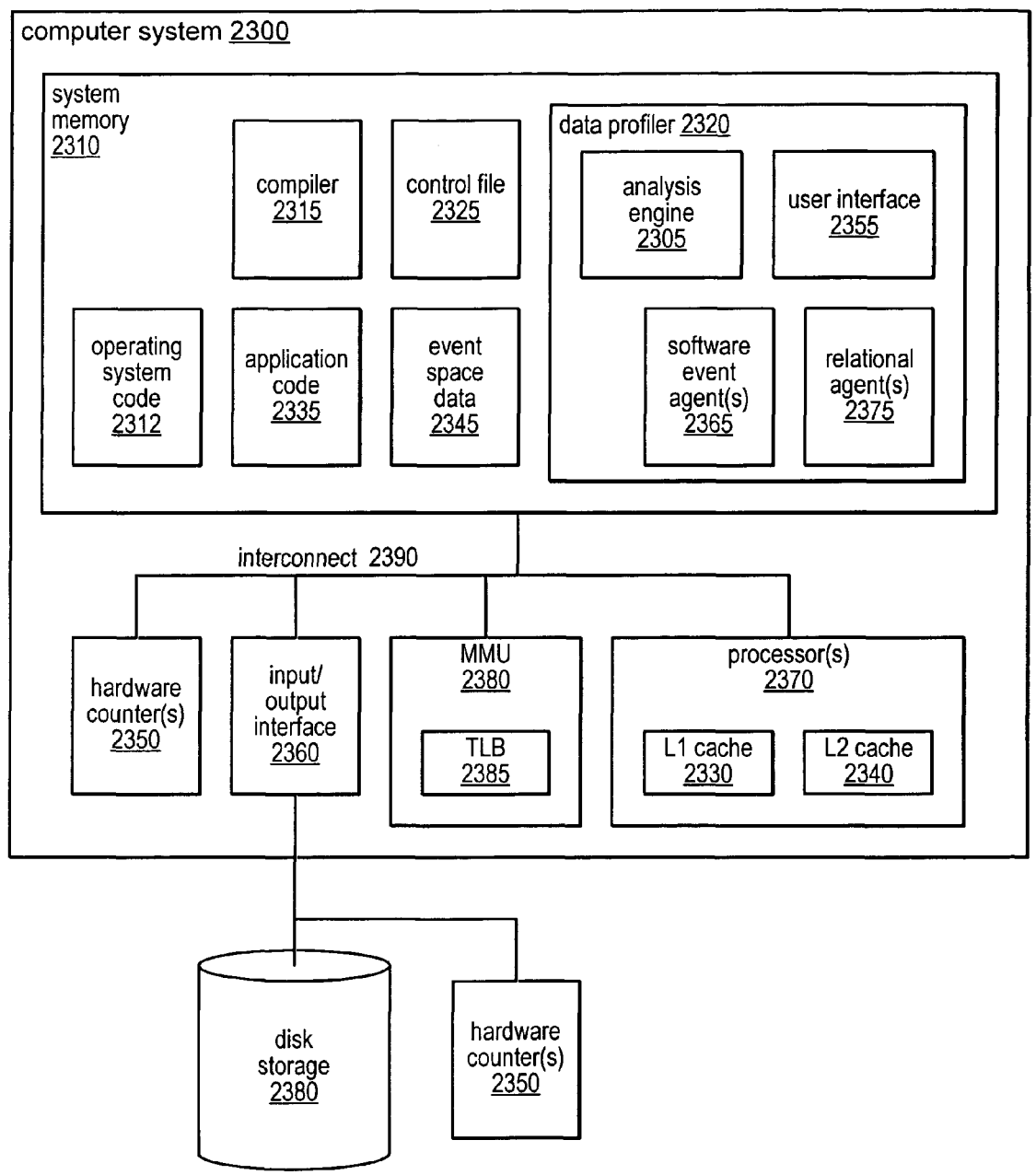
FIG. 30 is a block diagram of an exemplary computer system suitable for implementation of a data profiler, according to one embodiment.

An exemplary computer suitable for implementing the data space profiling system and methodology described herein is illustrated in FIG. 30. In this example, a computer system 2300 may include system memory 2310, one or more processors 2370, a memory management unit (MMU) 2380, one or more input/output interfaces 2360, one or more hardware counters 2350, and an interconnect 2390. Computer system 2300 may in some embodiments be communicatively coupled to one or more remote storage devices, such as disk storage 2380. Computer system 2300, in various embodiments, may include support for magnetic, optical, or solid-state storage media such as hard drives, optical disks, non-volatile RAM devices, etc., which may be remote storage devices or may comprise peripheral storage devices within computer system 2300 (not shown). In some embodiments, these peripheral storage devices may include more complex storage devices such as disk arrays, storage area networks (SANs), multimedia devices, or graphics/display devices, which may be coupled to processor 2370 via a standard Small Computer System Interface (SCSI), a Fibre Channel interface, an IEEE 1394 interface, or another suitable interface. In some embodiments, computer system 2300 may also be coupled to one or more hardware event agents, such as hardware counter 2350. In various embodiments, computer system 2300 may be configured as a rack-mountable server system, a standalone system, or in any other suitable form factor. In some embodiments, computer system 2300 may be configured as a client system rather than a server system, or may comprise one node of a distributed computing system, such as a peer-to-peer computing system including multiple nodes of similar or different configurations.

System memory 2310 may comprise any suitable type of system memory as described herein, including magnetic storage medium (e.g., floppy disk); optical storage medium (e.g., CD-ROM); magneto-optical storage medium; read only memory (ROM); random access memory (FB-DIMM, DDR/DDR2 SDRAM, or RDRAM®, for example); erasable programmable memory (e.g., EPROM and EEPROM); flash memory; and the like. System memory 2310 may include multiple discrete banks of memory controlled by discrete memory interfaces in embodiments of processor 2370 configured to provide multiple memory interfaces (not shown). Also, in some embodiments system memory 2370 may include multiple different types of memory.

System memory 2310 may in some embodiments include program instructions and data configured to implement data profiler 2320, which may perform the data space profiling operations described herein. Data profiler 2320 may include several software components including an analysis engine 2305, user interface 2355, one or more software event agents 2365, and one or more relational agents 2375, which may be configured to implement the operations for these components, as described herein. Software event agents 2365 may be configured to collect profile data associated with runtime events occurring during profiling of application code 2335, for example. In different embodiments, program instructions and data configured to implement data profiler 2320 may be partitioned into more, fewer, or different software modules than those illustrated in FIG. 30. For example, in some embodiments, the operations described as being part of user interface 2355 (e.g., GUI operations) may be integrated within analysis engine 2305. In other embodiments, one or more of event agents 2365 may be implemented on a different computer system and the profile data collected by them may be transmitted to computer system 2300 for analysis.

System memory 2310 may also include program instructions and data configured to implement compiler 2315, control file 2325, and operating system code 2312, in some embodiments. Control file 2325 may in some embodiments include configuration information to be used by the data space profiler. For example, it may include values for one or more presentation option settings (e.g., zoom level or profiling object tabs to display), aggregation (binning) rules, relational agent definitions, platform-specific options and definitions, etc. Operating system code 2312 may in some embodiments include one or more event agents 2365 and/or may be configured to received triggers, interrupts, event data packets, or other runtime-event-related information from various hardware event agents, such as hardware counters 2350. System memory 2310 may also include one or more application programs, such as application code 2335, which may be both executed and analyzed on computer system 2300. In other embodiments, application code 2335 may be executed on a computer system other than computer system 2300, but the resulting profile data may be analyzed on computer system 2300.

In some embodiments, system memory 2310 may also include a storage area for event space data 2345. Event space data 2345 may include any or all of the storage areas described herein for storing data space profiling data and/or results. For example, in some embodiments, event space data 2345 may include one or more per-thread or per-address-space event data repositories, one or more temporary data files used by the analysis engine, and one or more event space repositories, for storing the complete event space for an application profiling experiment. In other embodiments, these various event data storage areas may be partitioned into more, fewer, or different memory storage areas and/or may be distributed across multiple machines or computer systems. In one embodiment, one or more of these data event storage areas may be located on a remote storage device, such as disk storage 2380.

Processor 2370 may be configured to implement any of various instruction set architectures, such as x86, SPARC, PowerPC, etc. In some embodiments, processor 2370 may include a single CPU core, multiple CPU cores, or any combination of one or more general-purpose CPU cores and special-purpose cores (e.g., digital signal processors, hardware accelerators, co-processors, etc.) In various embodiments, processor 2370 may be configured to implement a superscalar architecture or may be configured to implement multi-threading. In some embodiments, processor 2370 may be a chip-multithreaded (CMT) processor, as described herein.

Interconnect 2390 may couple processor 2370 to memory 2310, as illustrated. In some embodiments, interconnect 2390 may be configured to couple processor 2370 directly to a computer system network. In some embodiments, interconnect 2390 and input/output interface 2360 may be configured to implement one or more of various interface or network standards, e.g., Peripheral Component Interconnect (PCI), wired or wireless Ethernet, HyperTransport (HT), Infiniband, or any variant or successor of these or other suitable input/output protocols. In some embodiments, computer system 2300 may be coupled to a network through input/output interface 2360, which is in turn coupled to another computer system (not shown). In some embodiments, computer system 2300 may be coupled to another computer system that is similar to or identical in configuration to illustrated system 2300, whereas in other embodiments, computer system 2300 may be coupled to another computer system that is substantially differently configured. For example, computer system 2300 may be a server system and may be couple to a processor-based client system, a stateless "thin" client system, a mobile device, etc.

Hardware event counters 2350 may in some embodiments be included in computer system 2300 to collect profiling data for runtime events occurring during profiling of application code 2335. In other embodiments, hardware counters 2350 and/or other hardware event agents may be included in other components of computer system 2300, such as in processor 2370. In still other embodiments, hardware counters 2350 and/or other hardware event agents may be located on computer systems separate from computer system 2300, such as if application code 2335 is executed on a different computer system and then analyzed on computer system 2300. For example, FIG. 30 illustrates an instance of hardware counter(s) 2350 located outside of computer system 2300 and coupled to disk storage 2380 and to input/output interface 2360. In this example, these hardware counters may by configured to capture events related to disk storage accesses. In embodiments including remote hardware event agents, triggers, interrupts, event data packets and/or other event-related profiling information may be transmitted from these hardware event agents to computer system 2300 for analysis by data profiler 2320 and/or analysis engine 2305.

Figure 31:
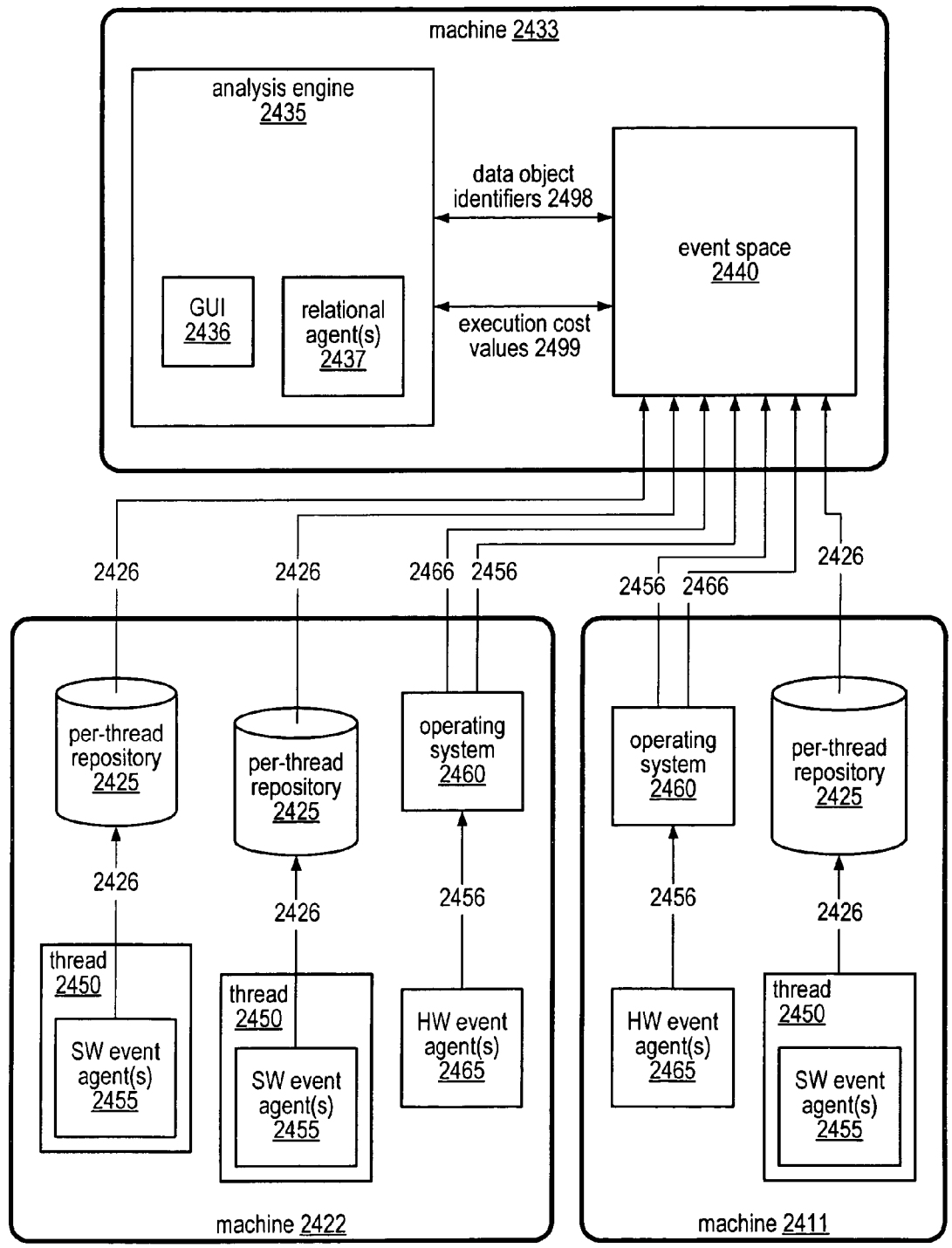
FIG. 31 is a data flow diagram illustrating data flow for an exemplary profiling experiment, according to one embodiment.

As noted above, the data space profiler described herein may be implemented on one machine but may be used to analyze profile data collected when an application runs on a separate machine or on multiple machines. FIG. 31 illustrates a data flow diagram for a profiling experiment involving a multi-threaded application executing on multiple machines.

In this example, two threads 2450 of an application execute on machine 2422 and another thread 2450 executes on machine 2411. Each thread 2450 includes one or more software event agents 2455, which transmit event data 2426 to a per-thread repository 2425, which is located on the same machine on which the thread executes. Each machine also includes one or more hardware event agents 2465, which transmit event data 2456 (e.g., a trigger or interrupt) to an operating system 2460 running on the same machine. Each operating system 2460 then transmits event data representing events detected by the hardware event agents (2456) and other event data 2466 (e.g., program counter values, physical addresses, etc.) related to runtime events of the threads operating on the same machine.

In this example, a third machine 2433 may include analysis engine 2435, which may include a graphical user interface, GUI 2436. Analysis engine 2435 may build event space 2440 on machine 2433 from event data received from machine 2422 and machine 2411 (e.g., event data 2426, 2456, and 2466 from per-thread repositories 2425 and operating systems 2460), in some embodiments. During analysis, relational agents 2437 of analysis engine 2435 may extract profiling object identifiers 2498 and event costs 2499 from event space 2440, as described herein. The filtered, sorted, and/or aggregated data may then be presented to a user (analyst) through GUI 2436.

While the invention has been described with reference to various realizations, it will be understood that these realizations are illustrative and that the scope of the invention is not limited to them. For example, while much of the description herein has focused on the illustrative context of memory reference related runtime events, applications to other runtime events and related profiling are also envisioned. Similarly, although instruction instance level profiling has been presumed, techniques described herein may be more generally applied to operations of a processor, pipeline or execution unit, whether such operations correspond one-to-one with instructions of an instruction set or are lower-level or higher-level operations performed by a particular implementation of a target architecture. For example, based on the description herein, persons of ordinary skill in the art will appreciate extensions to operations executable by a microcoded processor implementation or virtual machine implementation.

Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method of performance monitoring, comprising:
    detecting an occurrence of a runtime event of a first event type;
    conveying a trap request in response to detecting the occurrence of the event; and
    in response to receiving the trap request:
        taking a precise trap;
        suppressing retirement of an instruction associated with the detected occurrence of the event;
        capturing extended address information corresponding to the instruction, wherein the extended address information comprises two or more extended address elements each of which represents an identifier of a hardware component, a software construct, or a data allocation construct associated with the event; and
        associating the extended address information with the event.

2. The method of claim 1, wherein said suppressing retirement comprises inhibiting an update of an architectural state in response to execution of the instruction.

3. The method of claim 1, wherein said detecting comprises receiving an indication of the occurrence of the event while the instruction associated with the event is in a processor pipeline.

4. The method of claim 3, wherein said suppressing retirement comprises flushing the instruction from the pipeline.

5. The method of claim 4, further comprising flushing from the pipeline one or more other instructions following the instruction in the pipeline.

6. The method of claim 5, wherein the one or more other instructions are comprised in a same thread as the instruction and wherein at least one instruction in the pipeline comprised in a different thread is not flushed.

7. The method of claim 1, further comprising:
    prior to detecting the occurrence of the event of the first event type, updating a count register from a first count to a second count, the count register being configured to count events of the first event type; and
    determining that the second count is within a predetermined range of a predetermined value.

8. The method of claim 1, further comprising:
    prior to said taking a precise trap, determining if traps are masked; and
    in response to determining that traps are masked:
        delaying acting on said trap request until traps are not masked; and
        acting on said trap request by taking an imprecise trap, rather than a precise trap.

9. The method of claim 1, further comprising, subsequent to said capturing, enabling an update of an architectural state in response to execution of the instruction.

10. The method of claim 1, further comprising storing the extended address information associated with the event in an event space database, wherein the event space database is usable by a data space profiler to identify performance bottlenecks of a software application comprising the instruction.

11. The method of claim 1, further comprising, subsequent to said capturing, retrying the instruction.

12. A microprocessor, comprising:
    an interconnect; and
    a plurality of processing cores coupled to said interconnect;
    wherein one of said plurality of processing core comprises:
        a pipeline;
        a plurality of execution units;
        a trap logic unit; and
        a performance monitor unit coupled to one or more of the execution units and the trap logic unit;
    wherein the performance monitor unit is configured to:
        detect an occurrence of a runtime event of a first event type;
        convey a trap request in response to detecting the occurrence of the event; and
    wherein in response to receiving the trap request, the trap logic unit is configured to:
        take a precise trap;
        suppress retirement of an instruction associated with the detected occurrence of the event;
        capture extended address information corresponding to the instruction, wherein the extended address information comprises two or more extended address elements each of which represents an identifier of a hardware component, a software construct, or a data allocation construct associated with the event; and
        associate the extended address information with the event.

13. The microprocessor of claim 12, further comprising an event counter configured to count events of the first event type; wherein, prior to detecting the occurrence of the event of the first event type, the performance monitor unit is configured to update the event counter from a first count to a second count and to determine that the second count is within a predetermined range of a predetermined value.

14. The microprocessor of claim 12, wherein to detect an occurrence of an event of a first event type, the performance monitor unit is further configured to receive an indication of the occurrence of the event while the instruction associated with the event is in the pipeline.

15. The microprocessor of claim 12, wherein the performance monitor unit is further configured to enable an update of an architectural state of the processor in response to execution of the instruction subsequent to capturing the extended address information.

16. The microprocessor of claim 12, wherein the trap logic unit is further configured to store the extended address information associated with the event in an event space database, and wherein the event space database is usable by a data space profiler to identify performance bottlenecks of a software application comprising the instruction.

17. A computing system,. comprising:
a multithreaded multicore microprocessor; and
a memory coupled to the microprocessor;
wherein the microprocessor is configured to:
    detect an occurrence of a runtime event of a first event type;
    convey a trap request in response to detecting the occurrence of the event; and
    in response to receiving the trap request:
        take a precise trap;
        suppress retirement of an instruction associated with the detected occurrence of the event;
        capture extended address information corresponding to the instruction, wherein the extended address information comprises two or more extended address elements each of which represents an identifier of a hardware component, a software construct, or a data allocation construct associated with the event;
        associate the extended address information with the event; and
        subsequent to said capturing, update an architectural state of the microprocessor in response to execution of the instruction.

18. The system of claim 17,
wherein to detect an occurrence of an event of a first event type the microprocessor is further configured to receive an indication of the occurrence of the event while the instruction associated with the event is in a pipeline comprised in the microprocessor; and
wherein to suppress retirement the microprocessor is further configured to flush the instruction from the pipeline and to flush from the pipeline any other instructions from a same thread as the instruction which follow the instruction.

19. The system of claim 17, wherein, prior to detecting the occurrence of the event of the first event type, the microprocessor is further configured to update an event counter configured to count events of the first event type from a first count to a second count and to determine that the second count is within a predetermined range of a predetermined value.

20. The system of claim 17, wherein the microprocessor is further configured to store the extended address information associated with the event in an event space database, wherein the event space database is usable by a data space profiler to identify performance bottlenecks of a software application comprising the instruction.

* * * * *